United States Patent
Soundar

(10) Patent No.: US 8,938,058 B2
(45) Date of Patent: Jan. 20, 2015

(54) SYSTEM AND METHOD FOR PROVIDING SALES AND MARKETING ACCELERATION AND EFFECTIVENESS

(71) Applicant: Micro Macro Assets, LLC, Salem, NH (US)

(72) Inventor: Senraj Soundar, Salem, NH (US)

(73) Assignee: Micro Macro Assets LLC, Salem, NH (US)

( * ) Notice: Subject to any disclaimer, the term of this patent is extended or adjusted under 35 U.S.C. 154(b) by 0 days.

(21) Appl. No.: 14/204,505

(22) Filed: Mar. 11, 2014

(65) Prior Publication Data

US 2014/0247933 A1   Sep. 4, 2014

Related U.S. Application Data

(63) Continuation-in-part of application No. 14/057,758, filed on Oct. 18, 2013, which is a continuation of application No. 13/278,764, filed on Oct. 21, 2011, now Pat. No. 8,594,308.

(60) Provisional application No. 61/776,351, filed on Mar. 11, 2013, provisional application No. 61/405,587, filed on Oct. 21, 2010.

(51) Int. Cl.
*H04M 3/42*   (2006.01)
*H04M 3/00*   (2006.01)
(Continued)

(52) U.S. Cl.
CPC .............. *H04M 3/5183* (2013.01); *H04M 3/54* (2013.01); *H04M 3/5158* (2013.01); *H04M 3/523* (2013.01); *H04M 3/58* (2013.01); *H04M 2201/14* (2013.01); *H04M 2201/38* (2013.01); *H04M 2203/357* (2013.01); *H04M 2203/404* (2013.01)
USPC ................. 379/211.02; 379/212.01; 379/264; 379/266.07

(58) Field of Classification Search
USPC ................. 379/211.02, 212.01, 264, 265.05, 379/266.07, 201.01, 242; 370/352
See application file for complete search history.

(56) References Cited

U.S. PATENT DOCUMENTS

| 5,822,400 A | 10/1998 | Smith |
| 6,141,412 A | 10/2000 | Smith et al. |

(Continued)

OTHER PUBLICATIONS

International Search Report and Written Opinion for PCT/US14/23417, dated Jul. 14, 2014.

*Primary Examiner* — Thjuan K Addy
(74) *Attorney, Agent, or Firm* — Peter A. Nieves; Sheehan Phinney Bass + Green PA

(57) ABSTRACT

A system for handling call transfer contains a talker computer for providing a batch notification that enables a central data server to identify a batch of one or more customer records for calling, a central data server for receiving the batch notification that enables the central data server to identify the batch of one or more customer record, and a dialing agent computer for providing a connected notification that a customer that has been called has been connected, referred to herein as a connected customer, via a call, wherein a customer record of the connected customer is associated with the batch, wherein the central data server provides an identify notification and the talker computer receives the identify notification that enables the talker computer to distinguish the connected customer record, wherein the connected customer record is associated with the batch.

37 Claims, 45 Drawing Sheets

(51) Int. Cl.
*H04M 5/00* (2006.01)
*H04M 3/51* (2006.01)
*H04M 3/54* (2006.01)
*H04M 3/523* (2006.01)
*H04M 3/58* (2006.01)

(56) References Cited

U.S. PATENT DOCUMENTS

| | | |
|---|---|---|
| 6,721,778 B1 | 4/2004 | Smith |
| 6,751,310 B1 | 6/2004 | Crossley |
| 7,068,642 B1 | 6/2006 | Khan |
| 7,092,509 B1 | 8/2006 | Mears |
| 7,873,156 B1 | 1/2011 | Blair |
| 7,873,157 B1 | 1/2011 | Sim |
| 8,284,920 B2 * | 10/2012 | Shaffer et al. ............ 379/212.01 |
| 8,576,835 B2 * | 11/2013 | Acharya et al. ............... 370/352 |
| 2004/0098480 A1 | 5/2004 | Sekizawa |
| 2004/0179672 A1 | 9/2004 | Pagel |
| 2005/0002515 A1 | 1/2005 | Mewhinney et al. |
| 2007/0121902 A1 | 5/2007 | Stoica et al. |
| 2010/0303225 A1 | 12/2010 | Shashkov |
| 2011/0103572 A1 | 5/2011 | Blair |
| 2011/0286592 A1 | 11/2011 | Nimmagadda |

* cited by examiner

Listening to: John Smith

Sales Rep. Status: Sales Rep is on a Call
Account Name: Holiday Inn
Contact Name: Jeff Taylor

[Listen] [Whisper] [Barge] [Record] [Close]

☒ Show Call Handler Screen

| # | Account Name | Contact Name | Phone | Extension | Notes | Title |
|---|---|---|---|---|---|---|
| 1 | Steak N Shake Operations Inc | Adam Marshale | (317) 636-0234 | Direct | ☐ | VP of Operations |
| 2 | Fairfield Inn & Suites - Downt | Bill Smith | (317) 636-6735 | x123 | ☐ | |
| 3 | Red Roof Inn | Christina Parker | (317) 677-0064 | Ext | ☐ | Chief Financial Officer |
| 4 | Hampton Inn | William Thomas | (317) 636-1456 | Ext | ☐ | IT Manager |
| 5 | Holiday Inn | Jeff Taylor | (317) 636-1043 | Direct | ☑ | Chief Financial Op... |
| 6 | Hilton Hotel | Elizabeth Parker | (317) 823-4787 | x345 | ☐ | VP of Operations |
| 7 | Canterbury Hotel | George Simon | (317) 631-8974 | x412 | ☐ | Operation Manager |
| 8 | Embassy Suites | Sarah Taylor | (317) 275-6800 | x78 | ☐ | |
| 9 | Homewood Suites | Paul Anderson | (317) 747-0079 | x32 | ☐ | Technical Operations |
| 10 | La Quinta Inn | Daniel Martin | (317) 639-6622 | Direct | ☐ | Management Advisor |
| 11 | The Westin Indianapolis | Steven Moore | (317) 591-0486 | Ext | ☐ | Strategy Manager |
| 12 | JW Marriott Indianapolis | Richard Hall | (317) 872-9790 | Ext | ☐ | |
| 13 | The Dollar Inn | David Miles | (317) 631-5390 | Ext | ☐ | Chief Financial Officer |
| 14 | Five Star Limousine | Gilbert Johnson | (317) 823-4787 | Direct | ☐ | Sales Manager |
| 15 | Super 8 Hotel | Mike Pieper | (317) 929-9831 | Direct | ☐ | Manager of Operation |
| 16 | Quality Inn | Frank Jones | (888) 345-1904 | | ☐ | Chief Financial Officer |
| 17 | Melody Inn | Henry Ford | (317) 275-6800 | Ext | ☐ | Chief Financial Officer |
| 18 | The Dollar Inn | Adam Marshale | (317) 872-9790 | | ☐ | Chief Financial Officer |
| 19 | Quality Inn East | Mark Collins | (317) 631-5390 | 135 | ☐ | Sales Manager |

FIG. 23

Create/Edit Service Request

| | | |
|---|---|---|
| Service Request Type | VM Drop ▼ | — 1541 |
| Customer List Name | San Francisco List ▼ | — 1542 |
| Voice Message to be Dropped | Product Intro VM ▼ | — 1543 |
| Start Date | 03/12/2014 | — 1544 |
| End Date | 03/14/2014 | — 1545 |
| Preferred Day of the Week | Thursday ▼ | — 1546 |
| Preferred Time of the Day | 08:00 AM ▼ | — 1547   1548 |
| Description | Please deliver this voice message in the morning closer to 8am EST as much as possible. Thanks. | |

Save   Cancel

Marketing Campaigns

|  | 1656 |  |  |  |  |
|---|---|---|---|---|---|
| Add New Marketing Campaign |  | List of Marketing Campaigns |  |  |  |
| ─1651 | ─1652 | 1653─ |  | ─1654 | ─1655 |
| Campaign Name | Customer List Name | Status | Completed Date | Action |  |
| Year End Promotional... | North East List | Assigned |  | Edit | Delete |
| Promotion Offers | Customers List | In Progress |  | Edit | Delete |
| Chicago Conference -... | Conference Participan... | Completed | 02/25/2013 | Edit | Delete |

Schedule New Time Off Event

Time Off Reason: Vacation ——1761
Start Date: 03/06/2013 ——1762  08:00 AM ——1763
End Date: 03/13/2013 ——1764  06:00 PM ——1765
Status: Not yet approved ——1766

Save  Cancel

SYSTEM AND METHOD FOR PROVIDING SALES AND MARKETING ACCELERATION AND EFFECTIVENESS

CROSS-REFERENCE TO RELATED APPLICATION

This application claims priority to U.S. Provisional Application entitled, "SYSTEM AND METHOD FOR SALES AND MARKETING DIAGNOSIS AND EFFECTIVENESS" having Ser. No. 61/776,351, filed Mar. 11, 2013, which is entirely incorporated herein by reference, and is a continuation-in-part of the copending U.S. patent application entitled "SYSTEM AND METHOD FOR MAXIMIZING EFFICIENCY OF CALL TRANSFER SPEED" having Ser. No. 14/057,758, filed Oct. 18, 2013, which is a continuation of U.S. Pat. No. 8,594,308, entitled, "SYSTEM AND METHOD FOR MAXIMIZING EFFICIENCY OF CALL TRANSFER SPEED", which issued Nov. 26, 2013, which depends from U.S. Provisional Application entitled, "SYSTEM AND METHOD FOR MAXIMIZING EFFICIENT CALL TRANSFER SPEED" having Ser. No. 61/405,587, filed Oct. 21, 2010, each of which is incorporated by reference herein, and each of which the present application claims priority.

FIELD OF THE INVENTION

The present invention is generally related to call centers, and more particularly, is related to efficient handling of call center calls.

BACKGROUND OF THE INVENTION

Systems and methods presently exist for transferring a customer call taking place between a dialing agent and a customer, to taking place between a talker and a customer, without the customer knowing that a dialing agent was involved in establishing the call between the talker and customer, and without the customer knowing that navigating systems and people (phone voice menus, operators, wrong phone numbers and the like) were involved prior to getting the live customer on the phone. Many of these prior systems and methods transfer the call between the dialing agent and the customer to between the talker and the customer fast enough, without significant delay. Unfortunately, these prior systems and methods transfer and display customer data at the screen of the talker at the same time as when the call is transferred or a short time after the call is transferred. Specifically, to allow the talker to have a productive call with the customer, it is beneficial for the talker to view data regarding the customer. Since the customer data is displayed at the same time as when the call is transferred or a short time after the call is transferred, the talker is at a disadvantage and not capable of preparing to handle the call effectively ahead of time. The foregoing fact causes the talker to react to a transferred call with a delay since the talker has to review the customer data after the call is transferred. In addition, the foregoing facts reduce effectiveness of the talker in performing the important objectives of: 1) making sure that the customer does not know that there was a dialing agent involved in making the call; and, 2) being prepared to pitch the customer effectively based on past notes regarding a history and facts regarding the customer. Therefore, there is a need for a system and method that enables the talker to review information associated with the customer and be prepared prior to when the customer call is transferred.

It is desirable to have a system that enables a talker to review information associated with one or more customers, acknowledge/select certain customers that are ready for calling, and upon such acknowledgement the system starts dialing (or schedules to dial) the selected customer records. The benefit of such system is that since the talker has reviewed the customers just before the system starts dialing (or schedules to dial) the talker already knows which customers may be dialed shortly thereafter or in the near future, and there may not be a need to identify the customers that are being dialed or scheduled to be dialed shortly or in the near future.

Further, it is desirable to have a system with one or more of the following functionalities: (a) a functionality that enables a user to monitor and collaborate in a call between another user of the system with a customer, (b) a functionality that enables a user of the system to execute multi-touch marketing activities, (c) a functionality that allows effective planning and execution of multi-touch marketing activities, and (d) a functionality that allows a user of the system to schedule a dialing session.

SUMMARY OF THE INVENTION

Embodiments of the present invention provide a system and method for maximizing efficiency of call transfer from being between a customer and a dialing agent to being between the customer and a talker, effective collaboration among users of the system during a call, effective planning and execution of multi-touch marketing campaigns, effective fulfillment of service request by a user, and effective scheduling of dialing sessions.

Briefly described, in architecture, one embodiment of the system, among others, can be implemented as follows. One embodiment of the system contains a dialing agent computer, a talker computer, a central data server, and a central voice server. The dialing agent computer has a memory, and a processor configured by the memory to provide a notification that a dialed customer has been connected (referred to herein as a connected customer) via a call and is ready for a call transfer, wherein the dialing agent computer is used by a dialing agent. The talker computer has a memory, and a processor configured by the memory to receive a first customer notification associated with the dialed customer prior to or at the same time as dialing of the customer and to receive a second customer notification associated with the connected customer after the connected customer has been connected to the dialing agent, wherein the talker computer is used by a talker. The central data server contains a memory, and a processor configured by the memory to perform the steps of: receiving the notification from the dialing agent computer confirming that the dialed customer has been connected; transferring the first customer notification associated with the dialed customer to the talker computer prior to or at the same time as dialing the dialed customer for purposes of distinguishing a customer record on the talker computer in a first manner; and after the dialing agent computer acknowledges connection to the dialed customer, transferring the second customer identification associated with the connected customer to the talker computer for purposes of highlighting a customer record on the talker computer in a second manner.

The present invention can also be viewed as providing methods for maximizing efficiency of call transfer from being between a customer and a dialing agent, to being between the customer and a talker, effective collaboration among users of the system during a call, effective planning and execution of multi-touch marketing campaigns, effective fulfillment of service request by a user, and effective scheduling of dialing sessions. In this regard, one embodiment of such a method, among others, can be broadly summarized by the following steps: entering a dialing agent and a talker into a campaign to maintain direct communication with the dialing agent and with the talker; calling a customer via use of a dialing agent device; receiving from the dialing agent a request to transfer a connected customer from communicating with the dialing agent to communicating with a talker; and after receiving the request to transfer, transmitting an identification of a customer record associated with the connected customer to a talker computer for identifying the customer record.

Other systems, methods, features, and advantages of the present invention will be or become apparent to one having ordinary skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 10 is an example of a screen view illustrating an interface provided to a talker after the talker joins a campaign using the talker computer, but where the talker is yet to join the voice conference bridge using the talker telephone.

FIG. 13 is an example of a screen view illustrating an interface provided to a dialing agent during the dialing of a customer.

FIG. 17 is an exemplary screen view illustrating an interface shown to talker, in accordance with the Push To Call embodiment.

FIG. 23 is an exemplary screen view illustrating an interface that allows the TPCP to view all or a portion of the screen of a CH when the TPCP is listening to the call of the CH.

FIG. 32 is an exemplary screen view illustrating an interface that allows a user of the system to create or update a Service Request of type VM Drop, in accordance with the exemplary embodiment of Service Request App.

FIG. 36 is an exemplary screen view of the Enhanced Marketing Automation System illustrating an interface showing the list of marketing campaigns.

FIG. 37 is an exemplary screen view of the Enhanced Marketing Automation System illustrating an interface to capture the information necessary to create or edit a marketing campaign.

FIG. 38 is an exemplary screen view of Enhanced Marketing Automation System illustrating an interface to show the marketing activities/touches of a marketing campaign in a calendar view.

FIG. 43 is an exemplary screen view of the exemplary embodiment of Scheduling App illustrating an interface that allows a dialing agent (or another authorized Vendor personnel) to enter the information to schedule a time off event for the purposes of notifying the system that he/she is not available for providing services during that time period.

DETAILED DESCRIPTION

Figure 1:
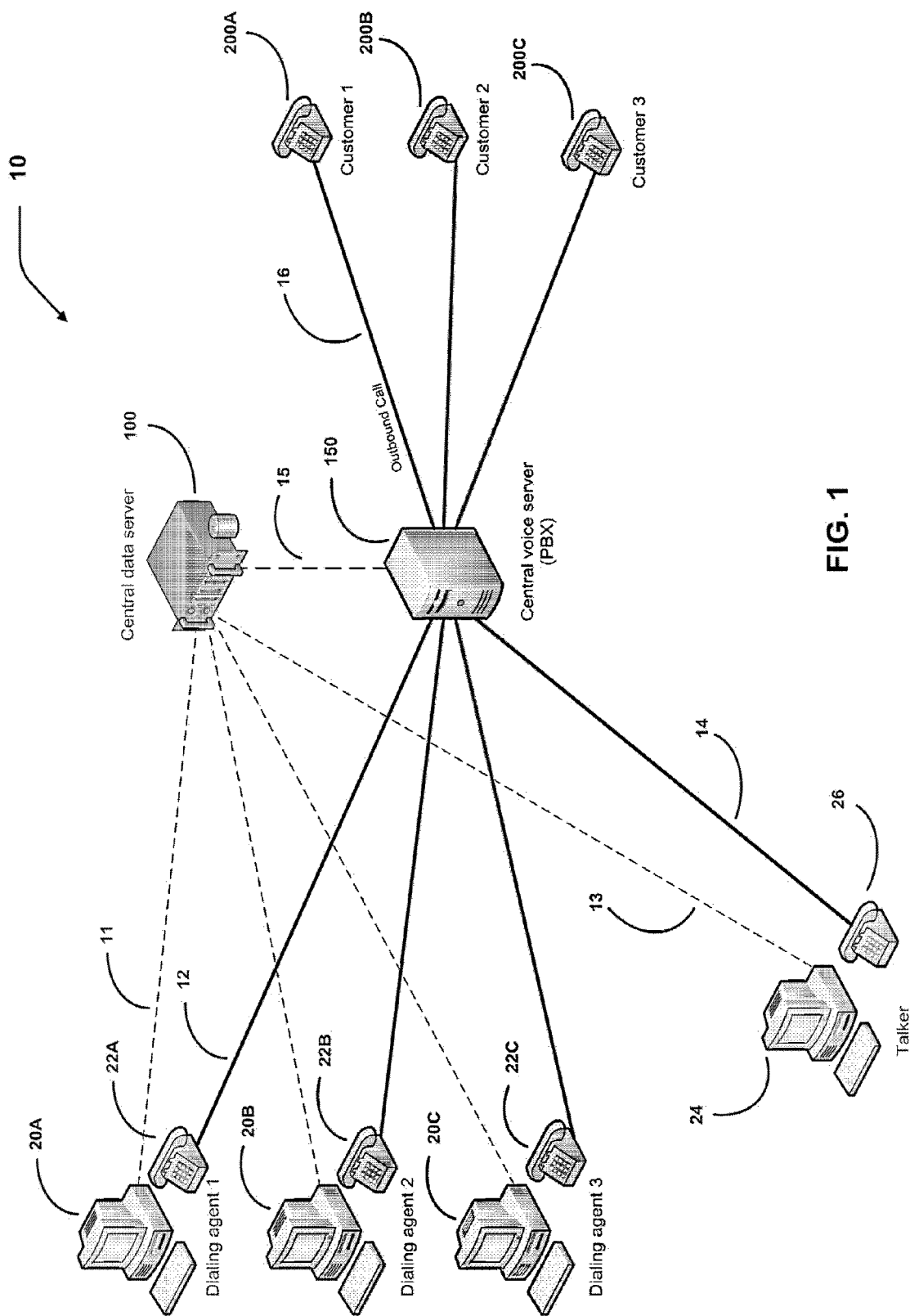
FIG. 1 is a schematic diagram illustrating a system for maximizing efficiency of call transfer speed in accordance with the present invention.

The present invention provides a system and method for maximizing speed of transferring a call from taking place between a dialing agent and a customer, to taking place between a talker and a customer, by providing customer data to the talker ahead of the call transfer or having the talker select a batch of one or more customer records for calling in the near future, minimizing the amount of customer data transferred, and minimizing the delay associated with talker selection at the time of call transfer by knowing ahead of time which talker to transfer the call to. Each of the foregoing techniques, as described in detail herein, could be used individually, or collectively two or more techniques could be used together. Customer data is displayed in a talker screen ahead of call transfer allowing the talker to be prepared by reviewing customer data, such as, for example, notes history and the like, ahead of call transfer. Only a necessary minimal amount of data providing a unique identifier is transferred to the talker when the call is being transferred, thereby increasing speed of call transfer. The delay associated with selecting the available talker at the time of call transfer is minimized by pre-selecting the talker ahead of call transfer and having the talker wait in a voice server and ready to accept the transferred call.

While the following describes the present system and method in detail it is beneficial to provide certain definitions.

Call Handler (CH): Any person (or machine or computer or a module within the system itself, performing the role of a person, as the case may be) using the system that is on a call with any individual (or machine or computer, as the case may be) who handles the other end of the call on the customer side.

Third Party Call Participant (TPCP): Any third person (or machine or computer or a module within the system itself, performing the role of the third person) participating in the call between a CH and a customer or communicating with the CH via electronic message.

CH computer: A computer used by a CH.

TPCP computer: A computer used by a TPCP.

CH Software: The software component of a CH computer that provides functionality for performance by a CH, in accordance with the present system and method.

TPCP Software: The software component of a TPCP computer that provides functionality for performance by the TPCP, in accordance with the present system and method.

Vendor personnel computer: A computer used by a Vendor personnel.

Customer: A person to whom a telephone call is made.

Customer list: A list of customers.

Dial: A telephone call made to a customer in the customer list.

Connect: A telephone call answered by a live customer.

Dialing agent: Each person who is the first person that handles a call made to a customer and navigates the call (through phone voice menus, phone operators, voicemails, wrong phone numbers, and the like) until the call reaches the correct target customer on the customer list, while the system may dial the telephone number of the customer and establishes connection between the person's phone and customer in the customer list, where the person transfers a live customer call to a talker, via a central voice server.

Talker: The person waiting in a voice conference bridge who accepts a transferred telephone call and speaks to a customer after the transfer of the telephone call.

Campaign: The session when the dialing agent and the talker work together, in which the dialing agent, via a central voice server, dials the customers and transfers the call between the dialing agent and the customer to the call between the talker and the customer. The word "session" as in "dialing session" refers to the Campaign.

Dialing Agent Software: The software component of a dialing agent computer that provides functionality necessary for performance by the dialing agent, in accordance with the present system and method.

Talker Software: The software component of a talker computer that provides functionality for performance by the talker, in accordance with the present system and method.

It should be noted that whenever the present description refers to a step being performed by a dialing agent, based on the context, this means that the step is either performed by: i) a dialing agent through the use of dialing agent software; ii) a dialing agent through the use of a dialing agent telephone; or iii) dialing agent software automatically without a dialing agent initiating a step. This same reasoning pertains to steps performed by the talker.

FIG. 1 is a schematic diagram illustrating a system 10 for maximizing the efficiency of the call transfer speed through communicating customer data to the talker ahead of call transfer, minimizing data transfer delay, and minimizing talker selection delay, in accordance with the present invention. Referring to FIG. 1, the system 10 includes a dialing agent computer 20 having dialing agent software stored therein, a dialing agent telephone 22, a talker computer 24 having talker software stored therein, a talker telephone 26, a central data server 100, a central voice server 150, and a customer telephone 200.

Figure 2:
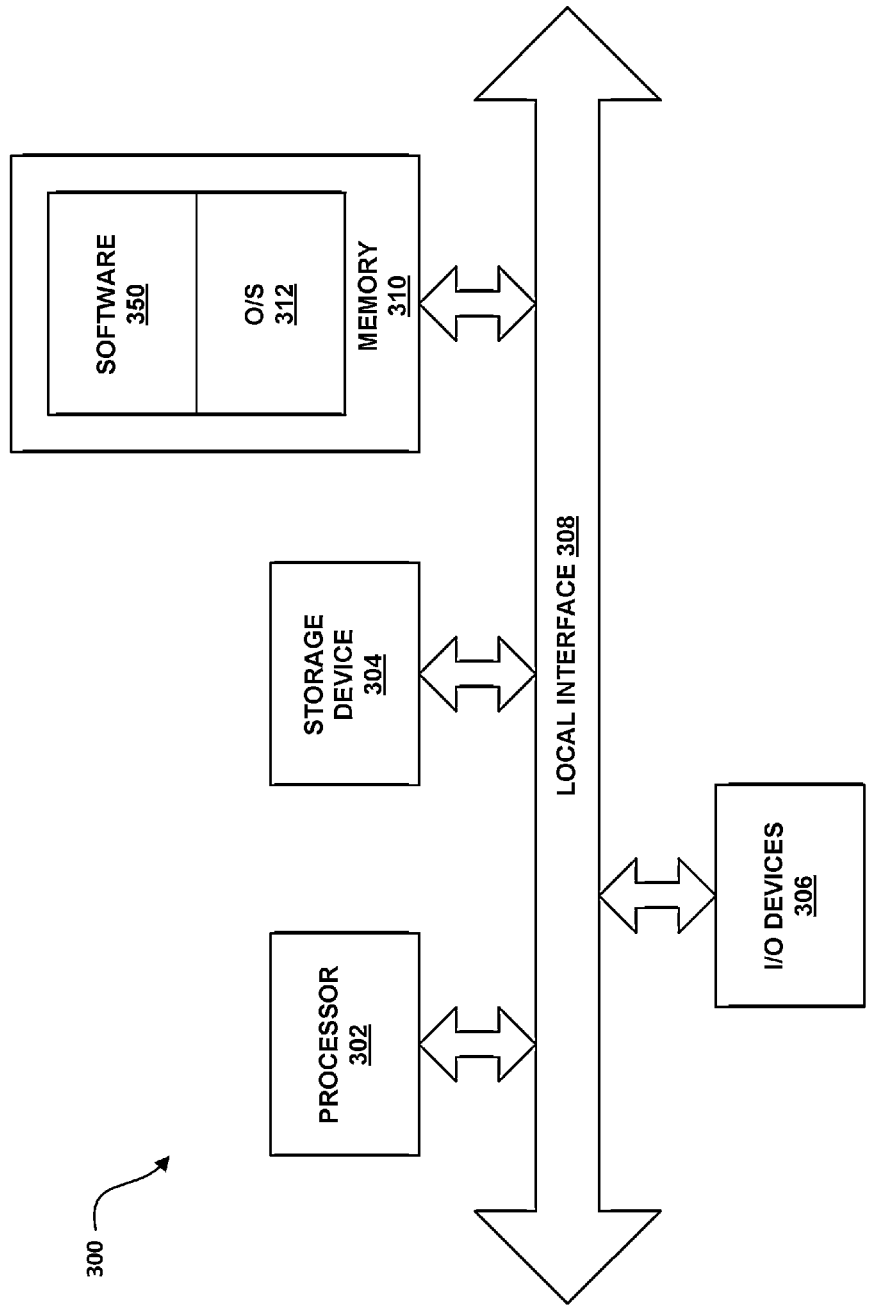
FIG. 2 is a block diagram further illustrating a general purpose computer.

It should be noted that a computer may be any device having a memory and processor, and being able to store therein functionality associated with software. Examples of computers may include, but are not limited to, a desktop computer, a portable computer such as a laptop computer, or a personal data assistant. FIG. 2 is a block diagram further illustrating a general purpose computer. It should be noted that functionality of the present system and method can be implemented in software, firmware, hardware, or a combination thereof.

Returning to FIG. 1, within the system 10 there may be one or more than one dialing agent computer 20, dialing agent telephone 22, talker computer 24, talker telephone 26, central data server 100, central voice server 150, and/or customer telephone 200. For exemplary purposes, FIG. 1 illustrates three dialing agent computers 20A, 20B, 20C, three dialing agent telephones 22A, 22B, 22C, and three customer telephones 200A, 200B, 200C.

In accordance with the present invention, a telephone/phone can be a traditional analog hardware telephone, digital hardware telephone, a software telephone (such as session initiation protocol (SIP) client software), or the like that could be used to communicate human voice. Since the capability of a telephone could potentially be implemented using a piece of software executed in a computer, the telephone and computer need not be two different devices and instead, both can be in one computer device.

The central voice server 150 can be a traditional PBX (Private Branch Exchange) that has the capability of performing switching functions based on commands received through CTI (Computer Telephony Interface) or software based PBX, or the like.

In accordance with the present invention, the central data server 100 contains components similar to a computer, such as, but not limited to, a memory, processor, local bus, input/output devices, and a storage device. A detailed description of a generic computer structure is provided hereinbelow. Of course, the storage capability and structure of the storage device within the central data server 100 may be different from that of a standard generic computer storage device, however, one having ordinary skill in the art would know such structure and differences. In accordance with the first exemplary embodiment, the central data server 100 may store therein a list of customers for contacting, as well as data regarding the customers. Such data may include data that is typically used in marketing such as, but not limited to, account name, contact full name, address, phone number, date last contacted, notes regarding results of the last communication, and other data.

Since the capability of the central voice server 150 could be implemented using software executed in a computer, the central data server 100 and central voice server 150 need not be two different devices and instead both could be in one computer.

Telephone communication links 12, 14, and 16 could be implemented using traditional analog telephone lines or digital telephone lines utilizing various digital communication protocols such as SIP, PRI (Primary Rate Interface), or the like. The links 12, 14, and 16 may also be wireless, for example, but not limited to, WiFi, BlueTooth, microwave, or other wireless voice and/or data protocols. In addition, computer communication links 11 and 13 could be implemented using a LAN (Local Area Network), a WAN (Wide Area Network), mobile network, or the like. A central server communication link 15 may also be provided for communication between the central data server 100 and the central voice server 150. The central server communication link 15 can be implemented using computer communication links or phone communication links described above.

One having ordinary skill in the art would understand the various types of devices, types of telephone communication links, and computer communication links that could be used in a system 10 embodying the present invention, and that other such devices and links may be provided.

FIG. 2 is a block diagram further illustrating a general purpose computer 300. Generally, in terms of hardware architecture, as shown in FIG. 2, the computer 300 includes a processor 302, memory 310, storage device 304, and one or more input and/or output (I/O) devices 306 (or peripherals) that are communicatively coupled via a local interface 308. The local interface 308 can be, for example but not limited to, one or more buses or other wired or wireless connections, as is known in the art. The local interface 308 may have additional elements, which are omitted for simplicity, such as controllers, buffers (caches), drivers, repeaters, and receivers, to enable communications. Further, the local interface 308 may include address, control, and/or data connections to enable appropriate communications among the aforementioned components.

The processor 302 is a hardware device for executing software, particularly that stored in the memory 310. The processor 302 can be any custom made or commercially available processor, a central processing unit (CPU), an auxiliary processor among several processors associated with the computer 300, a semiconductor based microprocessor (in the form of a microchip or chip set), a macroprocessor, or generally any device for executing software instructions.

The memory 310 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 310 may incorporate electronic, magnetic, optical, and/or other types of storage media. Note that the memory 310 can have a distributed architecture, where various components are situated remote from one another, but can be accessed by the processor 302.

The software 350 in the memory 310 may include one or more separate programs, each of which contains an ordered listing of executable instructions for implementing logical functions of the system, as described below. As an example, in the case of the dialing agent computer 20, the software 350 would contain an ordered listing of executable instructions for implementing logical functions required of the dialing agent computer 20, as described below. In addition, in the case of the talker computer 24, the software 350 would contain an ordered listing of executable instructions for implementing logical functions required of the talker computer 24, as described below. Further, in the case of the central data server 100, the software 350 would contain an ordered listing of executable instructions for implementing logical functions required of the central data server 100, as described below.

It should be noted that in accordance with an alternative embodiment of the invention, software of the dialing agent computer 20, software of the talker computer 24, and software of the central data server 100 may instead be one software package having separate modules to perform functionality of the dialing agent computer 20, the talker computer 24, and the central data server 100, respectively.

Although not required, it is possible for the memory 310 to contain an operating system (O/S) 312. The operating system 312 essentially controls the execution of computer programs and provides scheduling, input-output control, file and data management, memory management, and communication control and related services.

Functionality of the computer may be provided by a source program, executable program (object code), script, or any other entity containing a set of instructions to be performed. When a source program, then the program needs to be translated via a compiler, assembler, interpreter, or the like, which may or may not be included within the memory 310, so as to operate properly in connection with the O/S 312. Furthermore, functionality of the computer can be written as (a) an object oriented programming language, which has classes of data and methods, or (b) a procedure programming language, which has routines, subroutines, and/or functions.

The I/O devices 306 may include input devices, for example but not limited to, a microphone, a keyboard, mouse, scanner, joystick or other input device. Furthermore, the I/O devices 306 may also include output devices, for example but not limited to, a display, or other output devices. The I/O devices 306 may further include devices that communicate via both inputs and outputs, for instance but not limited to, a modulator/demodulator (modem; for accessing another device, system, or network), a radio frequency (RF) or other transceiver, a telephonic interface, a bridge, a router, or other devices that function both as an input and an output.

When the computer 300 is in operation, the processor 302 is configured to execute the software 350 stored within the memory 310, to communicate data to and from the memory 310, and to generally control operations of the computer 300 pursuant to the software 350. The software 350 and the O/S 312, in whole or in part, but typically the latter, are read by the processor 302, perhaps buffered within the processor 302, and then executed.

When the functionality of the computer is implemented in software, as is shown in FIG. 2, it should be noted that the functionality can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The functionality can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer readable medium can be, for example but not limited to, a non-transient electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the functionality of the computer is implemented in hardware, the functionality can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), or other technologies.

Figure 3:
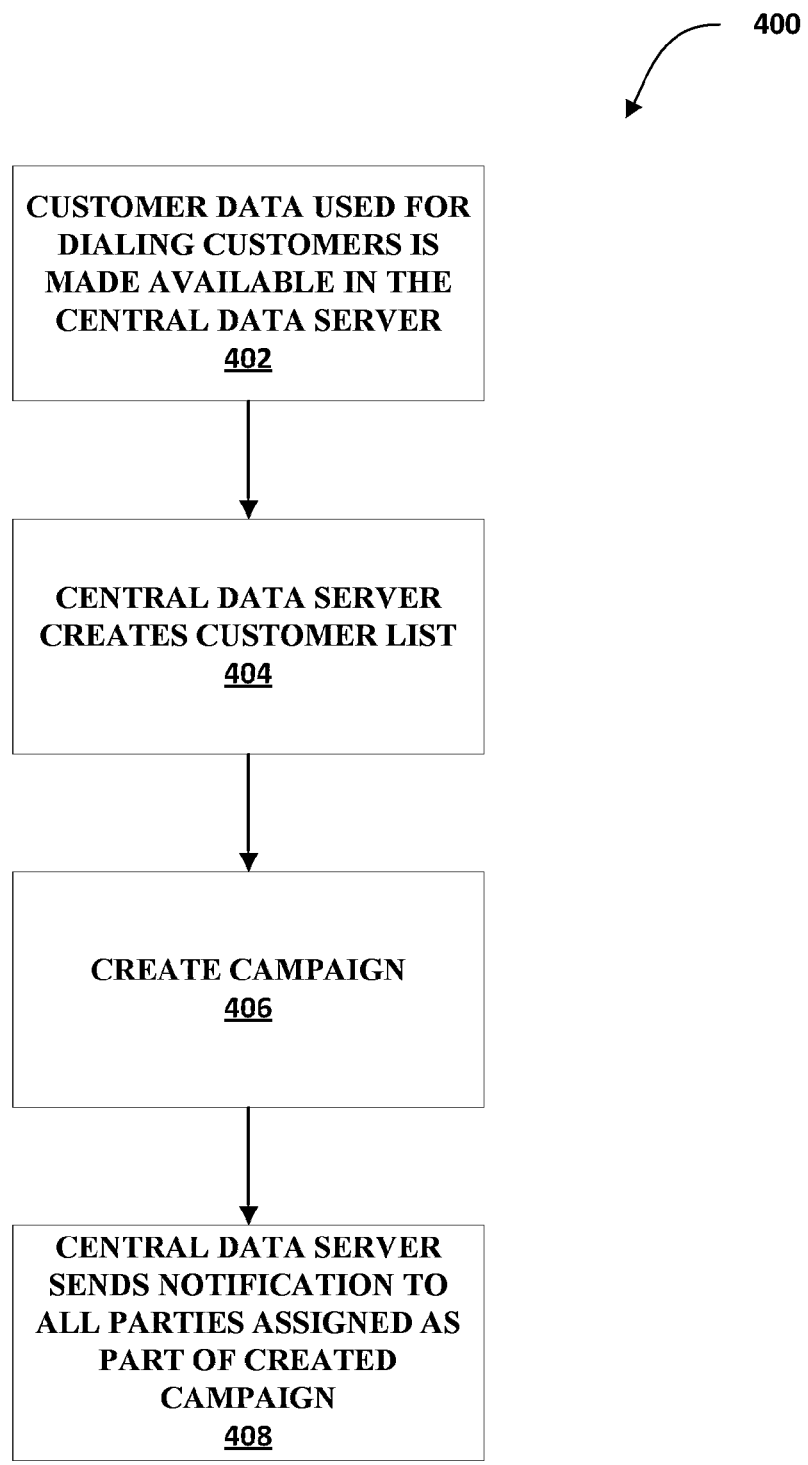
FIG. 3 is a flowchart illustrating an initiation process performed by the central data server of FIG. 1, in accordance with the first exemplary embodiment of the present invention.

FIG. 3 is a flowchart 400 illustrating an initiation process performed by the central data server 100 in order to maximize efficiency in call transfers. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention. In addition, it may be the case that a function may be skipped.

As shown by block 402, customer data that is used for dialing customers is made available in the central data server 100. Customer data may be imported into the central data server 100 one or more customer records at a time from one or more file, or each customer record of the customer data may be individually entered directly into the central data server 100. One having ordinary skill in the art would understand and appreciate that other methods may be used to populate customer data into the central data server 100.

As shown by block 404, the central data server 100 (FIG. 1) creates a customer list for use in a campaign. Creation of the customer list is based on specific criteria that is important to selecting an appropriate customer for marketing purposes. As an example, if calls are being made for purposes of speaking with potential purchasers of male shaving products, it might be beneficial to have the customer list include only males over the age of sixteen. As a way of another example, if calls are being made for purposes of speaking with potential purchasers of office supplies, it might be beneficial to have the customer list include only customers whose job function is related to purchasing office supplies for their businesses. The central data server 100 (FIG. 1) may use any known methods for creating the customer list, such as, but not limited to, indexing the customer list based upon key words and querying the customer list based on specific search criteria.

Figure 4:
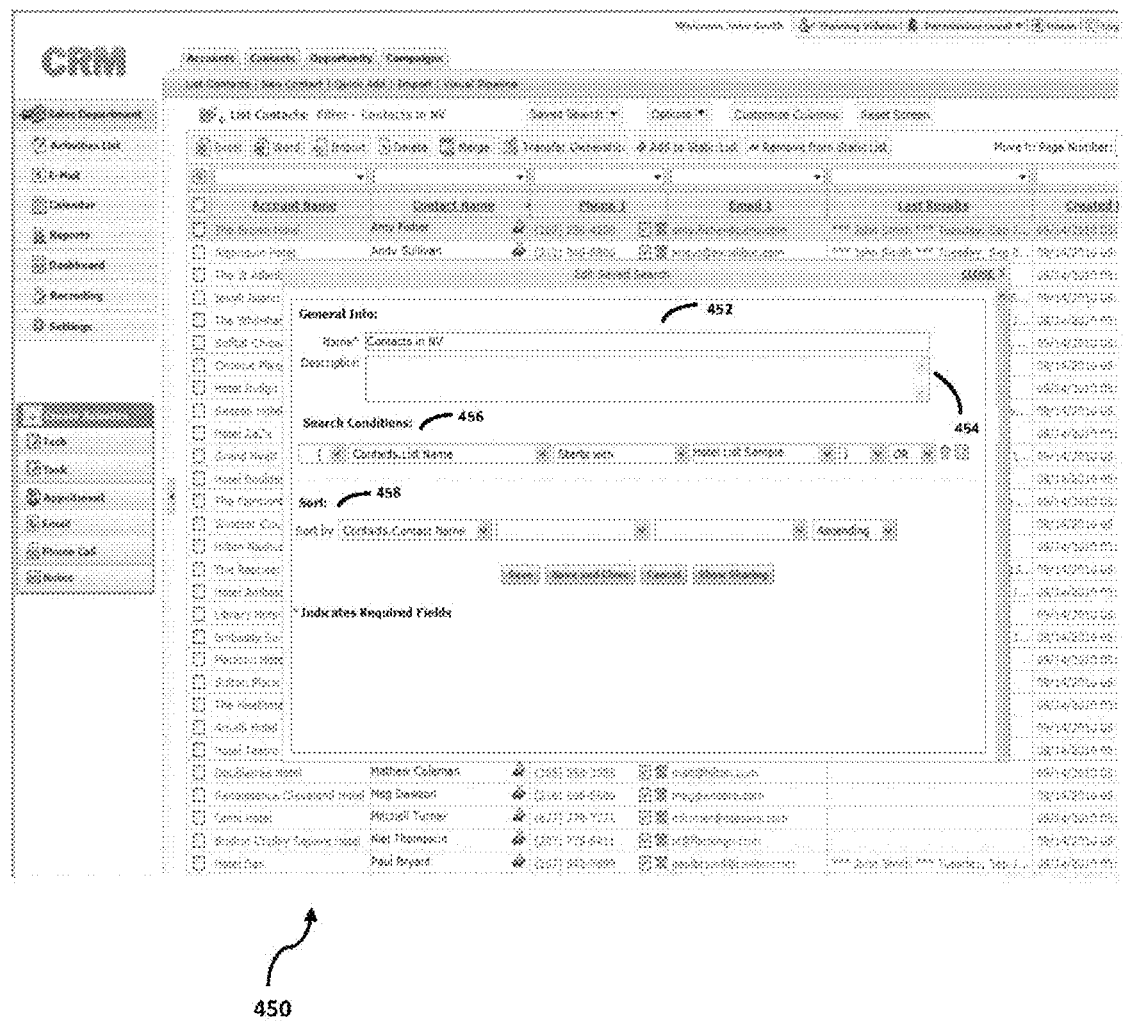
FIG. 4 is an exemplary screen view illustrating an interface for creating a customer list based on specific search criteria, which may be viewed by a party logging into the central data server and selecting to create a customer list.

The customer list may be created by a user of the present system. As an example, a talker may log into the central data server 100 (FIG. 1), via use of the talker computer 24 and associated software, for creating of a customer list. FIG. 4 is an exemplary screen view illustrating an interface 450 for creating a customer list based on specific search criteria, which may be viewed by a party logging into the central data server 100 (FIG. 1) and selecting to create a customer list. As shown by FIG. 4, the interface 450 contains a name field 452 for providing a name for the customer list, a description field 454 for describing the customer list, a search condition field 456 for specifying how to search the customers within the central data server 100 (FIG. 1) in creating the customer list, and a sort field 458 for sorting the resulting customers. It should be noted that there could be more than one search condition field and more than one sort field.

Returning to FIG. 3, as shown by block 406, a campaign may be created. A campaign is created by a user of the central data server 100 (FIG. 1) selecting to create a campaign and the central data server 100 (FIG. 1) creating the campaign after the user has provided specific requested information for creation of the campaign. As an example, the user may be a talker that logs into the central data server 100 (FIG. 1), via use of the talker computer 24 (FIG. 1) and associated software, for creating a campaign. In creating the campaign, dialing agents, talkers, and time slots are selected. A campaign may be created in the system by scheduling specific time with one or more dialing agents to dial a specific customer list, transfer calls to specific talkers, and update the customer information.

Figure 5:
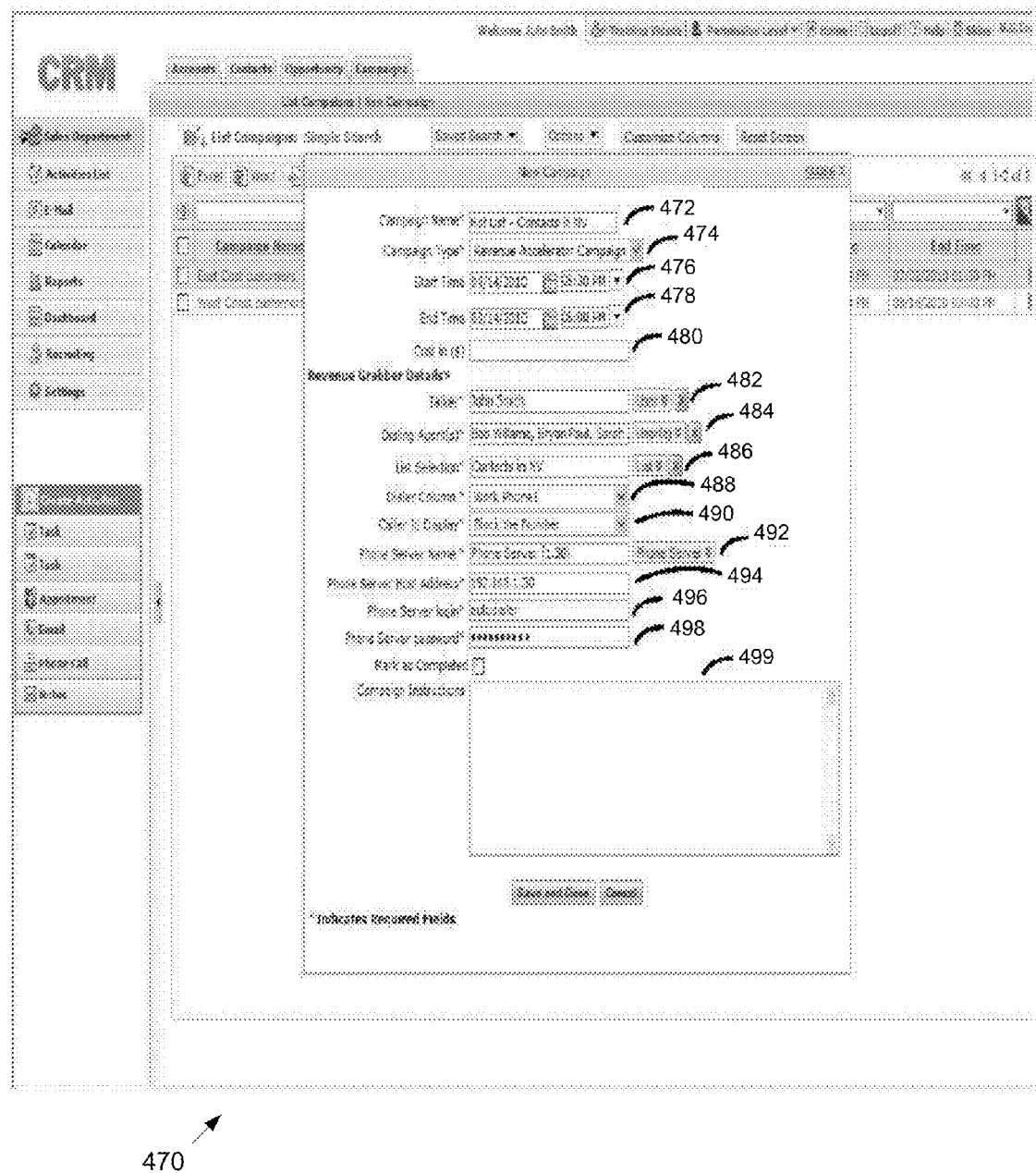
FIG. 5 is an exemplary screen view illustrating an interface for creating and scheduling a campaign specifying one or more talker and one or more dialing agent.

FIG. 5 is an exemplary screen view illustrating an interface 470 for creating and scheduling a campaign specifying one or more talker and one or more dialing agent. As shown by FIG. 5, the interface 470 contains: a campaign name field 472, for identifying the name of the campaign; a campaign type field 474, for identifying the type of campaign for classification and reporting purposes; a start time field 476 for defining the start time of the campaign (date and time in the day); an end time field 478 for defining the end time of the campaign (data and time in the day); a cost field 480 for defining the cost associated with a campaign and tracking the budget against a specific type of campaigns; a talker field 482 for identifying one or more talkers for the campaign; a dialing agent field 484 for identifying one or more dialing agents for the campaign; and, a list selection field 486 for identifying specific predefined lists that may be of interest to the campaign creator (such as the example shown of the contacts in Nevada).

The interface 470 also contains: a dialer column field 488 for defining which column in the customer record should be used to obtain the phone number to dial the customer; a called ID display field 490 for specifying whether or not a specific caller identification should be displayed to the customer during a telephone call; a phone server name field 492 for defining which central voice server should be used for the campaign; a phone server host address field 494 for defining the computer host address (for example not limited to, IP address or hostname within a domain) of the central voice server; a phone server login field 496 for defining a login required for use by the dialing agent and talk to enter a campaign; a phone server password field 498 for use by the dialing agent and talker to enter a campaign; and a campaign instructions field 499 for providing any specific instructions (optional) that could be used by the dialing agents or other users of the system.

It should be noted that when a campaign is created, a talker may specify whether to block or unblock the caller ID when the dialing agent is dialing customers during that campaign. If the caller ID is unblocked the talker is allowed to select a list of caller IDs allocated for that campaign and when a customer is dialed by a dialing agent, the central voice server 150 (FIG. 1) displays a specific caller ID picked from the list of caller IDs selected by the talker for that campaign. It should be noted that based on the implementation preferences, when a customer is dialed the central data server 100 (FIG. 1) may pick such a specific caller ID by using techniques such as, but not limited to, round robin, random selection, or the like and send such caller ID to the central voice server 150 (FIG. 1) directly or indirectly through the dialing agent computer 20 (FIG. 1).

Returning to FIG. 3, as shown by block 408, the central data server 100 (FIG. 1) sends a notification to all parties who are assigned as part of the created campaign. As an example, the central data server 100 (FIG. 1) may transmit electronic mail (email) to each dialing agent and talker identified by the campaign. In addition, a calendar event may be transmitted to each dialing agent and talker identified by the campaign, for populating calendar software on the dialing agent computer 20 (FIG. 1) and talker computer 24 (FIG. 1). It should be noted that the notifications may instead be transmitted to personal devices of the dialing agents and talkers, such as to their cellular telephone or personal data assistant.

In an alternative embodiment of the present invention, a campaign could be created with minimal information to just schedule the time slot for the talker and dialing agents, and the other campaign details (for example but not limited to the customer list, caller id blocking or unblocking, which central voice server to be used) could be finalized just before starting the campaign, if required at all. A person having ordinary skill in the art would know how to modify the interface 470 (FIG. 5) or to divide the interface into multiple interfaces to implement this embodiment. For example, the campaign details that are not captured during the time of campaign creation could be captured using one or more interface screens just before the talker starting the campaign and then the talker may proceed to start the campaign.

Figure 6:
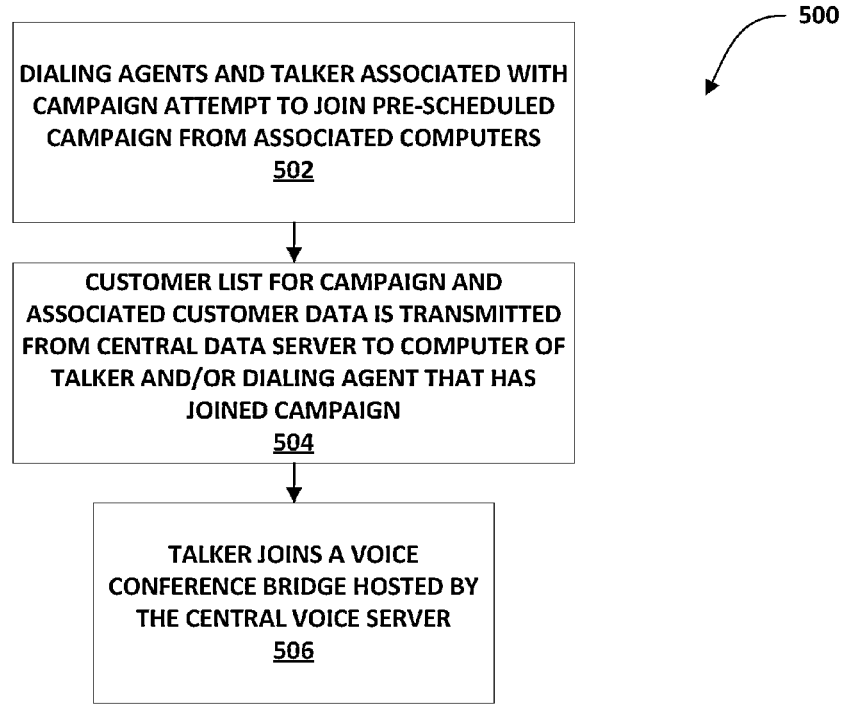
FIG. 6 is a flowchart illustrating a method for joining a campaign, in accordance with the first exemplary embodiment of the present invention.

FIG. 6 is a flowchart 500 illustrating a method for joining a campaign, in accordance with the first exemplary embodiment of the present invention. As shown by block 502, dialing agents and talker associated with a campaign attempt to join a pre-scheduled campaign from their associated computers. Upon the dialing agent attempting to join a specific campaign, the dialing agent computer 20 (FIG. 1, through the dialing agent software) sends a request with the campaign identifier (associated with the specific campaign selected by the dialing agent) to the central data server 100 (FIG. 1) to join the campaign. Upon receiving such request to join the campaign, the central data server 100 (FIG. 1) checks whether the talker has already joined the campaign and, if the talker has not already joined the campaign the dialing agent is forced to wait until the talker joins the campaign and upon the talker joining the campaign the dialing agent is allowed to proceed with joining the campaign. Such mechanism provides flexibility to allow updates to the campaign specific settings (for example, but not limited to, caller ID block or unblock, customer list, etc.) and updates to customer data (attributes of the customer data shown as part of the list such as customer account name, customer contact name, title, phone number, email, address, notes history and the like) until up to the moment prior to the talker joining the campaign.

In an alternative embodiment, based on implementation preferences, if the updates to campaign settings and customer data are allowed only until the campaign is created, the dialing agent may be allowed to join the campaign at any time after the campaign is created and need not be forced to wait until the talker joins the campaign.

Figure 7:
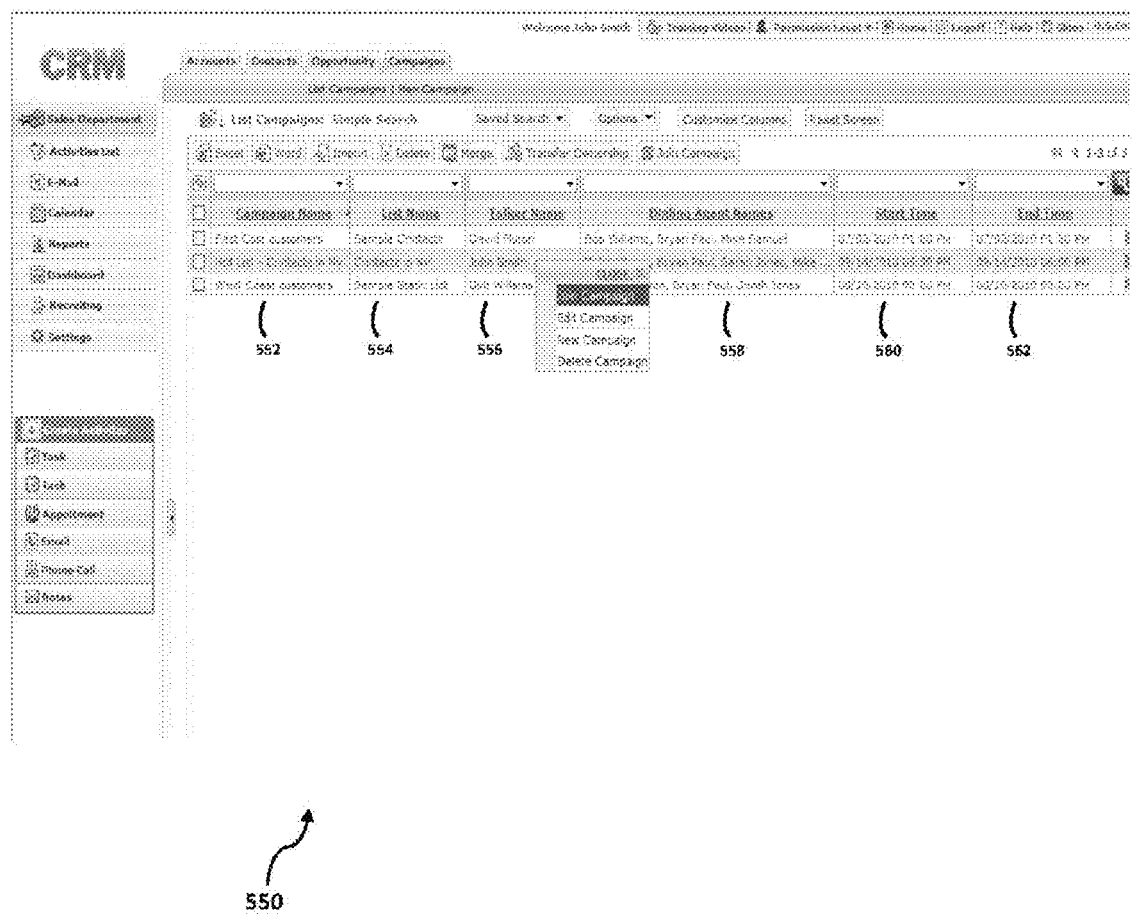
FIG. 7 is an exemplary screen view illustrating an interface for the dialing agent or talker to select and join a campaign.

The time schedule of the campaign could be used to schedule the availability of dialing agents and the talker, and such time schedule may or may not act as a restriction if the campaign is started at a time outside of the pre-scheduled time. FIG. 7 is an exemplary screen view illustrating an interface 550 for the dialing agent or talker to select and attempt to join a campaign. As shown by FIG. 7, the interface 550 contains: a campaign name field 552 for selecting the campaign to join; a list name field 554 for displaying the name of the list selected during creation of the campaign; a talker name field 556 for listing the talker(s) assigned to the campaign; a dialing agent name field 558 for displaying the dialing agent(s) assigned to the campaign; a start time field 560 for displaying the start time of the campaign; and, an end time field 562 for displaying the end time of the campaign.

Based on the implementation preferences, depending upon security level of the dialing agent and/or talker, the dialing agent and/or talker may be allowed to, including but not limited to, choose to join the campaign, edit the campaign, create a new campaign, or delete a campaign. While not required, requiring a login of the dialing agent and/or talker into the present system, via the central data server 100 (FIG. 1) provides for confirmation of identity.

Returning to FIG. 6, when a dialing agent and/or talker has joined the campaign, as shown by block 504, the customer list and associated customer data for the campaign (associated with the campaign identifier received as part of the request sent by dialing agent's computer to join the campaign) is transmitted from the central data server 100 (FIG. 1) to the computer of the dialing agent and/or talker that has joined the campaign. Transmission of the customer list and customer data is performed upon joining of the campaign to ensure that all data required during communication with a customer is located at the dialing agent computer 20 (FIG. 1) and the talker computer 24 (FIG. 1) prior to the dialing agent selecting to place a call to a customer on the customer list. Specifically, in accordance with the present system and method, the dialing agent computer 20 (FIG. 1) and the talker computer 24 (FIG. 1) contain the customer data prior to the dialing agent selecting to place a call.

In a further alternative embodiment, the central data server 100 (FIG. 1) may transmit to a dialing agent computer 20 (FIG. 1) only the portion of the customer data needed to perform the dialing agent's function and may transmit to the talker computer 24 (FIG. 1) only the portion of the customer data needed to perform the talker's function.

In the first exemplary embodiment of the present invention, the customer list and associated customer data may be forwarded at any time prior to beginning of the campaign, as long as the talker has the customer list (in the correct order consistent with the customer list in the dialing agent computer) and customer data on his computer prior to the dialing agent selecting to place a call to a customer.

In another alternative embodiment of the invention, the dialing agent could be allowed to join the campaign prior to, after, or at the same time as when the talker joins the campaign and flexibility could be provided to allow updates to certain portion of the campaign specific settings (for example, but not limited to, caller ID block or unblock, customer list, and other settings) and updates to customer data (attributes of the customer data shown as part of the list such as customer account name, customer contact name, title, phone number, email, address, notes history and the like) until up to the moment that the talker presses a "GO" button viewed by the talker computer 24 after joining the campaign. The foregoing flexibility could be achieved by transmitting the updated portion of the campaign specific settings and customer list (with customer data) from one component of the system 10 (FIG. 1) where an update might be taking place (for example, but not limited to, the talker computer 24 (FIG. 1)) to other components of the system 10 (FIG. 1) that need to know such updates (for example, but not limited to, the dialing agent computer 20 (FIG. 1)) upon the talker pressing the "GO" button.

In another alternative embodiment of the invention, having the dialing agent allowed to join the campaign prior to, after, or at the same time as when talker joins the campaign, flexibility could be provided to allow updates to take place to certain portion of the campaign specific settings and customer data until the time even after the talker has joined the campaign and pressed the "GO" button (that is allowing the updates to take place while the campaign is in progress). The foregoing flexibility could be accomplished by synchronizing the updates taking place in one component of the system 10 (FIG. 1) with the other components that need to know such updates in real time (or near real time) and the behavior of the system 10 (FIG. 1) could be modified in real time (or near real time). For example, while the campaign is in progress, the talker may recognize that a customer is not the correct target upon reviewing that customer record's notes history shown in the talker computer 24 (FIG. 1) and, therefore, the talker would set the do-not-call flag associated with that customer record. Such update is then propagated to the central data server 100 (FIG. 1), which in turn forces the central data server 100 (FIG. 1) not to select that particular customer record for dialing (if that customer record is yet to be dialed). As a way of another example, while the campaign is in progress the talker changes the caller ID for the campaign and such update is propagated to the central voice server 150 (FIG. 1) for use moving forward. It should be noted, based on implementation preferences, such updates may be propagated to the central data server 100 (FIG. 1) to allow central data server 100 (FIG. 1) to have stored therein the updated information for future use.

In another alternative embodiment, the dialing agent may be allowed to join the campaign before, after, or at the same time as, when the talker joins the campaign and the synchronization of updates takes place among different components of the system. Up until the talker presses the "GO" button to start the campaign, the central data server 100 (FIG. 1) may not transmit the customer list to the dialing agent computer 20 (FIG. 1) and the talker computer 24 (FIG. 1). Upon the talker pressing the "GO" button via use of the talker computer 24 (FIG. 1), the central data server 100 (FIG. 1) may select an initial batch of customer records for dialing and transmits such batch to the dialing agent computer 20 (FIG. 1) and the talker computer 24 (FIG. 1). Upon completing the dialing of a portion of the batch, the central data server 100 (FIG. 1) could select the next batch of customer records for dialing and transmit such next batch to the dialing agent computer 20 (FIG. 1) and talker computer 24 (FIG. 1) (and this cycle goes on until the entire customer list is exhausted or the campaign ends). Upon receiving each batch of customer records for dialing, the dialing agent computer 20 (FIG. 1) and talker computer 24 (FIG. 1) may append that batch with the currently shown customer records. Based on implementation preferences, to keep the computer memory utilization low, the previously dialed customer records (that are no longer needed to stay in dialing agent computer 20 (FIG. 1) and/or talker computer 24 (FIG. 1)) associated with previous batches may be removed from the dialing agent computer 20 (FIG. 1) and talker computer 24 (FIG. 1). Each customer record could have associated priority information (located in one or more fields of the customer record) and the central data server 100 (FIG. 1) could use such priority information to decide on, including but not limited to, whether to move up or move down that customer record within the sequence of customer records selected dynamically for dialing through batches, how many times a specific customer record could re-appear allowing that customer record to be called multiple times with a campaign (or within a specific period of time), time gap between two consecutive calls to the same customer record, etc. One having ordinary skill would understand and appreciate that the priority information associated with a customer may be derived from market intelligence pertaining to historical rate of call pickups and any associated trends. Such market intelligence may be derived from various sources, including but not limited to, aggregated call data from the system 10 (FIG. 1) and/or other third party sources. Further, such intelligence may include but not limited to, one or more of the following factors: a customer that belongs to a particular area code or a geographic region, a customer that belongs to a specific industry, persona (related to title, job function, and the like) of the customer, or the like.

Still in accordance with the abovementioned alternative embodiment, based on implementation preferences, it should be noted that new customer records could be inserted and customer data (including but not limited to priority information) could be updated before starting the campaign or while the dialing session is in progress, by any user of the system and the central data server 100 (FIG. 1) may use the updated information as part of the logic used to select the customer records for dialing in the next batch of customer records. Further, the central data server 100 (FIG. 1) may use additional logic to move a particular customer record up or down the sequence of customer records selected dynamically for dialing through batches to make sure that multiple customer records whose calls will be going to the same phone operator are not appearing next to each other in the calling list.

The foregoing flexibility may be required to avoid having multiple dialing agents calling the same phone operator concurrently. The central data server 100 (FIG. 1) may select a customer record for dialing only if the allowed-to-call checkbox is checked. If the allowed-to-call checkbox is checked, the central data server 100 (FIG. 1) may select a customer record only if the current date and time is equal to or after the date and time specified in the "do not call until" field in the customer record. Based on implementation preferences, a variation of the foregoing embodiment could be implemented by having the central data server 100 (FIG. 1) select only one customer record for dialing and transmit to the dialing agent computer 20 (FIG. 1) and talker computer 24 (FIG. 1), upon the dialing agent computer 20 (FIG. 1) requesting the next customer record for dialing.

It should be noted that since the central data server 100 (FIG. 1) is sending each customer record itself only just before dialing, there is no need to send the customer unique ID separately to notify the customer record that is being dialed. If such newly received customer record is appended with other previously received customer records that were previously dialed as initiated by the dialing agent computer 20 (FIG. 1), the newly received customer record that is being dialed may need to be highlighted to show which customer record is currently being dialed. It should be noted that when multiple dialing agents are participating in the campaign there could be multiple customer records that are being dialed concurrently by multiple dialing agents and such multiple customer records that are currently being dialed could be transmitted to a talker computer 24 (FIG. 1) for displaying the customer records. If such newly received customer records are appended with other previously received customer records in the talker computer 24 (FIG. 1), the newly received customer records that are currently being dialed may need to be highlighted to differentiate the customer records that are being dialed from the previously received and previously dialed customer records.

It should be noted that upon the dialing agent transferring a customer call, the associated customer record need to be highlighted differently in the talker computer 24 (FIG. 1) to differentiate the customer record that is transferred versus the customer records that are being dialed. Such notification of customer record whose call is transferred could be accomplished by transmitting the customer unique ID since the associated customer record has been transmitted previously when the dialing of that customer record began. A person having ordinary skill in the art would know the various techniques that could be used within the foregoing embodiment.

One having ordinary skills in the art would understand and appreciate that the "allowed-to-call" and "do not call until" fields in the customer record may be updated easily by the talker (or another person or a module within the present system or a third party system) and which in turn may be used by the system to decide whether to dial that customer or not, at any given time. This embodiment may be extended to have the system 10 (FIG. 1), upon updates to "allowed-to-call" and/or "do not call until" field, automatically do one or more of the following, including but not limited to: (i) create new follow up event/task/appointment with an appropriate date and time; (ii) complete/close appropriate previously created event/task/appointment.

One having ordinary skills in the art would understand and appreciate that whenever the description refers a customer, based on the context, it may refer to one or more records associated with the customer. Further, one having ordinary skills in the art would understand and appreciate that a batch of customer records mean a batch of one or more customer records.

In accordance with an alternative embodiment (referred to herein as the "Push To Call"), after the talker joining the campaign and pressing the "GO" button to start the campaign, instead of having the central data server deciding on the next batch of customer records for calling and sending them to talker and dialing agent(s), the talker is allowed to review the list of customers first and upon the talker acknowledging/selecting that certain customers are ready for calling, the talker computer sends those customer records to the central data server which in turn may send the customer records to one or more dialing agent(s) for calling. One having ordinary skill in the art would understand and appreciate that pressing "GO" button is just one of the ways of starting a campaign and there are many other ways of starting the campaign.

The benefit of the Push To Call embodiment is that the central data server 100 (FIG. 1) does not need to send the customer identification to the talker to identify the customers that are being dialed or scheduled to be called in the near future. Since the talker has reviewed the list of customers and/or the customer information first (before sending them to central data server) the talker already knows which customers will be dialed/called shortly thereafter, there may or may not be a need to identify the customers that are being dialed or scheduled to be called shortly. However, in this embodiment the system may provide the customer identification of the customer that is being transferred to the talker computer. Please note, in the above embodiment, the talker may acknowledge/select one or more customer records, or a batch of customer records, as being ready for calling by using various mechanisms, including but not limited to, (i) clicking a checkbox or an icon in each customer record, (ii) identifying/distinguishing each customer record by highlighting, (iii) circling or changing a border of each customer record, (iv) moving or copying one or more customer records to a different section of the screen, (v) clicking a link or icon located next to a specific customer record to indicate/mark that the customer records contained between the last selected customer for calling and up to the specific customer record next to which the link or icon is clicked now, are ready for calling, (vi) clicking a link or icon or specific location within the computer screen that identifies one end of a specific section of the list of customer records and then clicking a link or icon or specific location within the computer screen that identifies the other end of that specific section of the list of customer records, to indicate that specific section (contained between the two identified records) of the list of customer records is ready for dialing, (vii) pressing a specific computer keyboard key and click the one or more customer records that need to be selected for dialing and then releasing the keyboard key, (viii) or the like.

One with ordinary skill in the art would understand and appreciate that instead of selecting one or more customer record for dialing, techniques similar to the foregoing techniques may be used to deselect one or more customer records from dialing and accordingly the talker computer may transmit notification that enables the central data server to dial only the customer records that are not deselected. Please note, based upon implementation preferences, upon the talker selecting one or more customer records as being ready for calling, the system associated with the Push To Call embodiment may be implemented to have the talker computer distinguish the selected customer records by highlighting differently from the other customer records. The same way, based on implementation preferences if the talker is allowed to deselect one or more customer records from calling, upon the talker deselecting one or more customer records as being not ready for calling, the system associated with the Push To Call embodiment may be implemented to have the talker computer distinguish the deselected customer records by highlighting differently from the other customer records.

Figure 17:
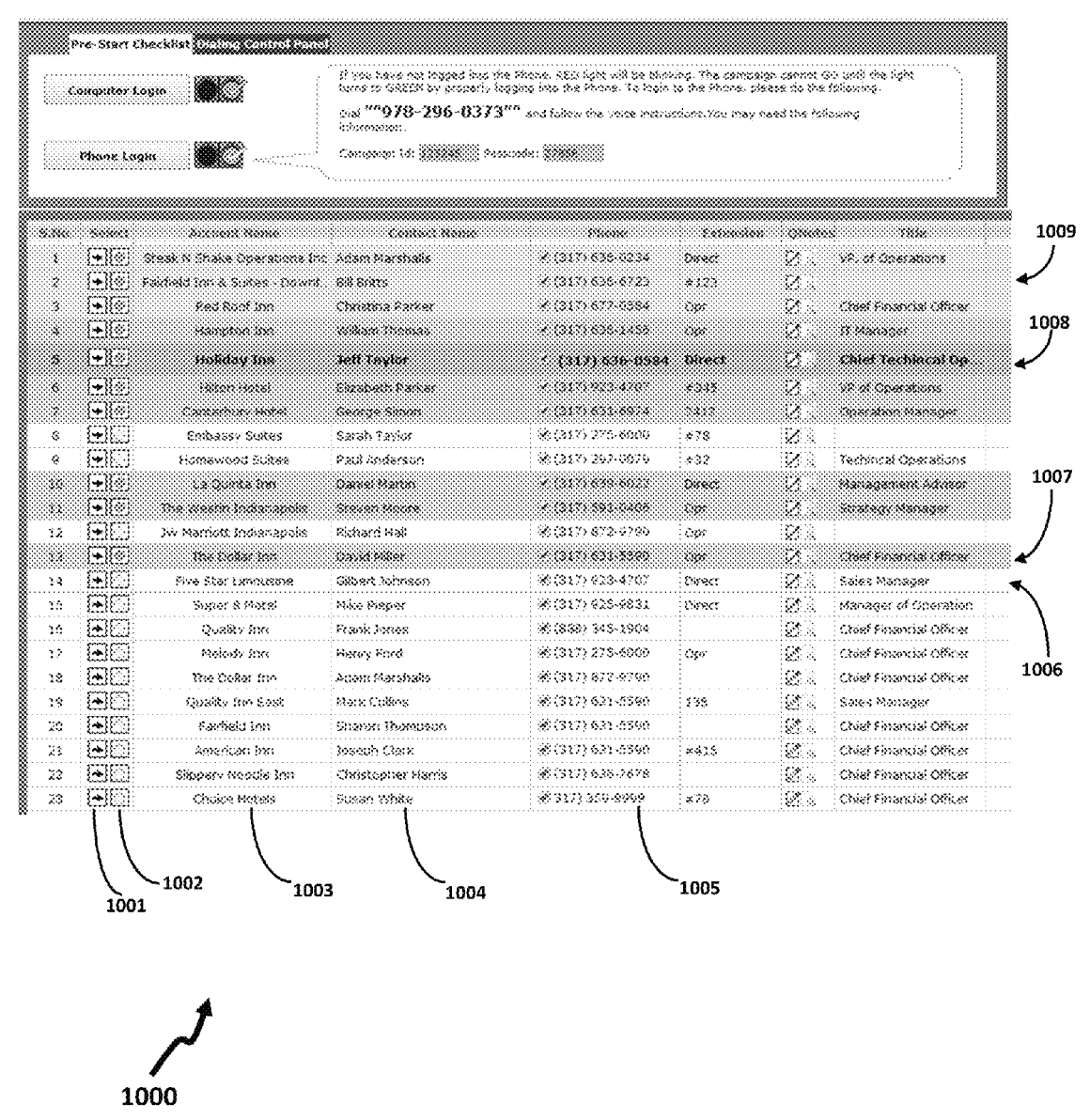

FIG. 17 is an exemplary screen view illustrating an interface 1000 of the foregoing Push To Call embodiment of system 10 (FIG. 1) shown to the talker. As shown in FIG. 17 the interface 1000 contains: a column 1001, for showing an arrow icon which may identify one end of a specific section of the list of customer records selected by talker for calling; a column 1002, for showing a circle icon which may select the customer record associated with the icon for calling upon the talker clicking the icon (and in turn the icon changes from having a circle with no color filled to having a circle grayed out to indicate that the associated record has been selected for calling); a column 1003, for showing the account name/business name associated with each customer; a column 1004, for showing each customer name; and a column 1005, for showing the phone number associated with each customer. Further, as shown in FIG. 17, the customer record that is not selected for dialing is not shaded 1006; the customer record that is selected for dialing is shaded 1007; the customer record that is being transferred is shaded with a darker shade 1008 to differentiate the transferred customer record from the other records; and the customer record that was selected, dialed, but did not result in a transfer is shaded with a lighter shade 1009.

Figure 18:
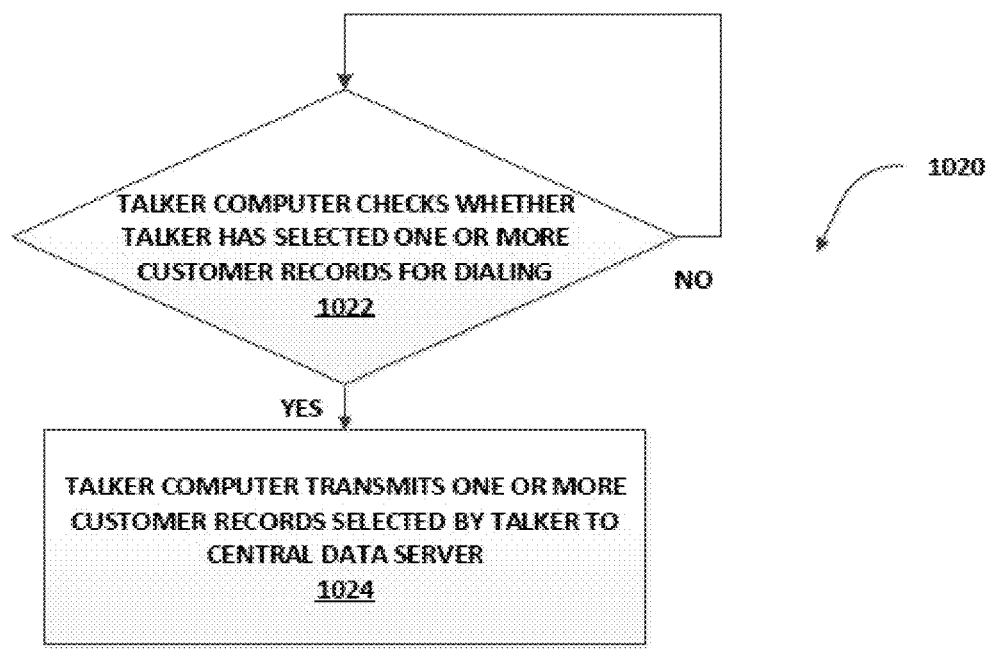
FIG. 18 is a flowchart illustrating actions performed in the talker computer when a talker selects one or more customer records for dialing, in accordance with the Push To Call embodiment.

FIG. 18 is a flowchart 1020 illustrating actions performed in the talker computer when a talker selects one or more customer records for dialing, in accordance with the Push To Call embodiment of the invention. As shown by block 1022, the talker computer checks whether the talker has selected one or more customer records for dialing. As shown by block 1024, upon the talker selecting one or more customer records for dialing, the talker computer transmits the one or more customer records selected by the talker to the central data server. It should be noted that when the talker is not selecting one or more customer records for dialing, the talker computer may wait and then proceed to perform the function shown by block 1022 again and thereby going into a loop. While FIG. 18 is refers to a single talker computer, one having ordinary skill in the art would understand and appreciate that there may be more than one talker computer in the present system, resulting in the steps of FIG. 18 being performed by each talker computer.

Figure 19:
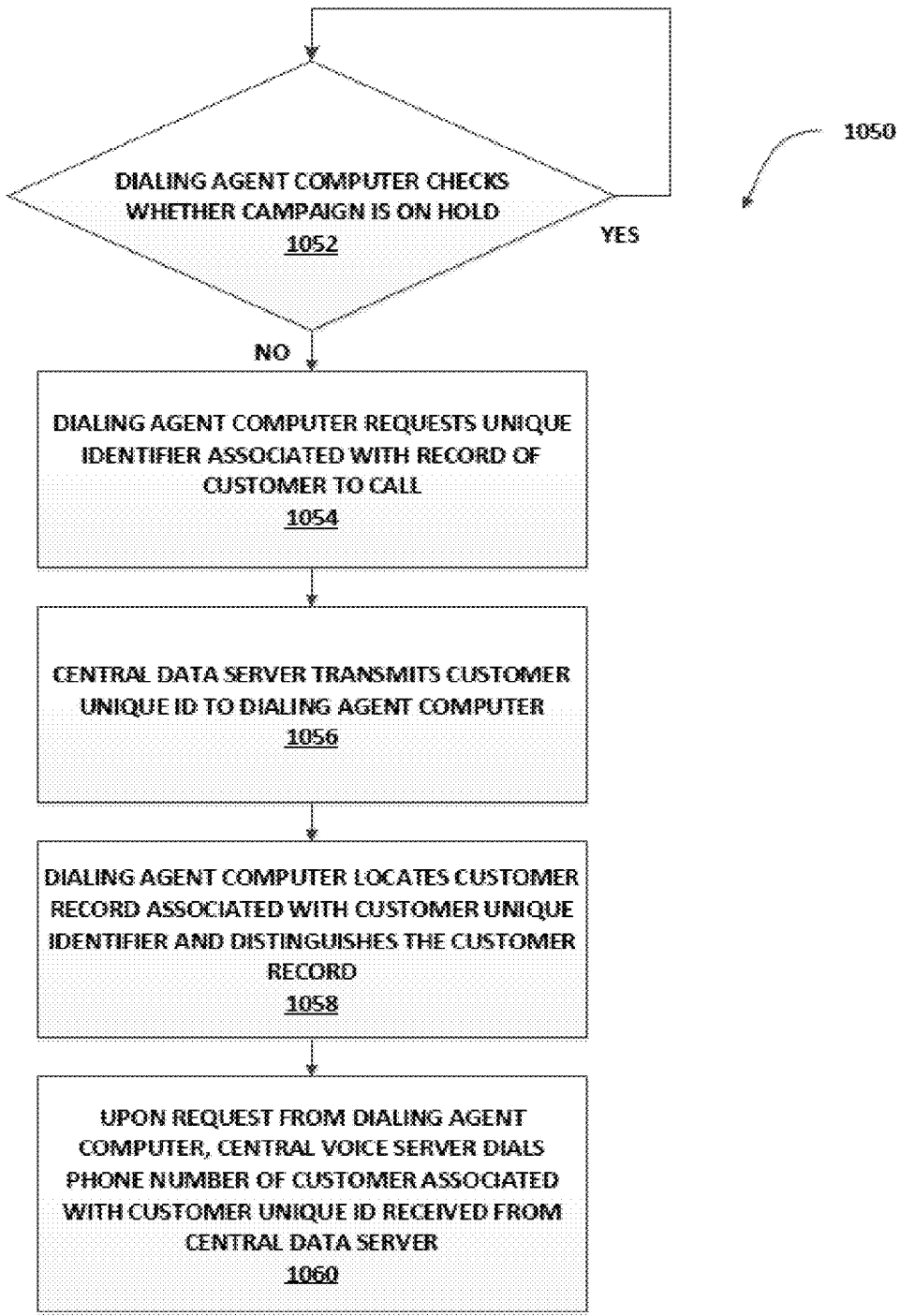
FIG. 19 is a flowchart illustrating actions performed by the system when a dialing agent computer requests a unique identifier associated with a customer record to call, in accordance with the Push To Call embodiment.

FIG. 19 is a flowchart 1050 illustrating actions performed by the system 10 (FIG. 1) when a dialing agent computer requests a unique identifier associated with a customer record to call, in accordance with the Push To Call embodiment of the invention. While FIG. 19 refers to a single dialing agent computer, one having ordinary skill in the art would understand and appreciate that there may be more than one dialing agent computer in the present system, resulting in the steps of FIG. 19 being performed by each dialing agent computer. As shown by block 1052, the dialing agent computer 20 (FIG. 1) checks whether the campaign is on hold; As shown by block 1054, once the campaign is not on hold, the dialing agent computer 20 (FIG. 1), via the dialing agent software, requests from the central data server 100 (FIG. 1) a unique customer identifier associated with the record of a customer to call. It should be noted that when the campaign is on hold, the dialing agent computer may wait and then proceed to perform the function shown by block 1052 again and thereby going into a loop. As shown by block 1056, the central data server 100 (FIG. 1) responds to the dialing agent computer 20 (FIG. 1) by transmitting a customer unique identifier to the dialing agent computer 20 (FIG. 1). As shown by block 1058, the dialing agent computer 20 (FIG. 1) locates the customer record associated with the customer unique identifier and distinguishes the customer record to differentiate from other customer records. As shown by block 1060, upon request from the dialing agent computer 20 (FIG. 1) the central voice server dials the phone number of the customer associated with the customer unique identifier received from the central data server.

One having ordinary skill in the art would understand and appreciate that in the foregoing embodiment, based on implementation preferences, the central data server may maintain a list of selected customer records sent by the talker computer and send one or more customer records to a dialing agent computer upon the dialing agent computer requesting for the next customer record to dial (instead of transmitting the one or more customer records to the dialing agent computer upon receiving such records from the talker computer and transmitting the customer unique identifier upon the dialing agent computer requesting the customer unique identifier associated with the customer record to call).

One having ordinary skill in the art would also understand and appreciate that there may be more than one customer record associated with a customer and any reference to a customer record in such a case may refer to more than one customer record associated with the customer.

One having ordinary skill in the art would understand and appreciate that based on implementation preferences unique customer identifier may be implemented in different ways, for example, the unique customer identifier may be (i) a unique identifier made up of numbers, alphabets, special characters, and the like that uniquely identifies the one or more customer records associated with a customer, or (ii) a portion or whole of the one or more customer records associated with the customer that enables the unique identification of the one or more customer records associated with the customer. However, based on the size of the unique customer identifier the amount of data transmitted between the components of the system 10 (FIG. 1) may be different which in turn may affect the efficiency of the transmission. One having ordinary skill in the art would understand and appreciate that if a unique customer identifier (other than the whole customer record(s) associated with a customer) is transmitted, the customer record(s) associated with the customer with the necessary information is stored in the component of the system 10 (FIG. 1) that receives the unique customer identifier prior to or upon receiving such unique customer identifier. Further, any reference to "unique identifier" or "customer unique identifier" or "unique customer identifier" means the same thing.

The users may interact with the system 10 (FIG. 1) using various input/output mechanisms available now and in the future, including but not limited to keyboard input, mouse clicks, mouse movements, mouse gesture (a way of combining clicks and movements to have the software recognize a specific command), joystick clicks, joystick movements, joystick gesture, touchpad clicks, touchpad gestures, touchpad hotspots, touchscreen clicks, touchscreen gestures, touchscreen hotspots, voice recognition (using audio to recognize a specific command and/or user), camera/sensor to recognize a particular user and/or a pattern of movements or gestures of objects/body parts (for example, including but not limited to, hand, leg, head, face, eye), remote device that allows the user to select one or more items in the system, and the like.

The system 10 (FIG. 1) may be further expanded to interact with human beings by sensing and responding to the analog world using sensors and actuators. Such an expanded functionality may be referred as "Physical Computing" which may be accomplished by the use of software and hardware. For example, upon the transfer of a live customer to the talker in addition to highlighting/distinguishing the customer record associated with the transferred customer in the talker computer and/or playing a beep sound in the talker's conference bridge to highlight the transferred customer's information and get the talker's attention about the transferred call, it may be desirable to notify an external device which may activate a vibration actuator located closer to the talker's body, including but not limited to, a vibration actuator attached in a wrist watch/smart watch, a vibration actuator embedded in a jacket or other clothing accessories worn by the talker, or a vibration actuator attached to the talker's chair. Further, similar to activating the vibration actuator as described above, based on implementation preferences, many other actuators could be activated to get the attention of the talker to respond to the transferred customer call quickly, including but not limited to, turning on a green color light in the vicinity where the talker might be present, or activating a servo motor to move a soft object to touch the talker. Further, using an external device, it might be desirable to deliver audio alert/announcement to remind the talker about the start time of a dialing session approaching, display in a separate display device the number of dials made, number of live customer calls transferred, total dialing session time, and other relevant information to get attention from the talker (or other personnel that may need to pay attention) to the metrics associated with a dialing session, and the like.

It should be noted that the external device may be a microcontroller or a computer or a hardware device or the like that translates analog or digital input to an output that activates electro-mechanical devices such as motors, servos, LEDs, lighting, other hardware, or another computer or the like. Such an external device (outside of the system 10 (FIG. 1)) is referred to herein as the "External Device". Based on the implementation preferences, a notification to External Device may be transmitted from the talker computer or one or more other components of the system 10 (FIG. 1) like the central data server, and the connectivity between the External Device and one or more components of the system may be a wired connection or wireless connection. Further, an External Device may be implemented to accept voice commands from the talker or dialing agent (or another authorized user of the system) and perform various functions, including but not limited to scheduling a dialing session for the talker, starting a dialing session, pausing a dialing session, ending a dialing session, or the like. It should be noted that the functions performed by an External Device may be implemented as part of the one or components of the system, for example, functions performed by an External Device attached to a talker computer may be implemented as part of the talker computer by itself. One having ordinary skill in the art would understand and appreciate that there are many ways to extend the system 10 (FIG. 1) to interact with the physical world.

Returning to the first exemplary embodiment of the invention, as shown in FIG. 1, the customer list associated with the particular campaign may be displayed in a tabular list on the computer 20 of each dialing agent associated with the campaign and on the computer 24 of the talker associated with the campaign. It should be noted that the list need not be tabular.

Figure 8:
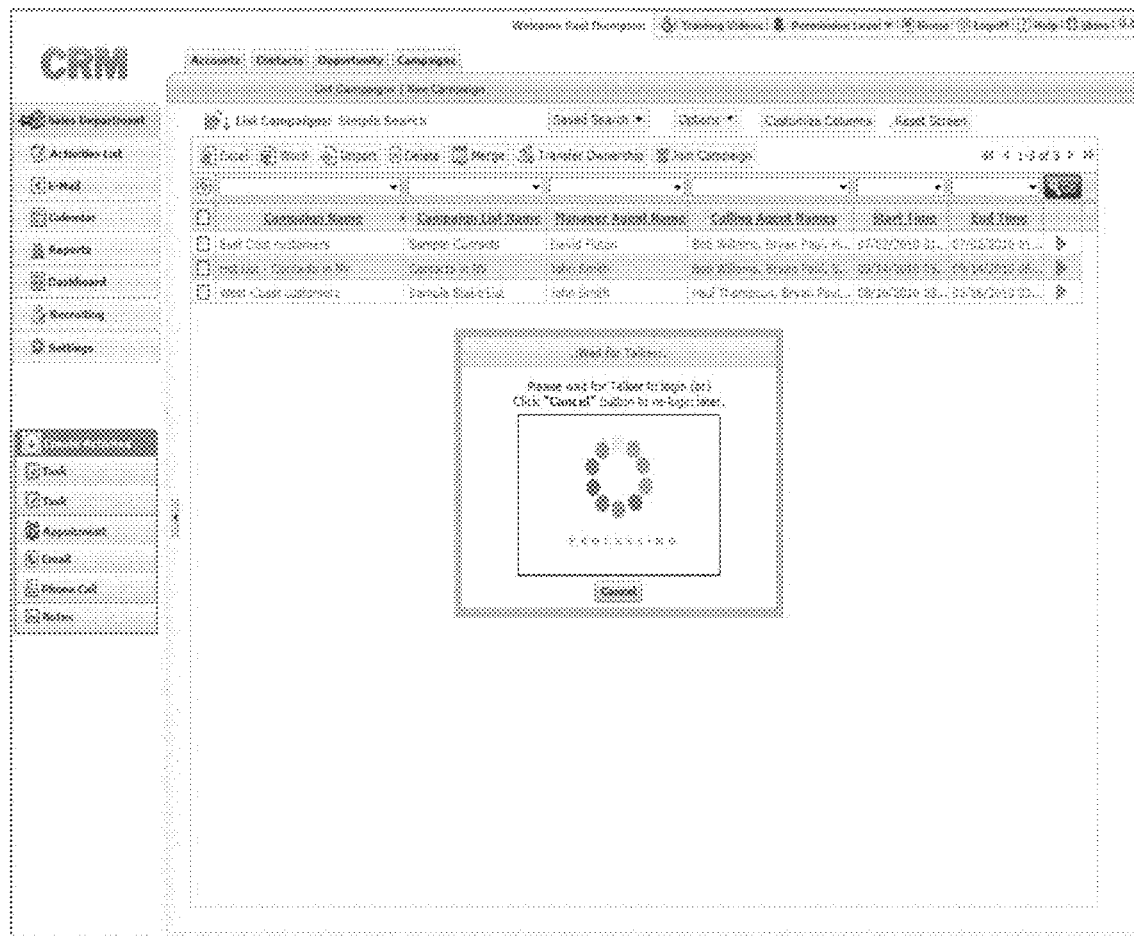
FIG. 8 is an example of a screen view illustrating an interface provided to a dialing agent while the dialing agent is attempting to join a campaign, where the dialing agent is forced to wait until the talker joins the campaign.

FIG. 8 is an example of a screen view illustrating an interface 590 provided to a dialing agent while the dialing agent is attempting to join a campaign, where the dialing agent is forced to wait until the talker joins the campaign. Alternatively, if the talker has joined the campaign, the dialing agents are allowed to join the campaign. This is assuming that there is only one talker and one or more dialing agent, however, it is noted that the present system and method may have one or more dialing agent and one or more talker in a campaign.

As shown by block 506, after joining the campaign through the talker computer 24, the talker joins a voice conference bridge hosted in the central voice server 150 by having the central voice server 150 call the phone number of the talker telephone 26 or by the talker manually calling the conference bridge phone number via use of the talker telephone 26. Upon joining the voice conference bridge, the talker may be listening to on hold music played in the conference bridge or the talker may simply be placed on hold.

Figure 9:
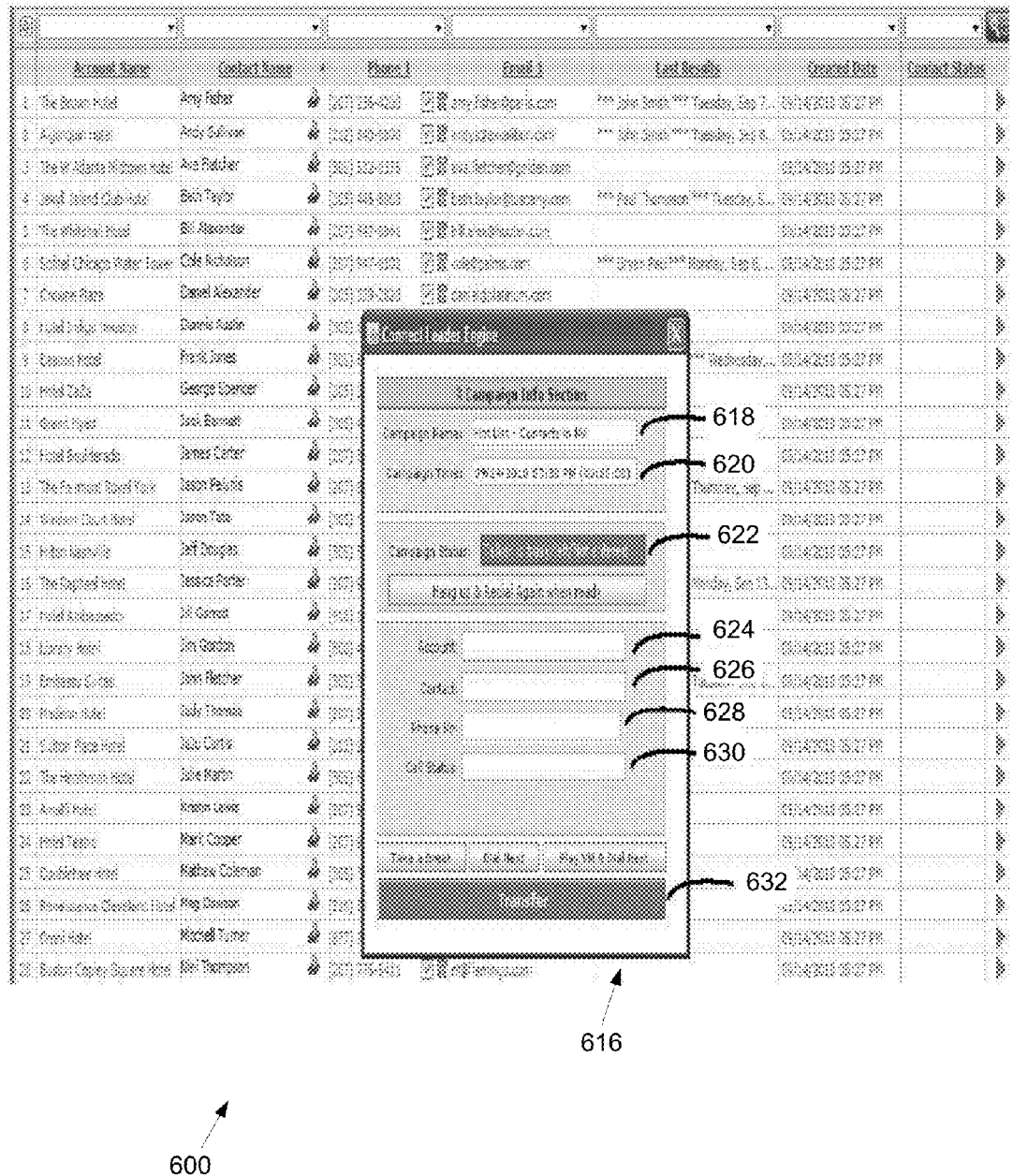
FIG. 9 is an example of a screen view illustrating an interface provided to a dialing agent after the talker joins the campaign.

FIG. 9 is an example of a screen view illustrating an interface 600 provided to a dialing agent after the dialing agent joining the campaign. As shown by FIG. 9, the interface 600 provides a view of the customer list associated with the campaign. Fields of the customer list include an account name field 602, a contact name field 604, a phone number field 606, an email field 608, a last result field 610 for identifying results of the last call and notes history, a created date field 612, and a contact status field 614 for keeping track of the status (for example, but not limited to, the sales status such as "interested to see demo", "proposal sent", "contract signed", etc.). It is noted that the customer list and customer data are located on the dialing agent computer 20 (FIG. 1) prior to initiating customer dialing.

The interface 600 also contains a current status window 616 for identifying a current status of the campaign to the dialing agent. The current status window 616 contains: a campaign name field 618, which displays the name of the campaign that the dialing agent is assigned to; a campaign time field 620 for displaying the time at which the campaign is scheduled to begin; and a campaign status field 622 for displaying whether the campaign is ready to begin, if the campaign is not ready to begin, or if the campaign is on hold, such as due to the talker being busy, the talker having left the conference bridge, due to the talker not yet having entered the conference bridge, or due to the talker yet to press the "GO" button viewed by the talker computer 24 (FIG. 1) to start the campaign. The current status window 616 also contains: an account field 624 for listing the account name for the record currently being transferred; a contact field 626 for listing the contact currently being transferred; a phone number field 628 for listing the phone number of the contact currently being transferred; and, a call status field 630 for listing the current call status. The current status window 616 also contains a transfer button 632 for allowing the dialing agent to transfer a call to a talker, as is described in further detail below.

Figure 10:
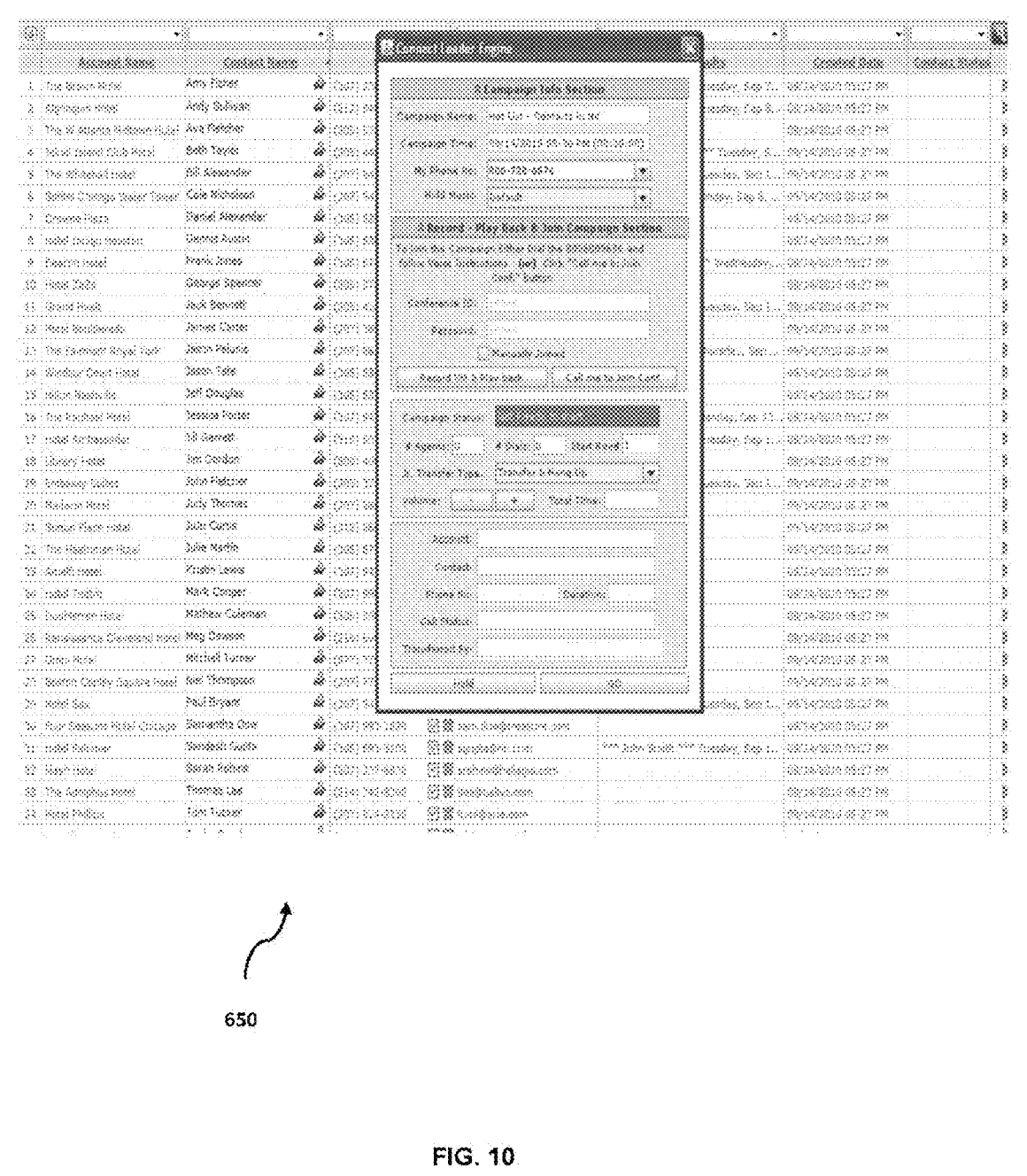
Figure 11:
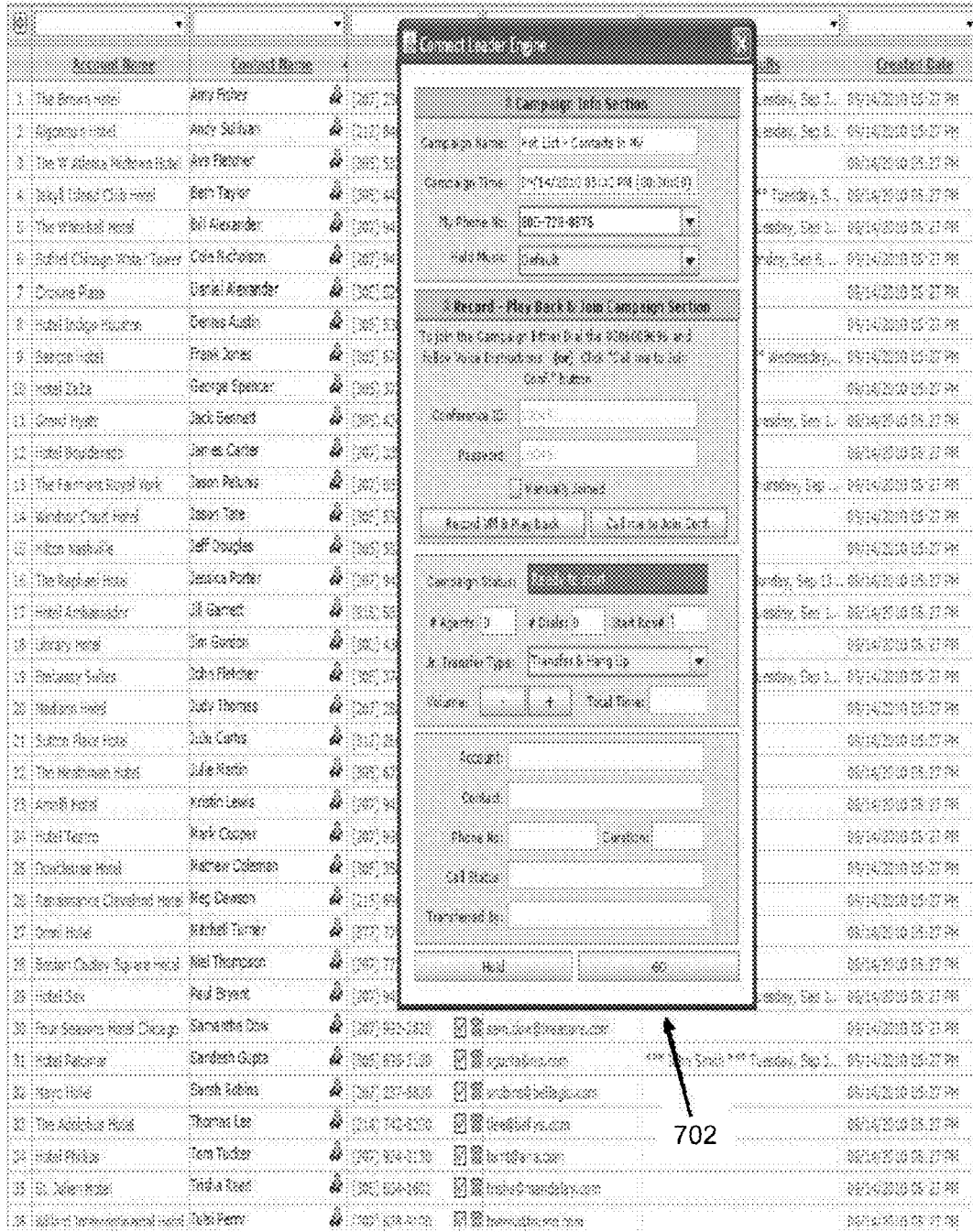
FIG. 11 is an example of a screen view illustrating an interface provided to a talker after the talker joins a campaign using the talker computer, and after the talker has joined the voice conference bridge using the talker telephone.

FIG. 10 is an example of a screen view illustrating an interface 650 provided to a talker after the talker joins a campaign using the talker computer 24 (FIG. 1), but where the talker is yet to join the voice conference bridge using the talker telephone 26 (FIG. 1). The interface 650 shows various fields (including but not limited to campaign name, campaign start time, campaign status, conference bridge phone number, conference bridge ID, password, number of dialing agents who joined the campaign, number of customer records dialed so far, number of customer calls transferred so far, currently transferred customer record fields, etc.) that are appropriate for the talker. In addition, FIG. 11 is an example of a screen view illustrating an interface 700 provided to a talker after the talker joins a campaign using the talker computer 24 (FIG. 1), and after the talker has joined the voice conference bridge using the talker telephone 26 (FIG. 1). As shown by FIG. 11, a status window 702 of the interface 700 displays the status of the system 10 as ready to start. It should be noted that based on implementation preferences, the status window 702 could be implemented as a part of the window where the customer list with customer data is shown.

In accordance with the first exemplary embodiment, the campaign becomes ready to start when the following conditions are met: i) the talker joins the campaign through the talker computer 24 (FIG. 1); ii) the talker is connected to the voice conference bridge through the talker telephone 26 (FIG. 1); and, iii) one or more dialing agents join the campaign through their computers and are ready to dial customers.

Figure 12:
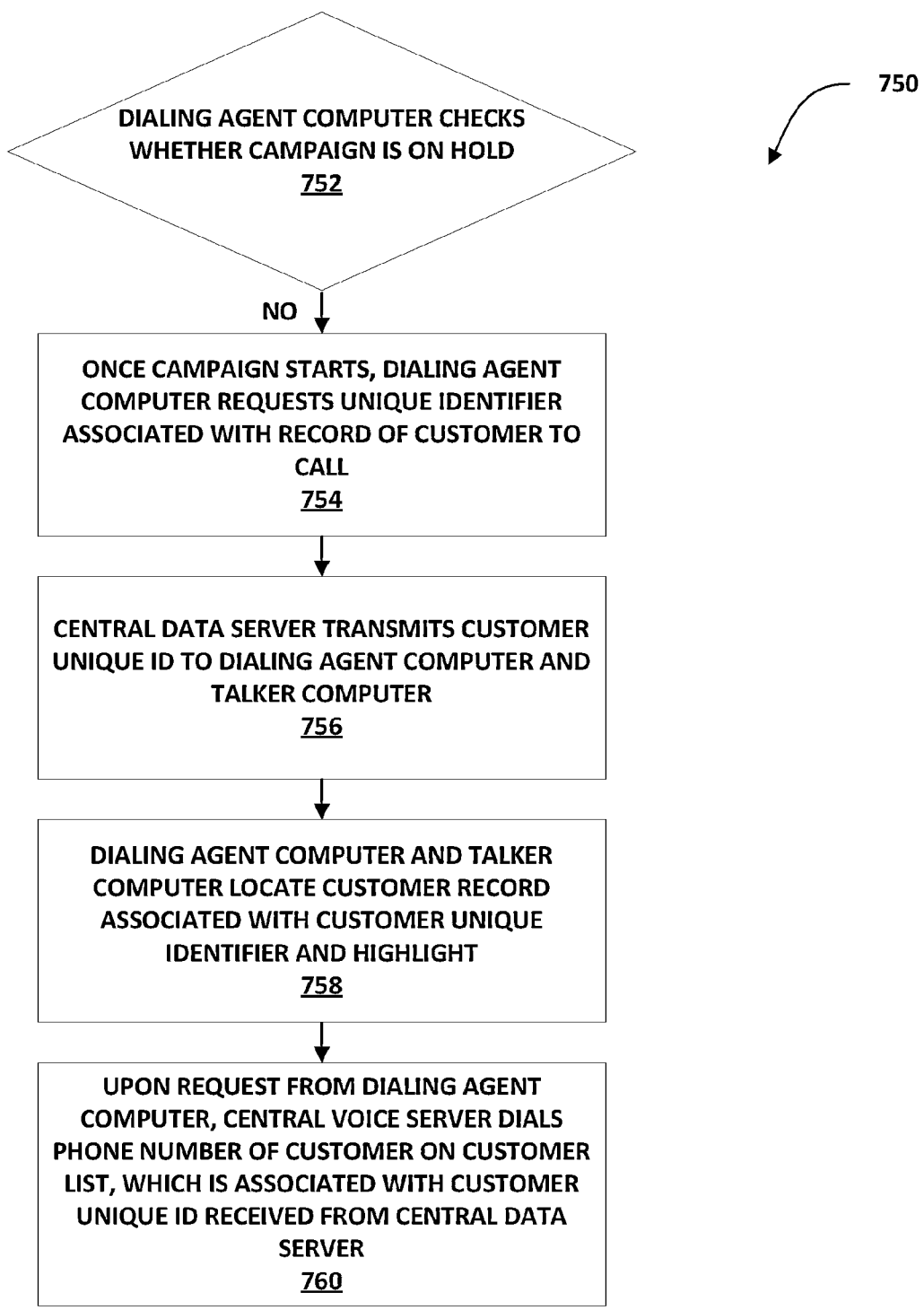
FIG. 12 is a flowchart illustrating actions initiated and performed during initiation of a campaign, in accordance with the first exemplary embodiment of the present invention.

FIG. 12 is a flowchart 750 illustrating actions initiated and performed during initiation of a campaign. While FIG. 12 is provided with regard to a single dialing agent, one having ordinary skill in the art would understand and appreciate that there may be more than one dialing agent in the present system, resulting in the steps of FIG. 12 being performed by each dialing agent. As shown by block 752, the dialing agent computer 20 (FIG. 1) checks whether the campaign is on hold. Though the campaign is ready to start, the campaign may remain on hold until the talker presses a "Go" button, or performs another step to show that the talker is ready for the campaign to begin. If the talker prefers, before starting the campaign by pressing the "Go" button, the talker may pre-record a voice message by pressing a button provided by the talker software located on the talker computer 24 (FIG. 1), and requesting one or more dialing agent to play a pre-recorded voice message of the talker whenever the dialing agent encounters a voice mail of the customer as a result of the customer call going to the customer's voice mail.

As shown by block 754, once the campaign starts, meaning that the campaign is not on hold, the dialing agent computer 20 (FIG. 1), via the dialing agent software, requests from the central data server 100 (FIG. 1) a unique identifier associated with the record of a specific customer to call. Though the dialing agent is referred here in singular term in order to simplify the description, there could be multiple dialing agents joining the campaign and performing the actions associated with the dialing agent.

As shown by block 756, the central data server 100 (FIG. 1) responds to the dialing agent computer 20 (FIG. 1) by transmitting a customer unique identifier to the dialing agent computer 20 (FIG. 1) and concurrently the central data server 100 (FIG. 1) transmits the same customer unique identifier to the talker computer 24 (FIG. 1). The customer unique identifier is specifically designed to be very short in size. For example, the customer unique identifier could be just a row identifier starting from 1 to n (where 'n' is the maximum number of records shown by the customer list).

In an embodiment having multiple dialing agents, to avoid conflicts, the central data server 100 (FIG. 1) assigns different records in the customer list to different dialing agents. The customer record dialed by the dialing agent is highlighted on the computer screen of the dialing agent as well as the computer screen of the talker.

As shown by block 758, the dialing agent computer 20 (FIG. 1), via the dialing agent software, locates the customer record associated with the customer unique identifier received from the central data server 100 (FIG. 1), in the customer list, and highlights that customer record in the tabular list on the screen associated with the dialing agent computer 20 (FIG. 1), which is viewed by the dialing agent. Concurrently, the talker computer 24 (FIG. 1), via the talker computer software, locates the same customer record and highlights that customer record in the tabular list on the screen associated with the talker computer 24 (FIG. 1), which is viewed by the talker.

At any given time, if more than one dialing agent is dialing the customer records in the customer list, all such customer records dialed by different dialing agents are highlighted in the tabular list on the computer screen of the talker. It should be noted that the customer list may or may not be displayed in a tabular list format on the dialing agent computer 20 (FIG. 1) or the talker computer 24 (FIG. 1). The talker could review the notes history of customers that are being dialed and get ready to handle the transferred customer call. By following this sequence, the talker is capable of reviewing customer data and being prepared for a transferred customer call prior to receiving the customer call (described herein below). In this manner a meaningful conversation between the taker and the customer may begin right away with transfer of the customer call to the talker, since the talker has previously received and reviewed the customer data well in advance of the call transfer, as was aware of the customer records being dialed. Based on the implementation preferences, it should be noted that certain portions of the customer data that the talker needs to review could be readily shown in the talker computer and additional portion of the customer data could be fetched from a database and shown to the talker upon the talker requesting such portion of data by clicking specific icons or buttons or links. In accordance with the first exemplary embodiment of the present invention, if time permits, the talker could also review the notes history of customers in the list who will be dialed in the near future.

Instead of transferring customer data with a call transfer, as performed by prior systems, the present system and method transfers unique identifiers for highlighting records presently being called and highlighting calls being transferred to the talker, where customers presently being called are highlighted different from customers being transferred to the talker. The process for transferring unique identifiers and highlighting is described in additional detail below.

As shown by block 760, upon request from the dialing agent computer 20 (FIG. 1) to start dialing a specific customer phone number (associated with the unique customer identifier received from the central data server), the central voice server 150 (FIG. 1) starts dialing that phone number. It should be noted that the objective of the function shown by block 760 is to establish a call between the dialing agent and customer. The dialing agent uses his/her telephone 22 (FIG. 1) to navigate the phone menus, interactive voice response systems, wrong phone numbers, phone operators, and the like to reach the correct customer. Based on implementation preferences, the dialing agent computer could send a dial request directly to the central voice server 150 (FIG. 1) or indirectly to the central voice server 150 (FIG. 1) through the central data server 100 (FIG. 1). In accordance with the first exemplary embodiment, the dialing agent has not previously joined a voice conference bridge hosted in the central voice server 150 (FIG. 1). When the dialing agent computer 20 (FIG. 1) requests the central voice server 150 (FIG. 1) to start dialing a specific customer phone number (associated with the unique customer ID), the central voice server 150 (FIG. 1) starts dialing the dialing agent telephone 22 (FIG. 1) and upon the dialing agent answering the dialing agent telephone 22 (FIG. 1) the central voice server 150 (FIG. 1) proceeds to start dialing the customer phone and bridges the customer call with dialing agent. It should be noted that based on the implementation preferences, the dialing agent telephone 22 (FIG. 1) could be configured to answer automatically (sometimes referred as "auto answering") when the call is made by the central voice server 150 (FIG. 1) and in which case the dialing agent telephone 22 (FIG. 1) automatically answers without having the dialing agent answer.

In an alternative embodiment in accordance with the present invention, after the dialing agent joins the campaign through the dialing agent computer 20 (FIG. 1), the dialing agent joins a voice conference bridge hosted in the central voice server 150 (FIG. 1) by having the central voice server 150 (FIG. 1) call the phone number of the dialing agent telephone 22 (FIG. 1) or by the dialing agent manually calling the conference bridge phone number via use of the dialing agent telephone 22 (FIG. 1). Upon joining the voice conference bridge, the talker may be listening to on hold music played in the conference bridge or the dialing agent may be simply placed on hold. In the foregoing embodiment, when the dialing agent computer 20 (FIG. 1) requests the central voice server 150 (FIG. 1) to start dialing a specific customer phone number (associated with the unique customer ID), the central voice server 150 (FIG. 1) starts dialing the customer phone number and bridges the customer call with the dialing agent waiting in the conference bridge. One having ordinary skill in the art would know the various techniques that could be used to accomplish the function depicted by block 760.

In an alternative embodiment, the function depicted by block 760 could be implemented by having the central data server 100 (FIG. 1) make a request to the central voice server 150 (FIG. 1) to dial the customer phone number (associated with the customer unique identifier) concurrently when the central data server 100 (FIG. 1) transmits the customer unique identifier to the dialing agent computer 20 (FIG. 1) and the talker computer 24 (FIG. 1) as shown by block 756, thereby eliminating the need to have the dialing agent make a request to dial the customer record as shown by the block 760.

In an alternative embodiment, when calling a customer the caller ID displayed could be dynamically customized based on the attributes of the customer phone number. For example but not limited to, based on the geographical area code of the customer phone number the caller ID could be a phone number that belongs to the same area code as the customer area code or an area code closer to the customer's area code.

Figure 13:
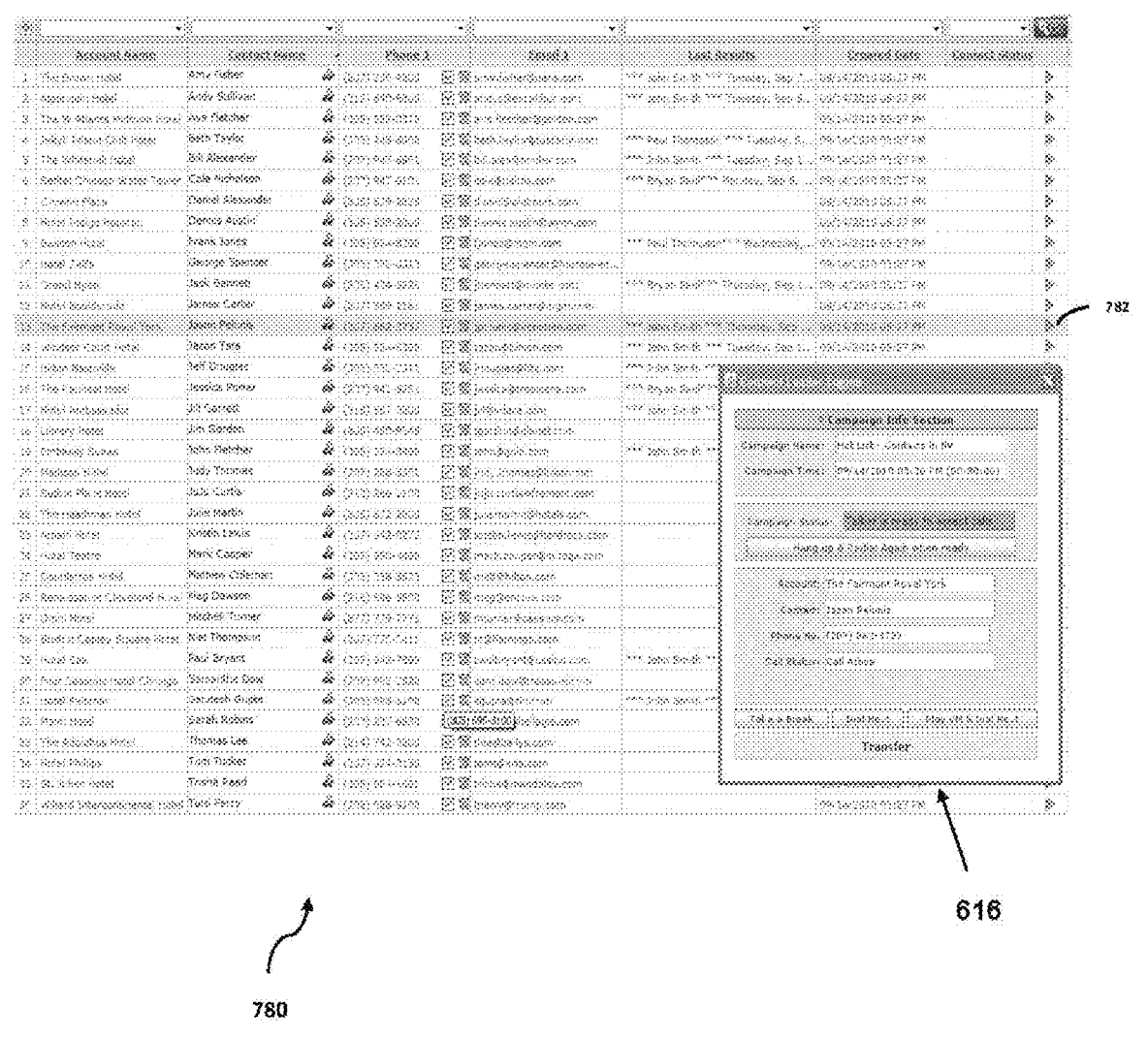

FIG. 13 is an example of a screen view illustrating an interface 780 provided to a dialing agent during the dialing of a customer. As shown by FIG. 13, the customer record of the customer currently being dialed is highlighted 782 so that the dialing agent is aware of which customer is currently being dialed. In addition, an interface window 784 is provided for providing the dialing agent with a status of the current call and for allowing the dialing agent to provide instructions to the dialing agent computer 20 (FIG. 1). As shown by FIG. 13, the interface window 784 displays the campaign name, campaign time, campaign status, account name, contact, phone number, and call status for the current call. Options to hang up, take a break, and dial the next number are provided to the dialing agent. In addition, an option is provided on the interface window 784 to play a voice message (pre-recorded voice message of the talker that could be played whenever the dialing agent encounters a voice mail of the customer as a result of the customer call going to the customer's voice mail). Further, an option is provided on the interface window 784 to transfer a call to the talker.

Each dialing agent may take a break by clicking a "Take a break" button, in which case the dialing agent software pauses, allowing the dialing agent to take a break until the "Resume" button is clicked. It should be noted that upon clicking the "Take a break" button if there is a customer call already in progress it may not be appropriate to hang up that call and instead the dialing agent may continue to complete such call using the dialing agent telephone 22 (FIG. 1) and then proceed to take the break. The talker may take a break by pressing the "Hold" button, in which case the talker computer 24 (FIG. 1) requests the central data server 100 (FIG. 1) to put the campaign on hold and the central data server 100 (FIG. 1) puts the campaign on hold allowing the talker to take a break until the "Go" button is pressed. After the campaign goes on hold; i) dialing agents are not allowed to transfer any more calls to the talker and any previously initiated calls should be handled by dialing agents by performing certain pre-defined tasks (hang up, hang up now and redial when the campaign resumes, follow pre-defined script and the like); and, ii) dialing agents are not allowed to initiate new calls. A person having ordinary skill in the art would know that in an alternative embodiment having multiple talkers, when a talker requests to take a break by pressing the "Hold" button, only that particular talker could be given a break (that is, that particular talker is not ready to take the transferred customer call) and the campaign could continue if at least one other talker is ready to take the transferred customer call. The campaign may not be put on hold as long as at least one talker is ready to take the transferred customer call.

Figure 14:
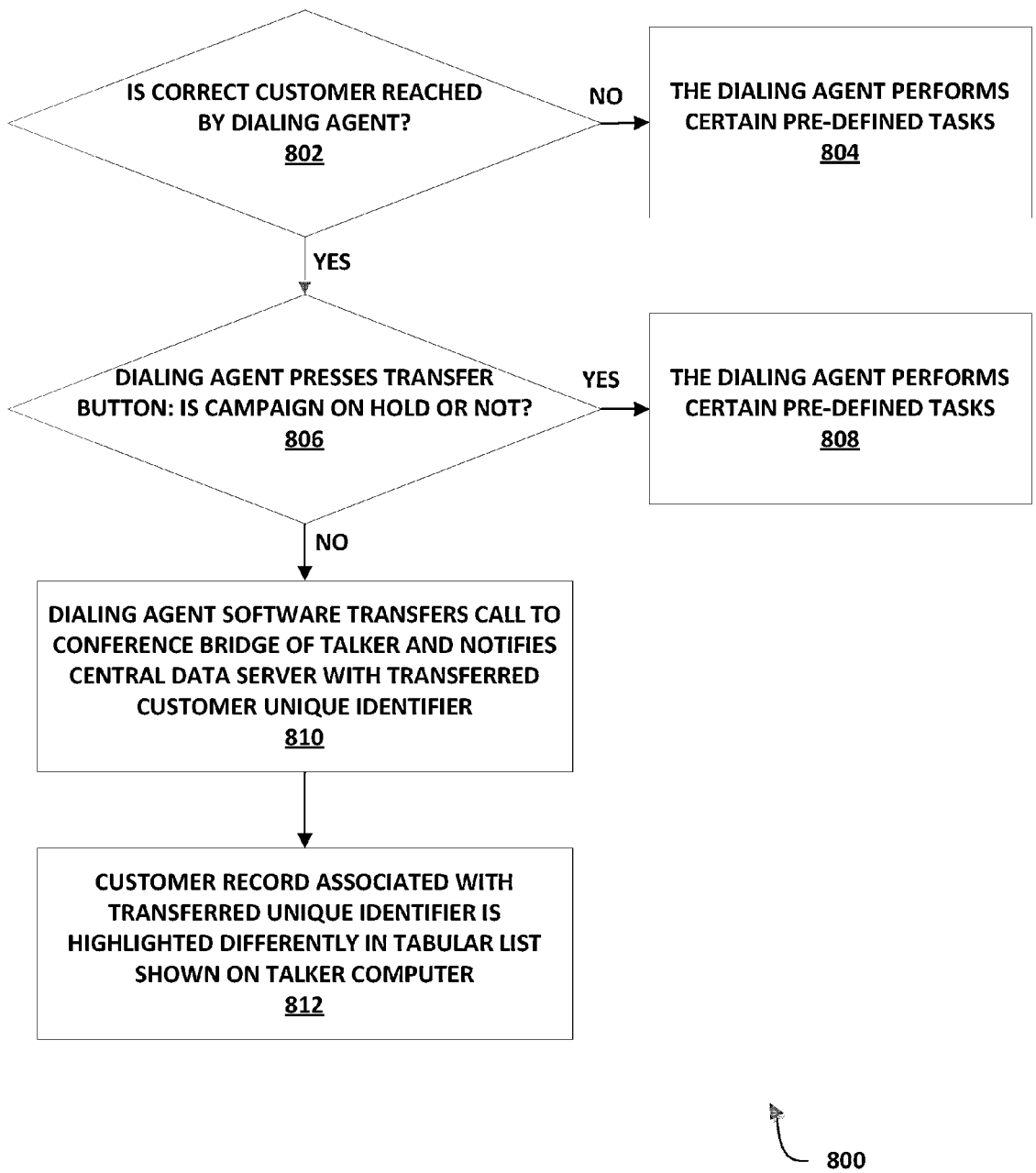
FIG. 14 is a flowchart illustrating a process of handling a call after dialing by the central voice server, in accordance with the first exemplary embodiment of the present invention.

FIG. 14 is a flowchart 800 illustrating a process of handling a call after dialing by the central voice server 150. As shown by block 802, the dialing agent determines whether the correct customer is reached by recognizing live customer voice in the phone call. Based on the implementation of voice recognition technology, the dialing agent may perform the foregoing determination with or without the help of voice recognition technology.

As shown by block 804, upon determining that the correct customer could not be reached, the dialing agent performs certain pre-defined tasks, such as, for example, but not limited to, playing a pre-recorded voice message recorded by the talker previously (if the customer call results in a customer voicemail) or leaving a voice message using the voice of the dialing agent (if the customer call results in a customer voicemail), entering notes against the customer record, and the like.

As shown by block 806, upon determining that the correct customer is reached (by recognizing live customer voice in the phone call), the dialing agent presses the transfer button provided by the dialing agent software, within the interface window 784, and the campaign status is determined to know whether the campaign is on hold or not. The campaign will go on hold for various reasons such as when the talker is busy talking to another customer, when the talker has left the system, and the like. When the campaign is on hold, the customer call cannot be transferred since there is no talker available to talk to the customer. It should be noted that the central data server 100 may keep checking the campaign status continuously and keep updating the campaign status on the screen of the dialing agent. Checking the campaign status may take place by the software of the central data server 100 (FIG. 1) by continuously monitoring (in short time intervals) to know whether the talker is ready to take the customer call (for example but not limited to, by checking whether the talker is still waiting in the conference bridge and by checking whether the talker computer 24 (FIG. 1) is in continuous communication with the central data server 100 (FIG. 1)). Campaign status information is also proactively maintained. Such campaign status information could be used to take actions proactively in the system, for example but not limited to, the action described in the succeeding sentence.

Before attempting to transfer the call, if the dialing agent sees the campaign status as being on hold, the dialing agent need not attempt to press the transfer button provided by the dialing agent software and instead proceeds to the step shown by block 808. As shown by block 808, upon determining that the campaign is on hold, the dialing agent performs certain pre-defined tasks such as talking to the customer and scheduling an appointment for the talker and the customer to connect later, and the like.

As shown by block 810, upon determining that the campaign is not on hold, the dialing agent software transfers the call to the conference bridge of the talker and notifies the central data server 100 (FIG. 1) with the transferred customer unique identifier. Simultaneously, when the call is transferred, the central data server 100 (FIG. 1) puts the campaign on hold to make sure that another dialing agent cannot transfer another customer to the talker.

Based on implementation preferences, the call transfer function illustrated by block 810 could be implemented by having the dialing agent software send a transfer command directly to the central voice server 150 (FIG. 1) or indirectly to the central voice server 150 (FIG. 1) through the central data server 100 (FIG. 1). In an embodiment where the dialing agent computer 20 (FIG. 1) sends the customer call transfer request indirectly to the central voice server 150 (FIG. 1) through the central data server 100 (FIG. 1), the dialing agent computer 20 (FIG. 1) could send a request to the central data server 100 (FIG. 1) to transfer the customer call. Upon receiving such request, the central data server 100 (FIG. 1) could check whether the campaign is on hold, upon determining that the campaign not on hold, the central data server 100 (FIG. 1) can proceed to put the campaign on hold, and then transfer the customer call to the conference bridge of the talker (by sending a request to the central voice server 150 (FIG. 1)).

Upon the transfer of the call, the on hold music played to the talker will stop (if on hold music was being played), a short beep sound will be played to alert the talker, and the talker can start the conversation with the customer. When the customer call is transferred, concurrently the central data server 100 (FIG. 1) receives the transferred customer unique identifier from the dialing agent computer 20 (FIG. 1) and then transmits to the talker computer 24 (FIG. 1) the unique identifier of the customer who is being transferred.

In another embodiment of the present invention, upon call transfer request from the dialing agent computer 20 (FIG. 1) (depicted by the block 810) the central voice server 150 (FIG. 1) could start playing a pre-recorded voice greeting previously recorded by the talker to the customer called first and then proceed to transfer the customer call to the talker (or such pre-recorded greeting could be played concurrently while the customer call is transferred to talker). The foregoing arrangement could keep the customer engaged while the customer call is being transferred and provide a few extra seconds of time for the talker to get started with the conversation. It should be noted that upon the customer call transfer the talker may hear his/her pre-recorded greeting being played to the customer and waits until his greeting is completed playing and then start the conversation.

As shown by block 812, the customer record associated with the transferred unique identifier is highlighted differently in the tabular list shown on the talker computer 24 (FIG. 1). The unique identifier of the transferred customer has already been provided to the talker computer 24 (FIG. 1) when the dialing agent began dialing and the associated customer record was highlighted in the talker computer 24 (FIG. 1) (ahead of call transfer) to allow the talker to be prepared and during the step depicted by block 810 the same customer unique identifier is sent a second time to notify the talker of which one of the customers is transferred among the few customers being dialed. Since the talker has already reviewed the customer data ahead of call transfer, the talker is able to respond effectively without delay and have a productive conversation. It should be noted that highlighting of the customer record associated with the transferred unique identifier may be performed in many different manners. As an example, the customer record associated with the transferred unique identifier may be highlighted in a different color than the other customer records that are being dialed on the customer list.

In accordance with the present invention, upon dialing agent ending a customer call the dialing agent computer 20 (FIG. 1) could transmit the customer unique ID and the status of the call being ended to the central data server 100 (FIG. 1) and central data server 100 (FIG. 1) notifies the talker computer 24 (FIG. 1) of the customer unique ID and provides the status of call as having been ended. Upon receiving such information, the talker computer 24 (FIG. 1) could remove the highlighting of that customer record since the dialing of that customer record has ended (based on implementation preferences, instead of removing the highlighting of that customer record it could be highlighted in a separate color or shade to indicate that customer record has been dialed and such dialing has ended without resulting in a customer call transfer).

Figure 15:
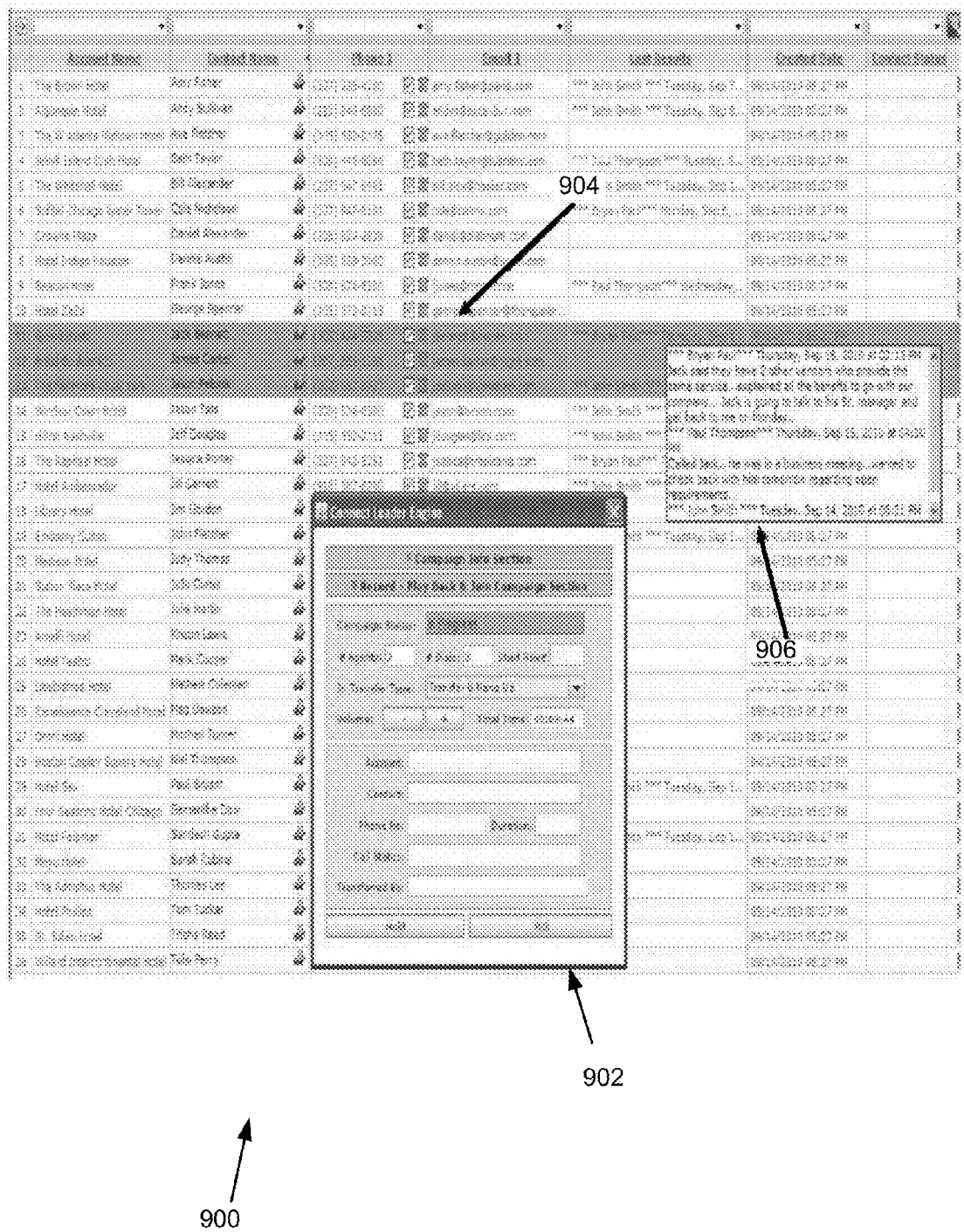
FIG. 15 is an example of a screen view illustrating an interface provided to talker when 3 customer records dialed by dialing agents are highlighted and talker reviewing customer notes history, ahead of call transfer.

FIG. 15 is an example of a screen view illustrating an interface 900 provided to talker when 3 customer records are being dialed by the dialing agents. As shown by FIG. 15, the 3 customer records that are currently being dialed are highlighted 904 to show to the talker which customer records are currently being dialed. Notes history 906 is shown to the talker. In addition, a status window 902 shows the campaign status, number of dialing agents currently dialing, number of dials so far and other relevant information. Status window 902 provides the options to put the campaign on Hold and GO.

Figure 16:
FIG. 16 is an example of a screen view illustrating an interface provided to talker when a transferred customer's record is shaded differently to differentiate from the other two customer records that are being dialed.

FIG. 16 is an example of a screen view illustrating an interface 950 provided to talker when a customer call is transferred to talker and 2 other customer records are being dialed. As shown by FIG. 16, the transferred customer record is shaded differently 956 to differentiate the transferred customer record from the other 2 customer records 958 that are being dialed. In addition, a status window 952 shows the currently transferred customer record fields (account name, contact name, phone number, etc.), campaign status, number of dialing agents currently dialing, number of dials so far and other relevant information. Further, a window 954 is shown where the talker enters notes and schedules a follow up.

In accordance with the present invention, upon the dialing agent transferring a customer call or ending a customer call that did not result in a call transfer, the dialing agent computer 20 could repeat the steps of FIG. 12 to continue to dial the next customer record associated with the next customer unique identifier transmitted by the central data server 100 for dialing. This cycle may continue until the dialing agent exits the campaign or the campaign ends.

In accordance with the present invention, although not a necessity, the dialing agents and talker can update the customer information and notes, and schedule follow up events. For example, the dialing agent might learn that a specific customer no longer works in a business or that the phone number is a wrong phone number or a different contact within a business is the right decision maker, resulting in the dialing agent inserting a new customer record(s) or modifying the customer information to properly reflect current information. In addition, the present system, via the central data server 100 (FIG. 1), central voice server 150 (FIG. 1), the taker computer 24 (FIG. 1), and the dialing agent computer 20 (FIG. 1), collects various data such as the number of dials made by each dialing agent, the number of calls transferred by each dialing agent, call duration, and the like. A report could be generated based on the collected data.

In accordance with an alternative embodiment of the invention, once the talker makes the decision to end the campaign, the talker closes down the campaign screen on the talker computer 24 (FIG. 1). Upon such closing down of screen in the talker computer 24 (FIG. 1) requests the central data server 100 (FIG. 1) to end the campaign and in turn the central data server 100 (FIG. 1) notifies the central voice server 150 (FIG. 1) to end the campaign (and the central voice server 150 (FIG. 1) ends the campaign by ending the telephone connection of the talker to the voice conference bridge) and changes the campaign status as being ended or closed. This forces all of the dialing agents for that campaign to close down their screens, by having the dialing agent software continuously monitor in short time intervals to know whether the campaign has been closed and upon knowing that the campaign has been closed the dialing agent software could force the dialing agent to close down their screens. When the campaign is started again, the talker has the ability to notify the central data server 100 (FIG. 1) to start the dialing from a specific customer record in the customer list (instead of starting from the beginning of the customer list).

In an embodiment of the present invention, the central data server 100 (FIG. 1) could be implemented using Web application server technologies or standalone server technology that interacts with other components of the system 10 (FIG. 1) through client-server technology. The central voice server 150 (FIG. 1) could be implemented using a PBX system such as Asterisk. Dialing agent software and talker software may be implemented using stand-alone code that communicates with other components of the system through client-server technology, or using web browser Ajax technology or web browser with plug-in, or using a combination of Web technology and automatic delivery of code from a Web server to browsers using technologies for example but not limited to Java or ActiveX. The system may or may not integrate with a third party customer relationship management ("CRM") to implement the functions of the central data server, dialing agent software, and talker software. Communication between the central voice server 150 (FIG. 1) and other components of the system 10 (FIG. 1) may or may not go through the central data server 100 (FIG. 1). Based on implementation preferences, communication between any two components of the system 10 (FIG. 1) could be accomplished using various mechanisms such as but not limited to Ethernet, Internet, TCP/IP, and shared memory based communication, and shared storage based communication. Further, based on implementation preferences, communication between any two components of the system 10 (FIG. 1) could be accomplished using messages with variations in content. For example, upon customer call transfer the central data server 100 (FIG. 1) could transmit to the talker computer 24 (FIG. 1) a portion of the customer record that could be used to uniquely identify the transferred customer record in the talker computer 24 (FIG. 1) instead transmitting the unique customer identifier associated with the transferred customer. Based on implementation preferences, the components of the system may or may not use a local or server based database system to store and retrieve customer lists and data.

Based on the type of technology used for communication between any two components of the system 10 (FIG. 1) and choice of the method used for embodying the current invention, a component may act only as a client or may act only a server or may act as both a client and a server. Based on implementation preferences, the functions performed by each component of the system (including but not limited to, central data server, central voice server, talker software, and dialing agent software) could be restructured by removing a specific function (whole function or a portion of a function) from one component and delegating such function to be performed by another component. In an embodiment, a portion of the function performed by the central data server 100 (FIG. 1) that involves the transmission of the customer list to one or more component of the system 10 (FIG. 1) (for example but not limited to having dialing agent computer 20 (FIG. 1) and talker computer 24 (FIG. 1)) directly retrieve the customer list from a file or database that is accessible and limit the function of the central data server 100 (FIG. 1) to provide the necessary data (such as but not limited to, campaign status) for coordination among the components of the system 10 (FIG. 1). In an alternative embodiment, the whole function performed by the central data server 100 (FIG. 1) could be delegated by having the dialing agent computer 20 (FIG. 1), talker computer 24 (FIG. 1), and central voice server 150 (FIG. 1) communicate among themselves and coordinate among themselves to accomplish the overall function of system 10 (FIG. 1) of the present invention and thereby eliminating the need to have the central data server 100 (FIG. 1) as part of the system 10 (FIG. 1). To accomplish the foregoing example, techniques such as but not limited to communication and coordination among multiple components of system 10 (FIG. 1) (including but not limited to dialing agent computer 20 (FIG. 1), talker computer 24 (FIG. 1), and central voice server 150 (FIG. 1)) via shared memory or local memory in each component that is being synchronized with the local memory of the other components. It should be noted that communication via shared memory is a possibility if the different components of system 10 (FIG. 1) are implemented to be located in a computer (including but not limited a server, cluster of computers, computer network, or the like) that makes such shared memory available for access by multiple components. Such implementation where the different components of the system 10 (such as but not limited to dialing agent computer 20 (FIG. 1) and talker computer 24 (FIG. 1)) to be located in a computer (that provides shared memory access among the components) could be accomplished with the technique that is described herein below.

It should be noted that the dialing agent computer 20 (FIG. 1), talker computer 24 (FIG. 1), and any other computer that requires the interaction with a user in the system 10 (FIG. 1) could be implemented by having a computer terminal that provides access to a remote computer where the remote computer performs the function of the computer. In such mechanism, certain resources (including but not limited to screen and peripheral device) and events of the remote computer are mapped to the computer terminal. The foregoing implementation could be accomplished using technologies, such as but not limited to, remote desktop client, remote desktop connection, remote desktop server, computer terminal, terminal server, and the like. For example, the dialing agent computer 20 (FIG. 1) could be a computer terminal that has remote desktop client software which connects to the remote desktop server (where dialing agent software is located) and the dialing agent is allowed to see the dialing agent software interface (and interact with the dialing agent software) located in the remote desktop server via the computer terminal. As a way of another example, similar to the foregoing example, the talker computer 24 (FIG. 1) could be a computer terminal allowing the talker to see and interact with the talker software located in the remote desktop server. It should be noted that by using the foregoing technique it is possible to have the dialing agent software, talker software, the central data server 100 (FIG. 1), and the central voice server be located in the same server (and based on the implementation preferences such components may or may be implemented as software modules in the server). Based on the implementation preferences, such server could provide shared memory access to the different components of the system for communication and coordination.

Further, one component of the system could send and receive information directly from the other component or indirectly through one or more components. For example, based on implementation preferences, the call transfer function depicted by the block 810 (in FIG. 14) could be implemented by having the dialing agent software send a call transfer request to the central voice server 150 (FIG. 1) directly, or the same call transfer function could be implemented by having the dialing agent software send a call transfer request to the central data server 100 (FIG. 1) and in turn the central data server 100 (FIG. 1) send a call transfer request to the central voice server 150 (FIG. 1). As a way of another example, in the step illustrated by block 504 (in FIG. 6) instead of transmitting the customer list and associated customer data to the dialing agent computer 20 (FIG. 1) and/or talker computer 24 (FIG. 1), the central data server 100 (FIG. 1) may transmit only customer list information and the source (for example, but not limited to, a specific database) from where to get the associated customer data and the dialing agent computer 20 (FIG. 1) and/or talker computer 24 (FIG. 1) may get the customer data from the source specified by the central data server 100 (FIG. 1).

Based on the implementation preferences, each component of the system 10 (FIG. 1) could be a logical component that is implemented by having multiple instances of the component working with or without coordination among such instances. Such implementation may be needed to improve the attributes of the system 10 (FIG. 1), such as but not limited to, the scalability, reliability, redundancy, and availability. Some of the techniques that could be used in such implementation could be, including but not limited to, clustering, load balancing, distributed computing and cloud computing). For example, the central data server 100 (FIG. 1) could be implemented by having more than one computer configured to work as a cluster for the purposes of, including but not limited to, balancing the work load among the computers in the cluster, delegating the function performed by a non-working computer (when a computer in the cluster is not working due to failure or shut down intentionally by maintenance personnel for maintenance) to other computers in the cluster in order to maintain high availability, and keep the overall cost of the central data server 100 (FIG. 1). It should be noted when a component of system 10 (FIG. 1) is implemented by having multiple instances (as described herein above), one or more instances may or may not share the same processor, memory, storage, and the like. A person having ordinary skill in the art would understand the various forms of technologies and techniques that could be used to embody the invention.

It should be noted that the highlighting of customer records, as described herein, may be used to highlight the dialing agent screen and the talker screen to differentiate the customers who are being dialed, who is currently transferred, who were previously transferred, who were unsuccessfully dialed previously that did not result in a call transfer, to whom dialing agents have successfully played a pre-recorded voice message previously recorded by talker, and to represent other customer status. In addition, highlighting may be performed by one or more of many different methods such as, but not limited to, changing colors, blinking, circling, shading, changing the border around the customer information, showing the customer information in specific area of the screen, and pointing to customer information shown in the computer. One having ordinary skill in the art would understand and appreciate that the purpose of highlighting a customer record is to distinguish the customer record.

In addition to the abovementioned, in accordance with the first embodiment, since a specific talker is pre-selected for a given campaign, at the time of call transfer the system knows the talker ahead of time and the system does not have to look for an available talker at the time of call transfer. Hence, the speed of call transfer is faster.

Various components of the present system may be designed to update each other continuously (with short time intervals between updates) and such updates could include, but are not limited to, updates of information that need to be exchanged between the components and the information about whether the connectivity between them is healthy. Such updates could be implemented by having one component poll the other component continuously (with short time intervals between the polling) to provide updates as well as receive updates at the same time. If the technology used for implementation permits, such updates may be performed asynchronously by having a component send updates to other component(s) only when there is a change of information that needs to be exchanged. It should be noted that the present system may be implemented to perform security checks at various steps to ensure proper authentication of user of the system and appropriate authorization to access various functions of the system and/or access or update various portions of data in the system.

It is also beneficial to have a policy for handling customer calls when the talker is busy. In accordance with an alternative embodiment of the invention, once a call is transferred, the talker will be busy in attending the call transferred to the conference bridge (where the talker is waiting readily) and the campaign data server software will put the campaign on a hold status. After the campaign goes into a hold status, any other call currently in progress between the dialing agent and the customer could be dropped and, based on the option, redialed again when the campaign resumes or the dialing agent may proceed with the call and talk to the customer to arrange a scheduled time for the talker to contact the customer directly at a later time.

In accordance with another alternative embodiment of the invention, besides highlighting the customer record that is being dialed in both the dialing agent computer 20 (FIG. 1) and the talker computer 24 (FIG. 1), the system could continuously exchange among the talker computer 24 (FIG. 1) and the dialing agent computer 20 (FIG. 1) the incremental updates made to customer records. To accomplish such exchange of updates without compromising the speed of call transfer, the exchange of incremental updates of customer data could be performed at a lower priority and the task of transferring the call (and the associated customer's unique identifier) could be performed at a higher priority.

In accordance with a further alternative embodiment of the invention, instead of using a conference bridge as a mechanism in the central voice server 150 (FIG. 1), the system could use other mechanisms that allow the talker to wait readily to handle the transferred customer call. Such alternative mechanisms could include, but are not limited to, queue, parking lot, and the like. A person having ordinary skill in the art of the present invention would understand the various types of mechanisms in the central voice server that could be used in a system embodying the present invention.

While the abovementioned did mention that more than one dialing agent and more than one talker may be provided within the present system and method, in another embodiment of the present invention, the system could be implemented to have more than one talker wait in a queue (or alternative mechanisms) to handle the transferred customer calls. This configuration reduces the chances of needing the dialing agent to handle the customer call himself/herself due to the talker becoming busy. The higher the number of talkers available, the lesser the chance of not having a talker available to handle the transferred customer call and, in turn, the lesser the chance of the dialing agent needing to handle the customer call himself/herself. If more than one talker is waiting to handle the transferred customer call the central data server 100 (FIG. 1) may need to select one of the available talkers during the time of call transfer. A delay associated with such selection of talker during the time of call transfer could be minimized by having the system pre-select one of the available talkers to handle the next transferred call. Such pre-selection process could be executed on a continuous basis whenever the previously preselected talker becomes busy (and keep maintaining the designated talker to handle the next transferred call).

Further, multiple people may participate in a transferred customer call. For example, the present system may be implemented to have one or more individuals join the customer call along with the talker. Such additional individual(s) may participate in a listen only mode, participate in a listening and talking mode, or participate in a whisper mode in which the talker could hear such individual's voice but not the customer. Participation of additional individuals could be necessary for training purposes or assisting the customer along with the talker. It should be noted that one or more persons could participate (in various modes such as listen only, whispering to the one or more participants, or listening and talking to everyone in the call) in the call between the dialing agent and customer for the purposes of training and coaching.

The foregoing paragraph describes the functionality that allows one or more individuals participate in a call with the talker or dialing agent in the system 10 (FIG. 1). This process is described further in U.S. patent application Ser. No. 13/278,764, entitled, "SYSTEM AND METHOD FOR MAXIMIZING EFFICIENCY OF CALL TRANSFER SPEED", filed on Oct. 21, 2011, the disclosure of which is hereby incorporated by reference in its entirety. Such functionality of the system 10 (FIG. 1) is referred to herein as the "Third Party Call Participation Functionality". Several exemplary embodiments of such functionality are described below.

Figure 45:
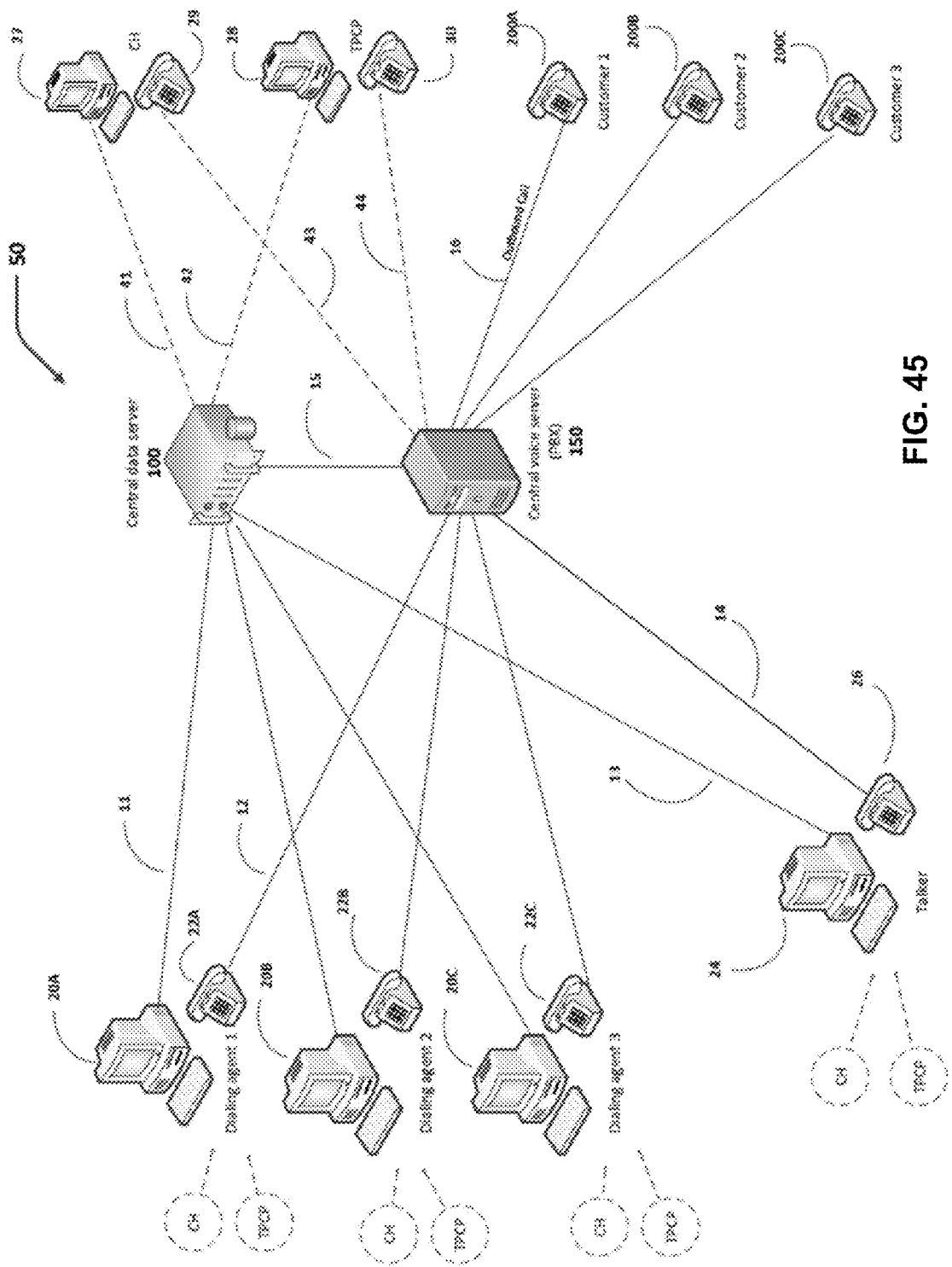
FIG. 45 is a schematic diagram illustrating a system 50 which is a modified version of the system 10 (FIG. 1), incorporating the Third Party Call Participation Functionality.

FIG. 45 is a schematic diagram illustrating a system 50 which is a modified version of the system 10 shown in FIG. 1, incorporating the Third Party Call Participation Functionality. If any component of system 50 shown in FIG. 45 is not described herein, the description of the same component of system 10 shown in FIG. 1 is applicable.

For the purposes of this document, "Call Handler" or "CH" refers to any person (or machine or computer or a module within the system 50 shown in FIG. 45 itself, performing the role of a person) using the system that is on a call with any individual (or machine or computer) who handles the other end of the call on the customer side. For the purposes of the definition of CH, using the system 50 (FIG. 45) if a CH is on a call with another user of the system, that is, the phone of the CH is connected to the phone of another user, such other user may be considered as the customer. The CH may be, but is not limited to, the talker or dialing agent. Any third person (or machine or computer or a module within the system 50 shown in FIG. 45 itself, performing the role of the third person) participating in the call between the CH and customer or communicating with the CH via electronic message, is referred as a "Third Party Call Participant" or "TPCP". It should be noted that the TPCP may be, but is not limited to, the talker or the dialing agent. There may be more than one TPCP participating in a CH's call. The word "participate" refers to the (i) participation of the TPCP in a call of a CH in one or more modes, including but not limited to, listen only mode, whisper mode, barge mode, or the like (collectively referred as "Call Participation Mode"), and/or (ii) communication of the TPCP with the CH via electronic message. One having ordinary skill in the art would understand and appreciate that any CH, customer, or TPCP may be a person or a computer or a machine or a module within the system 50 (FIG. 45).

Referring to FIG. 45, the system 50 includes a dialing agent computer 20 having dialing agent software stored therein, a dialing agent telephone 22, a talker computer 24 having talker software stored therein, a talker telephone 26, a central data server 100, a central voice server 150, a customer telephone 200, a CH computer 27 having CH software stored therein, a CH telephone 29, a TPCP computer 28 having TPCP software stored therein, and a TPCP telephone 30.

Further, referring to FIG. 45, within the system 50 there may be one or more than one dialing agent computer 20, dialing agent telephone 22, talker computer 24, talker telephone 26, central data server 100, central voice server 150, customer telephone 200, CH computer 27, CH telephone 29, TPCP computer 28, and TPCP telephone 30. For exemplary purposes, FIG. 45 illustrates three dialing agent computers 20A, 20B, 20C, three dialing agent telephones 22A, 22B, 22C, three customer telephones 200A, 200B, 200C, one talker computer 24, one talker telephone 26, one CH computer 27, one CH telephone 29, one TPCP computer 28, and one TPCP telephone 30. Telephone communication links 42 and 44 may be implemented using the same mechanism used for telephone communication links 12, 14, and 16. Further, computer communication links 41 and 43 may be implemented using the same mechanism used for computer communication links 11 and 13.

In accordance with the Third Party Call Participation Functionality, a dialing agent or a talker may play the role of a CH, and a dialing agent or a talker may play the role of a TPCP. Such a possibility of change of roles is illustrated by circles with dotted lines next to the dialing agent and talker in FIG. 45. One having ordinary skill in the art would understand and appreciate that when a dialing agent plays the role of a TPCP, the dialing agent computer may perform the functions of a TPCP computer by having the TPCP software stored therein, and the same reasoning applies when a talker plays the role of a TPCP. Also, when a talker plays the role of a CH the talker computer may perform the functions of a CH computer by having the CH software stored therein. Further, when a CH is a third party, a CH computer and a CH telephone may be involved which is illustrated by CH computer 27 and CH telephone 29. When a TPCP is a third party, a TPCP computer and a TPCP telephone may be involved which is illustrated by TPCP computer 28 and TPCP telephone 30.

One having ordinary skill in the art would understand and appreciate that the meaning of the Call Participation Modes referred in this description are commonly known in the telecommunication industry, for example, (a) in listen only mode, the TPCP may listen to both the CH and the customer, wherein in the listen only mode the TPCP may participate in the call with or without knowledge of the CH or the customer, (b) in barge mode (or listening and talking mode), the TPCP may listen as well as talk to both the CH and customer, wherein in the barge mode the TPCP, the CH, and the customer all or some may have knowledge of presence of others in the call, and (c) in whisper mode, the TPCP listen to both the CH and the customer, but talk to only the CH, wherein in the whisper mode the TPCP may participate in the call without knowledge of the customer.

One having ordinary skill in the art would understand and appreciate that whenever the description refers to a step being performed by a TPCP, based on the context, it refers to the step that is either performed by: i) the TPCP through a computer used by the TPCP; ii) the TPCP through a telephone used by the TPCP; or iii) the computer used by the TPCP automatically without the TPCP initiating a step. The same foregoing reasoning pertains to steps performed by the CH.

In accordance with the first exemplary embodiment of Third Party Call Participation Functionality, the system 50 (FIG. 45) may allow the TPCP to initiate participation in a call of a CH using a particular Call Participation Mode, or to initiate electronic message communication to the CH. Based on implementation preferences, the TPCP may only be able to initiate such action to one of the CHs mapped to the TPCP (or CHs that are authorized for the TPCP) in the system 50 (FIG. 45). If the requested CH is not available, the system may notify the TPCP that the CH is not available at that time and provide option to elect to put the TPCP on wait until the CH becomes available (and begin the fulfillment of the initiated action upon the CH becoming available). Please note, to increase the productivity of the TPCP, the system may allow the TPCP to review the list of CHs with their identifications and statuses. This allows the TPCP to know ahead of time whether a particular CH is available before initiating one of the above actions.

The system 50 (FIG. 45) may be modified to allow the TPCP to participate in CH's call even when the CH is not on a call but on the conference bridge (or similar mechanism in the central voice server). When the CH waits for the next call, the CH may be listening to on-hold music or not listening to on-hold music (based on settings). For the purposes of this document, the word "call" as in "CH's call" or "call of a CH" has the same meaning irrespective of whether the CH is on a call with any individual or machine that handles the call on the customer side or the CH is waiting in a queue or a conference bridge (or other similar mechanism in the central voice server). Based on the implementation preferences, the participation of TPCP may or may not be visible/audible to the customer.

In another exemplary embodiment of the Third Party Call Participation Functionality, wherein the Third Party Call Participation Functionality is implemented in the system described in U.S. patent application Ser. No. 13/278,764, the system 10 (FIG. 1) may have one or more talkers and one or more dialing agents, and the function of each human dialing agent may be automated by a module (referred to herein as the "Dialing Agent Module") in the central data server 100 (FIG. 1). Based on implementation preferences, the Dialing Agent Module may (i) dial the phone number of the customer, navigate the phone call (through, but not limited to, phone menus, voicemails, and the like) until the live customer picks up the call, and upon the live customer picking up the call, recognize the live human voice and transfer the call to the talker, or (ii) dial the phone number of the customer, and transfer the phone call to the talker immediately after dialing the phone number or after performing a partial call navigation but prior to the customer picking up the phone. The TPCP may participate and provide assistance to one or more talkers in such a system, in which there may not be any human dialing agents present.

In a typical call center, the CH may use one or more of several mechanisms, for example, raising the hand or standing up or blinking a light to request a supervisor of the call center to provide assistance by participating in the call of the CH or communicating via electronic messages, and the supervisor may recognize the request and start providing assistance. It should be noted, in the foregoing sentence the word "supervisor" refers to any person that may provide assistance to the CH. Such mechanisms may not function if the CH and/or supervisor are in different locations. Hence, it is desirable for yet another embodiment of the Third Party Call Participation Functionality that allows collaboration between a CH and a TPCP seamlessly, without physical workspace proximity, irrespective of their physical location. Such embodiment implemented using system 50 (FIG. 45) is described below which is referred to herein as the "Remote Coach".

Further describing the Remote Coach embodiment, based on implementation preferences, the TPCP may see some or all of the information shown in the screen of the CH, which includes but not limited to, status of the CH, the customer list and the related status information such as which customer record(s) is/are currently being dialed or scheduled to be dialed next, the customer notes reviewed by the CH, which customer the CH is talking to (if applicable), and the like. This might allow the TPCP to observe and understand things, including but not limited to, who the CH is talking to during a call, the customer list of the CH, priority of the customers in the customer list of the CH and the order in which the customers are being called, list quality, hold time (time duration for activities, including but not limited to, taking a break, reviewing/entering notes, updating the customer information, and the like), wrap up time (time duration for activities, including but not limited to, wrapping up the customer call by taking notes in the system and the like), number of connects during the dialing session, total dialing session duration, whether the CH is following the best practices taught in training, and other relevant information. Based on implementation preferences, the TPCP may be allowed to view the screen information of the CH shown to TPCP, in read-only mode (in which the TPCP could just view the information and could not update the information) and/or read-and-update mode (in which the TPCP could view the information as well as update the information). If the TPCP is allowed to update the screen information of the CH shown to TPCP, based on implementation preferences, the TPCP could be allowed to update all the screen information of the CH shown to TPCP or certain sections within the information shown.

It should be noted that the screen information of the CH shown to TPCP may be the information displayed in screen of the CH associated to the system 50 (FIG. 45) or the entire computer screen of the CH that may have other window(s)/screen(s) associated with other system(s). The former could be implemented, for example, by having the central data server 100 (FIG. 45) send a copy of the data sent to computer of the CH to the computer of the TPCP as well. The latter may be implemented, for example, using a module that provides screen sharing functionality similar to the functionality offered by products like GotoMeeting, Webex, and the like. GotoMeeting is a registered trademark of Citrix Online, LLC and Webex is a registered trademark of Webex, Inc. The names of companies, trademarks, service marks and products/services mentioned herein may be the trademarks of their respective owners.

Once a TPCP logs into the system 50 (FIG. 45), for example, via computer used by the TPCP, and joins the conference bridge via phone, TPCP may notify the system 50 (FIG. 45) about the TPCP's availability to provide assistance to CHs (for example, by pressing a button that has a label "I am available" or "GO" or selecting the status value as "I am available" in a drop down, and the like). Upon the TPCP becoming available in the system 50 (FIG. 45), that TPCP's status value is updated to indicate that the TPCP is available in the screen of every CH who may be (i) mapped to that TPCP, and (ii) currently logged into the system and in a screen that shows the statuses of TPCPs.

Besides logging into the system 50 (FIG. 45) via computer, the TPCP should join the conference bridge via phone in order to provide assistance to CH through participating in the call of the CH. Based on implementation preferences, even before the TPCP joining the conference bridge using the TPCP's telephone, the TPCP may be able to notify the system about the TPCP's partial availability to provide assistance to CH only through electronic message communication. In such situation, where TPCP is partially available to assist the CH through electronic message communication only, such partial availability could be notified to the appropriate CHs, for example, to allow the CHs request for assistance only through electronic message communication.

Figure 20:
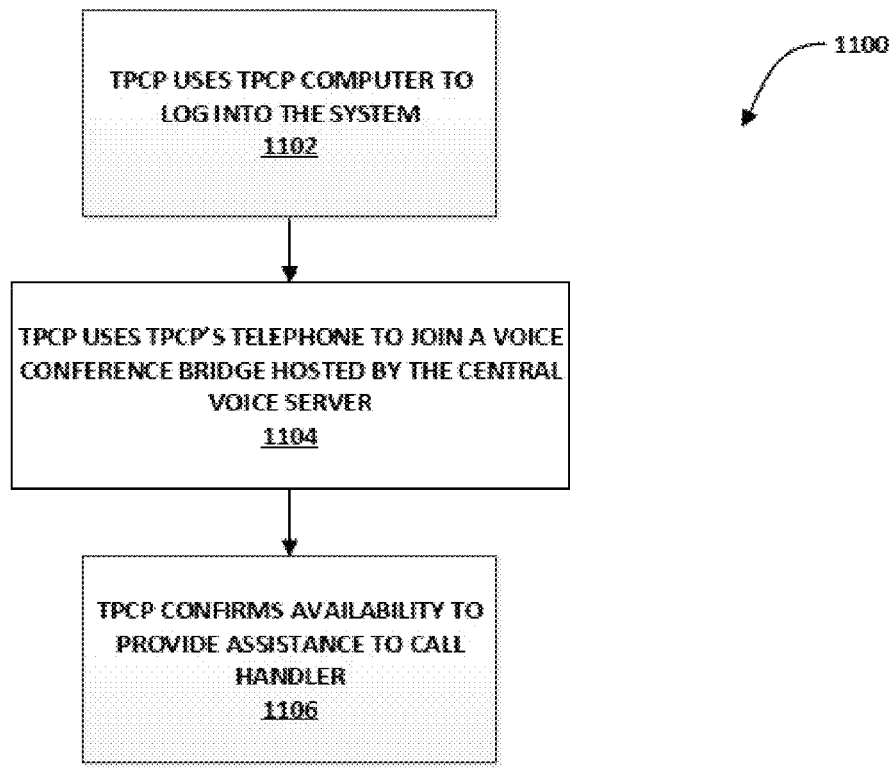
FIG. 20 is a flowchart illustrating actions performed by the TPCP when the TPCP acknowledges the TPCP's availability, in accordance with the Remote Coach embodiment.

FIG. 20 is a flowchart 1100 illustrating actions performed by the TPCP when the TPCP acknowledges the TPCP's availability, in accordance with the Remote Coach embodiment. While FIG. 20 is provided with regard to a single TPCP, one having ordinary skill in the art would understand and appreciate that there may be more than one TPCP in the present system, resulting in the steps of FIG. 20 being performed by each TPCP.

As shown by block 1102, the TPCP logs into the TPCP computer. As shown by block 1104, the TPCP joins a voice conference bridge hosted by the central voice server, using the telephone of the TPCP. As shown by block 1106, the TPCP confirms the TPCP's availability to provide assistance to CHs. Based on implementation preferences in another embodiment, the function shown by block 1104 may be skipped if the TPCP prefers to confirm his partial availability to provide assistance to the CH only through electronic message communication.

Figure 21:
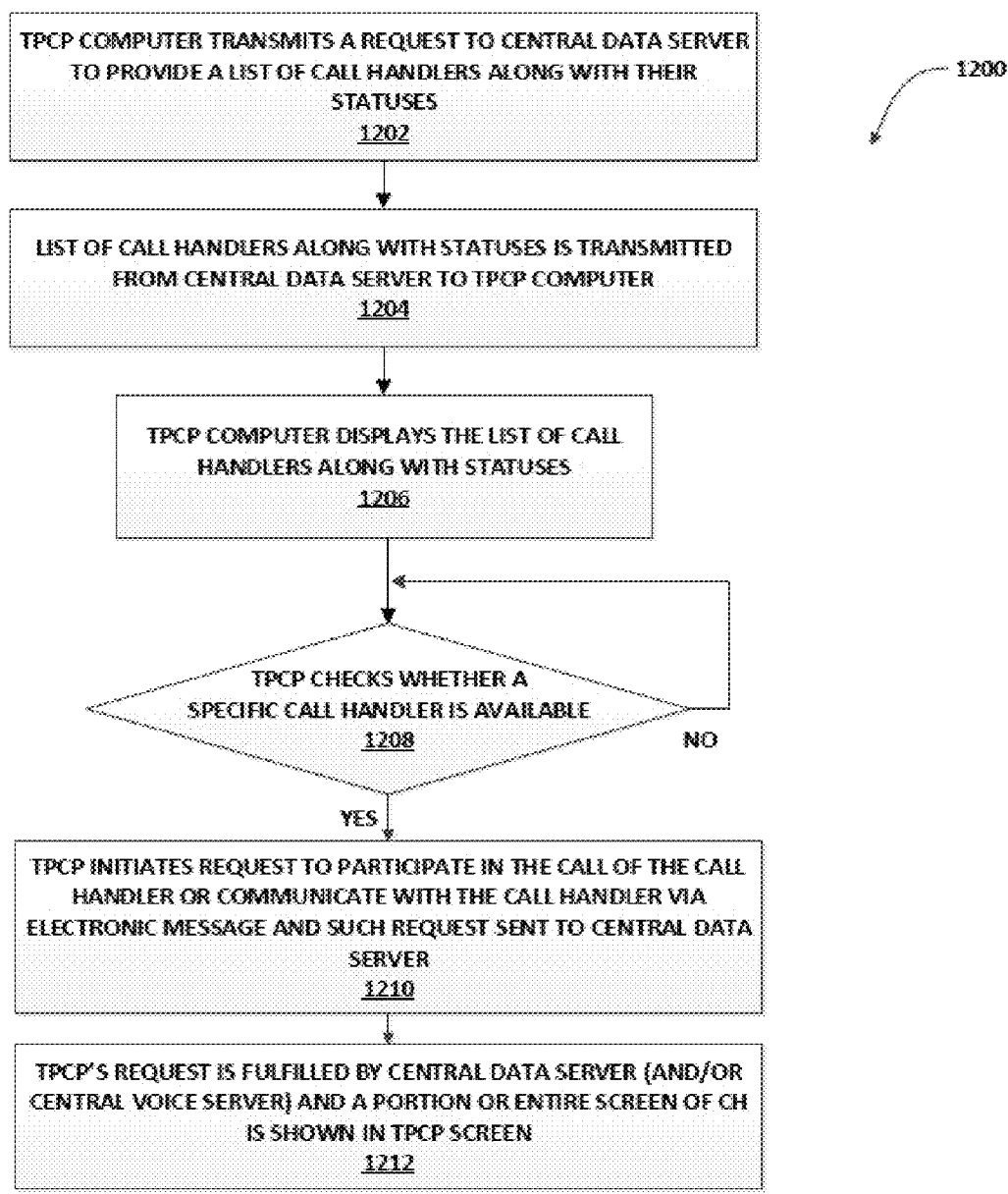
FIG. 21 is a flowchart illustrating actions performed by the TPCP when the TPCP initiates a request to participate in a call of a CH or communicate with the CH via electronic message, in accordance with the Remote Coach embodiment.

FIG. 21 is a flowchart 1200 illustrating actions performed by the TPCP when the TPCP initiates a request to participate in a call of a CH or communicate with the CH via electronic message, in accordance with the Remote Coach embodiment. While FIG. 21 is refers to a single TPCP, one having ordinary skill in the art would understand and appreciate that there may be more than one TPCP in the present system, resulting in the steps of FIG. 21 being performed by each TPCP.

As shown by block 1202, once a TPCP initiates a request a list of CHs along with their statuses, the TPCP computer transmits a request to the central data server to provide a list of CHs along with their statuses. As shown by block 1204, the central data server responds to the TPCP's request by transmitting the list of CHs long with their statuses. Based on implementation preferences, the information for each CH associated with such a list may include, but is not limited to, CH name, CH title, CH status and other related information. As shown by block 1206, upon receiving the list of CHs, the computer of the TPCP displays the list of CHs with statuses.

As shown by block 1208, the TPCP checks whether the status of a specific CH indicates that the CH is available. As shown by block 1210, if the CH is available, the TPCP initiates a request to participate in the call of the CH using a specific Call Participation Mode (or communicate with the CH via electronic message using a specific type of electronic messaging) and such a request is sent to the central data server. It should be noted that if the CH is not available, the TPCP may wait and then proceed to perform the function shown by block 1208 again and thereby going into a loop. Please note, based on implementation preferences, the system might allow the TPCP to initiate such request to participate in the call of the CH without checking the availability of the CH, for example by skipping the function shown by block 1208, and in which case, if the CH is not available the system may alert the TPCP and optionally put the TPCP's request in a waiting mode until the CH becomes available (and then proceed to fulfill the request of the TPCP upon the CH becoming available). Further, based on implementation preferences, the TPCP may initiate the TPCP's request, irrespective of whether or not the CH is requesting for the assistance of the TPCP. For example, a CH might not be requesting assistance or might be requesting assistance from a different TPCP, and the TPCP (not the specific TPCP requested by the CH) might initiate the request to provide assistance to the CH.

As shown by block 1212, the central data server responds to the request of the TPCP by fulfilling the request. Based on implementation preferences, such fulfillment of the request may include, but is not limited to, having the central voice server connect the call of the TPCP to the phone call of the CH in order to accomplish the requested Call Participation Mode, and sending a portion or all of the information shown in the screen of the CH to the computer of the TPCP. It should be noted that based on the implementation preferences, the central data server may be waiting for acknowledgement of the CH before proceeding to fulfilling the request of the TPCP.

Figure 22:
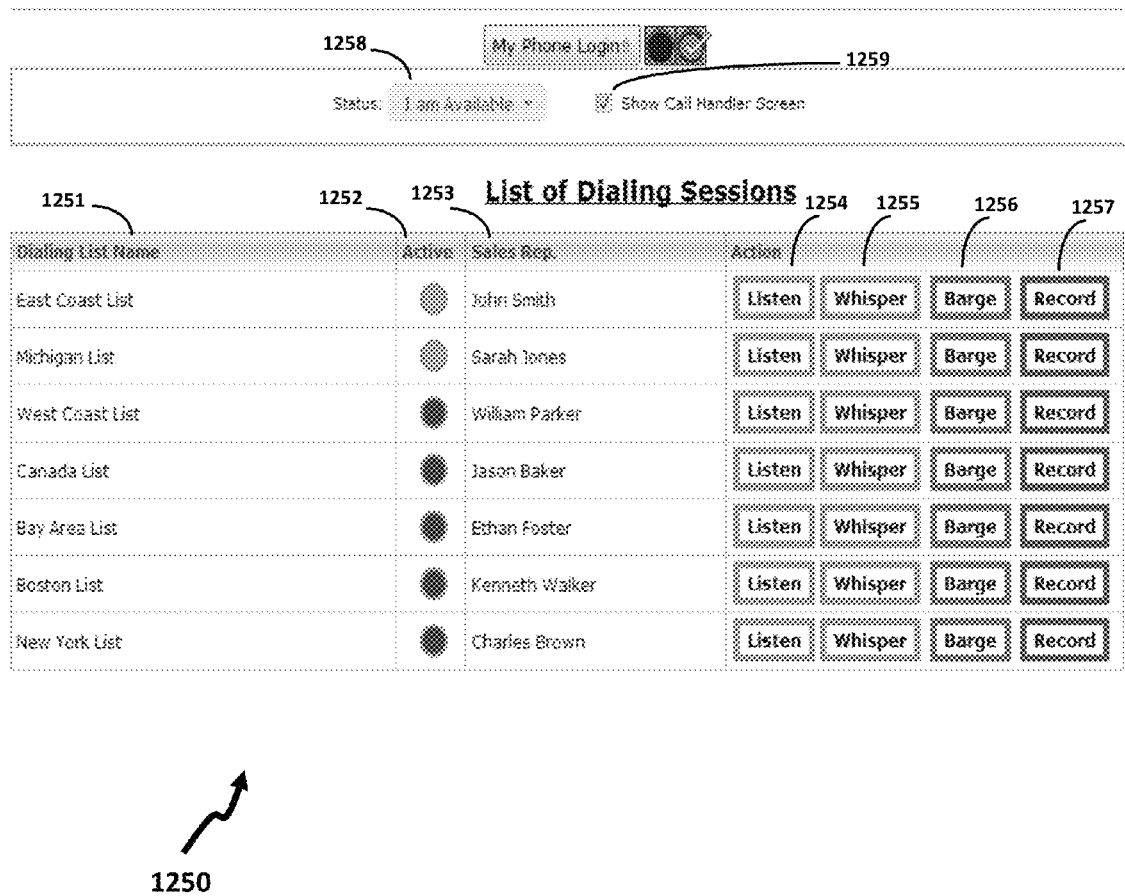
FIG. 22 is an exemplary screen view illustrating an interface that allows the TPCP to view the list of CHs along with their status information and request to participate with the call of a CH.

FIG. 22 is an exemplary screen view illustrating an interface 1250 that allows the TPCP to view the list of CHs along with their status information and request to participate with the call of a CH. As shown in FIG. 22 the interface 1250 contains: a column 1251, for showing the dialing list name; a column 1252, for showing the status of each CH in the format of one type of icon to indicate the CH is active and another type of icon to indicate the CH is inactive; a column 1253, for showing the CH's name; a button 1254, for requesting to listen to the call of the CH upon clicking the button; a button 1255, for requesting to whisper to the CH upon clicking the button; a button 1256, for requesting to barge into the call of CH upon clicking the button; a button 1257, for requesting to record the call of the CH upon clicking the button; a drop-down list control 1258, for selecting the status of the TPCP and notifying the system about the availability of the TPCP; and a checkbox control 1259, for enabling the system to show the screen of the CH upon a call participation request initiated by clicking the corresponding button.

FIG. 23 is an exemplary screen view illustrating an interface 1260 that allows the TPCP to view all or a portion of the screen of a CH when the TPCP is listening to the call of the CH. As shown in FIG. 23 the interface 1260 contains: a label 1261, for showing listening as the Call Participation Mode; a label 1262, for showing the name of the CH with whom the call participation is taking place; a label 1263, for showing the status of the CH; a label 1264, for showing the account name associated with the contact with whom the CH is talking to; a label 1265, for showing the contact name the CH is talking to; row of buttons 1266, for providing the buttons to request call participation in different Call Participation Modes and closing the screen; a checkbox control 1267, for enabling or disabling to show the screen of CH; and screen area 1268, for showing the screen of the CH upon enabling the checkbox control 1267.

Figure 24:
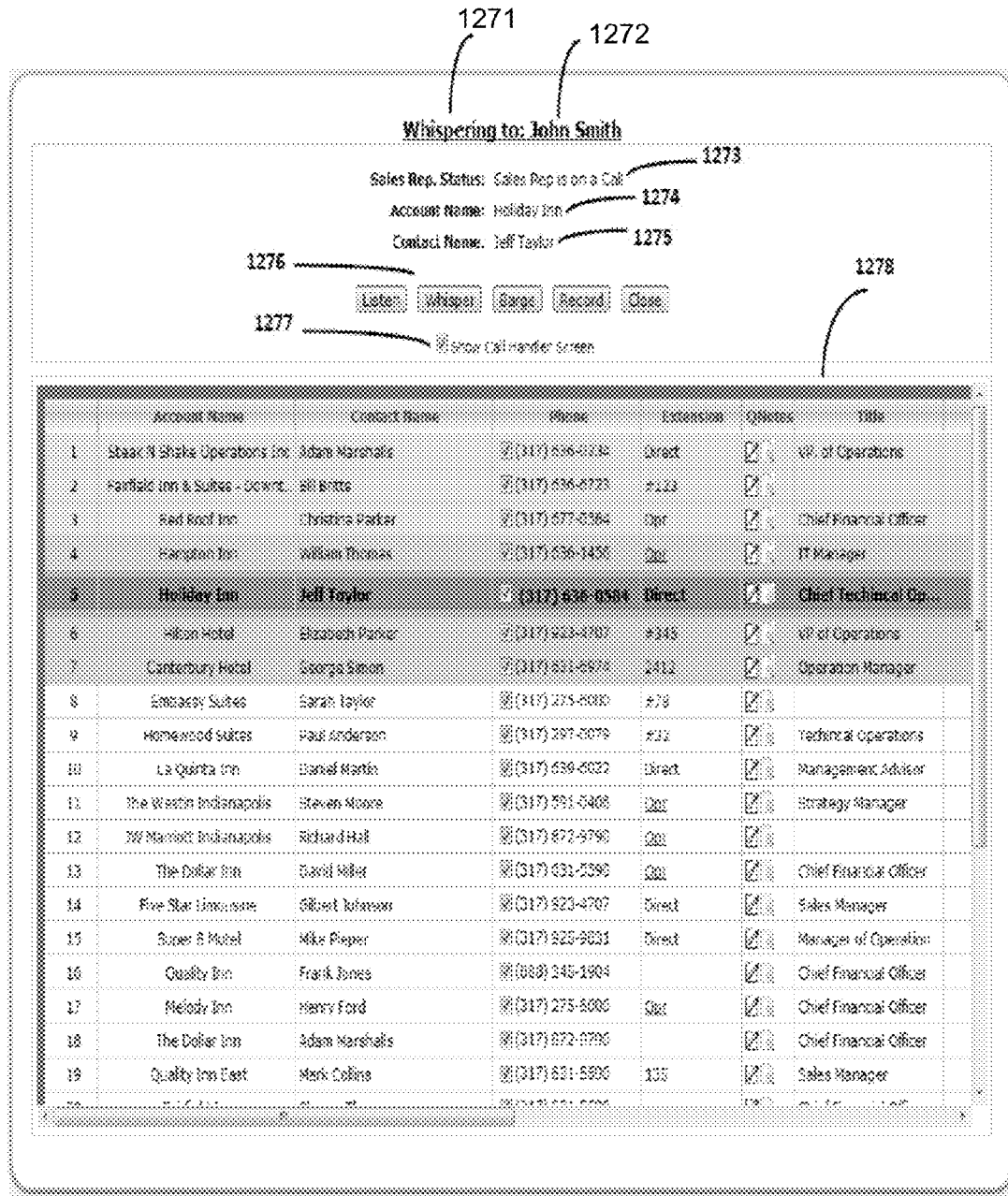
FIG. 24 is an exemplary screen view illustrating an interface that allows the TPCP to view all or a portion of the screen of a CH when the TPCP is whispering to the CH.

FIG. 24 is an exemplary screen view illustrating an interface 1270 that allows the TPCP to view all or a portion of the screen of a CH when the TPCP is whispering to the CH. As shown in FIG. 24 the interface 1270 contains: a label 1271, for showing whispering as the Call Participation Mode; a label 1272, for showing the name of the CH with whom the call participation is taking place; a label 1273, for showing the status of the CH; a label 1274, for showing the account name associated with the contact with whom the CH is talking to; a label 1275, for showing the contact name the CH is talking to; row of buttons 1276, for providing the buttons to request call participation in different Call Participation Modes and closing the screen; a checkbox control 1277, for enabling or disabling to show the screen of CH; and screen area 1278, for showing the screen of CH upon enabling the checkbox control 1277.

Figure 25:
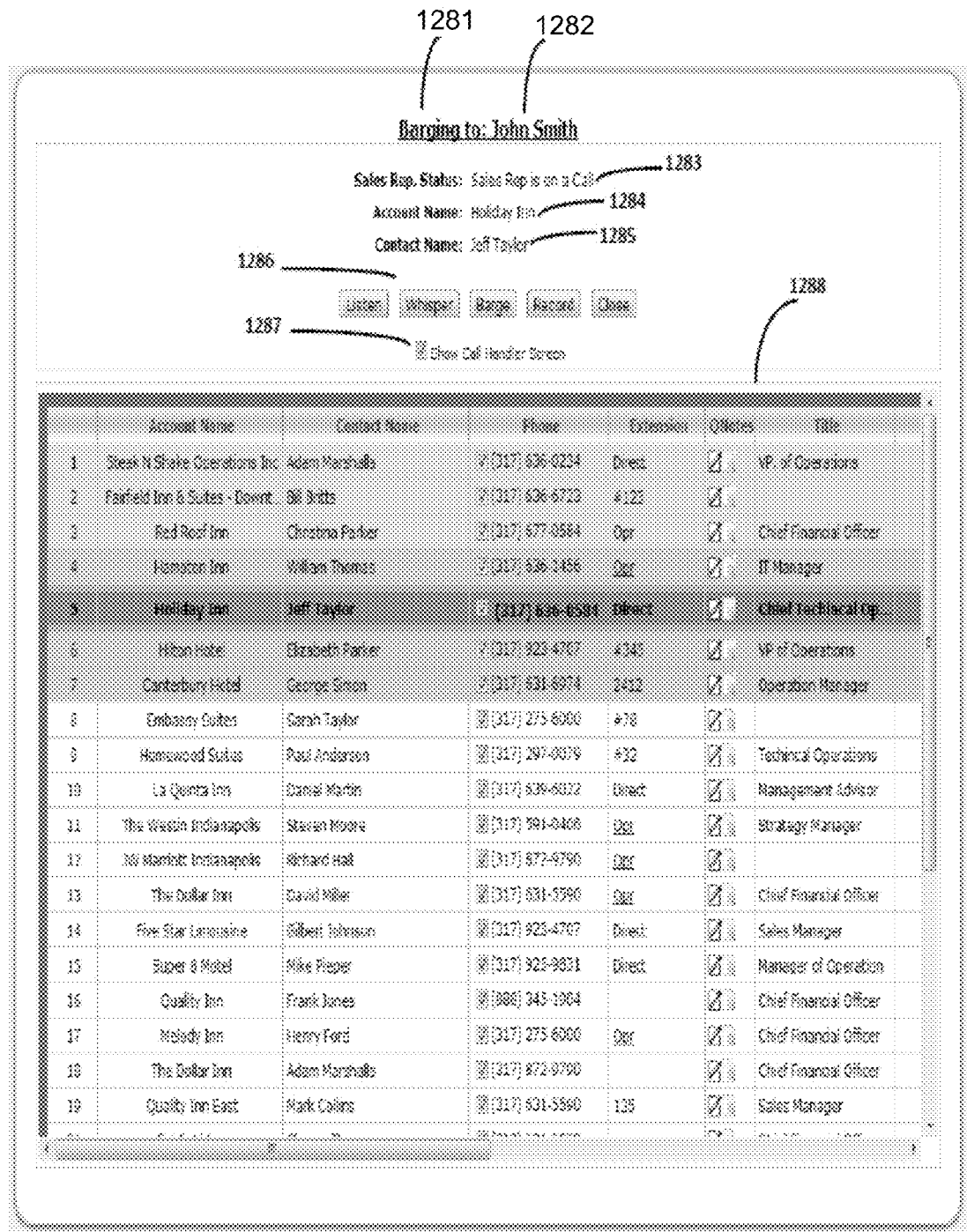
FIG. 25 is an exemplary screen view illustrating an interface that allows the TPCP to view all or a portion of the screen of a CH when the TPCP is barging into the call of the CH.

FIG. 25 is an exemplary screen view illustrating an interface 1280 that allows the TPCP to view all or a portion of the screen of a CH when the TPCP is barging into the call of the CH. As shown in FIG. 25 the interface 1280 contains: a label 1281, for showing barging as the Call Participation Mode; a label 1282, for showing the name of the CH with whom the call participation is taking place; a label 1283, for showing the status of the CH; a label 1284, for showing the account name associated with the contact with whom the CH is talking to; a label 1285, for showing the contact name of the CH is talking to; row of buttons 1286, for providing the buttons to request call participation in different Call Participation Modes and closing the screen; a checkbox control 1287, for enabling or disabling to show the screen of CH; and screen area 1288, for showing the screen of CH upon enabling the checkbox control 1287.

Further describing the Remote Coach embodiment, based on implementation preferences, once a TPCP starts participating in a call of a CH, the information about the participation of the TPCP in the call (such information may include but not limited to identification of the TPCP, participation start time, duration of the participation, and the like) could be shown in the screen of the CH. Such information related to the participation of the TPCP may not be shown to the CH if the TPCP has selected an option to make the TPCP's call participation invisible. For example, an option may be provided to the TPCP named as "Make My Call Participation Invisible." It is understood that even if the TPCP is invisible in the screen, if the TPCP whispers/barges into the call of the CH, the CH may hear the voice of the TPCP.

Figure 26:
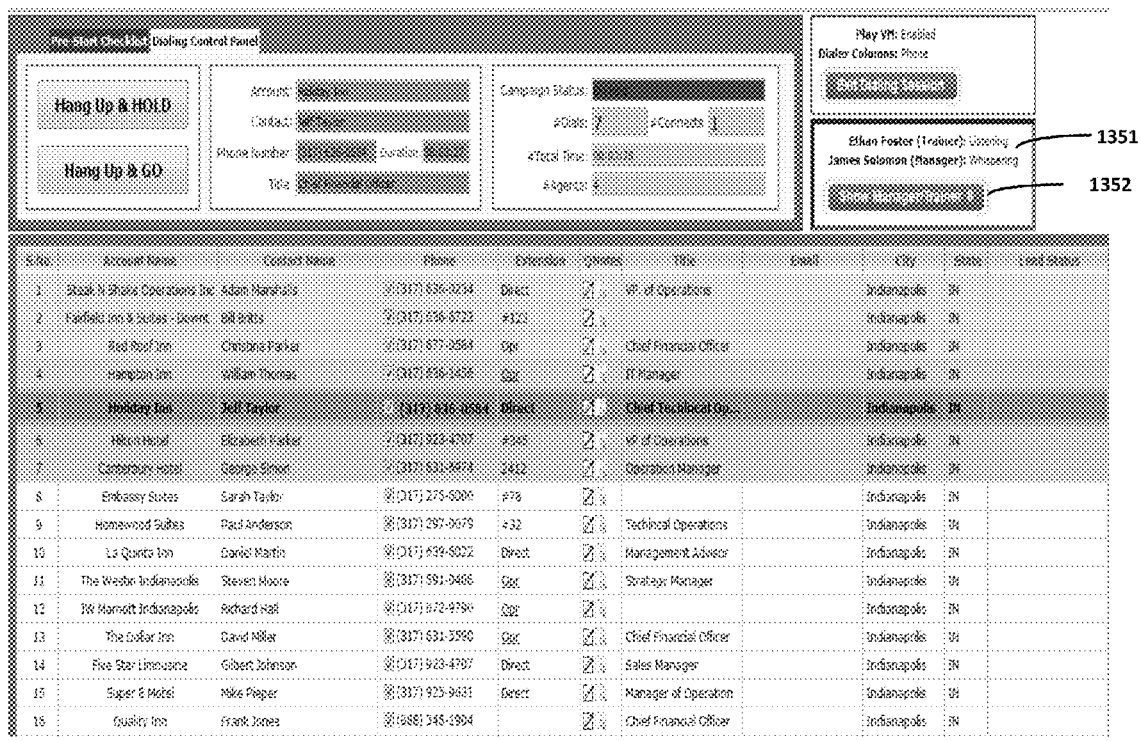
FIG. 26 is an exemplary screen view illustrating an interface that allows the CH to view the information of the TPCP that is participating in the call with the CH.

FIG. 26 is an exemplary screen view illustrating an interface 1350 that allows the CH to view the information of the TPCP that is participating in the call with the CH. As shown in FIG. 26 the interface 1350 contains: one or more rows of labels 1351, for showing the name of each TPCP participating in the call with the CH and each TPCP's Call Participation Mode; and button 1352, for providing a button to request a screen that shows the list of TPCPs upon clicking the button.

In accordance with the Remote Coach embodiment, based on implementation preferences, a CH may see which TPCPs are mapped to/authorized for that CH in the system 50 (FIG. 45) and among those TPCPs which TPCPs are available at any given time to provide assistance to a CH. Once one or more TPCPs are available, the CH may request a specific TPCP to provide assistance by (i) participating in the phone call of the CH (for example, in listen only or whisper or barge mode), and/or (ii) communicate with the CH via electronic messages including but not limited to email or text or instant messaging, or the like. Upon such request from the CH, the system 50 (FIG. 45) may notify the TPCP specified by the CH. It should be noted that the CH could be allowed to request the system for assistance from any one of the TPCPs (without specifically requesting a specific TPCP) and the system 50 (FIG. 45) may notify all of the available TPCPs or notify a specific TPCP after selecting such TPCP based on an algorithm that takes into account how busy a TPCP is, how recently a TPCP assisted a CH, and the like. Upon such request for any one of the TPCPs, one of the available TPCPs may confirm the acceptance of the request and proceed to assist the CH by participating in the call of the CH and/or communicating via electronic messages. Once one of the available TPCPs starts providing assistance, the CH may see the identification of the TPCP that is participating in the call and/or communicating via electronic messages.

The CH may request a specific TPCP to provide assistance by using an user input method, including but not limited to, clicking a link or icon or button with an appropriate label, available next to the identifier of a corresponding TPCP in the screen or update the CH's status value to "Requesting Assistance from a specific TPCP". Similarly, the CH may request assistance from any one of the TPCPs by using a user input method, including but not limited to, clicking a link or icon or button with an appropriate label, that is not specifically associated with any particular TPCP in the screen, or update the CH's status value to "Requesting Assistance from any TPCP".

Figure 27:
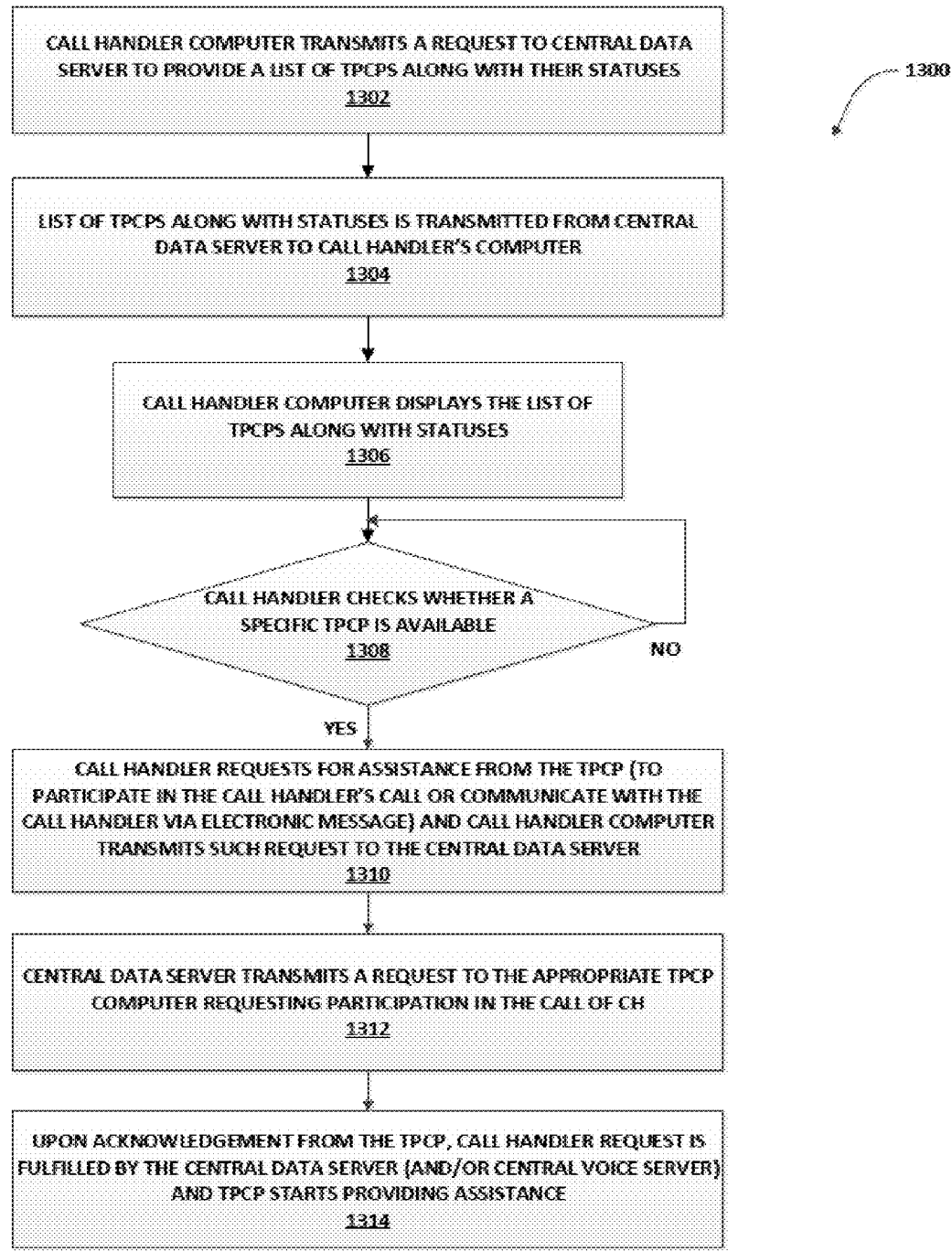
FIG. 27 is a flowchart illustrating actions performed by the system when a CH requests assistance from a specific TPCP to participate in the call of the CH or communicate with the CH via electronic message, in accordance with the Remote Coach embodiment.

FIG. 27 is a flowchart 1300 illustrating actions performed by the system when a CH requests assistance from a specific TPCP to participate in the call of the CH or communicate with the CH via electronic message, in accordance with the Remote Coach embodiment. While FIG. 27 generally refers to a single CH, one having ordinary skill in the art will appreciate that there may be more than one CH in the present system, resulting in the steps of FIG. 27 being performed by each CH.

As shown by block 1302, once a CH initiates a request a list of TPCPs along with their statuses, such request is sent to the central data server. As shown by block 1304, the central data server responds to the request of the CH by transmitting the list of TPCPs long with their statuses. Based on implementation preferences, the TPCP information associated with such a list may include, but is not limited to, TPCP name, TPCP title, TPCP status and other relevant information.

As shown by block 1306, upon receiving the list of TPCPs, the computer of the CH displays the list of TPCPs with statuses. As shown by block 1308, the CH checks whether the status of a specific TPCP indicates that the TPCP is available. As shown by block 1310, if the TPCP is available, the CH initiates a request for the TPCP to participate in the call of the CH using a specific Call Participation Mode (or communicate with the CH via electronic message using a specific type of electronic messaging, as the case may be) and such request is sent to the central data server. It should be noted that if the TPCP is not available, the CH may wait and then proceed to perform the function shown by block 1308 again and thereby going into a loop. Please note, based on implementation preferences, the system might allow the CH to initiate such request without checking TPCP's availability (by skipping the function shown by block 1308) and in which case, if the TPCP is not available the system may alert the CH and optionally put the CH's request in a waiting mode until the TPCP becomes available (and then proceed to fulfill CH's request upon the TPCP becoming available).

As shown by block 1312, the central data server transmits a request to the TPCP computer requesting the TPCP to participate in the call of the CH. As shown by block 1314, upon acknowledgement of TPCP from the TPCP, the central data server fulfills the request of the CH. Based on implementation preferences, such fulfillment of the request may include, but not limited to, having the central voice server connect the phone call of the TPCP to the phone call of the CH in order to accomplish the requested Call Participation Mode, and sending some or all of the information shown in the screen of the CH to the computer of the TPCP. It should be noted that based on the implementation preferences, the central data server may not transmit a request to the TPCP computer requesting the TPCP to participate in the call of the CH and may directly proceed to fulfill the request of the CH without waiting for the acknowledgement of the TPCP (by skipping the function shown by block 1312).

Figure 28:
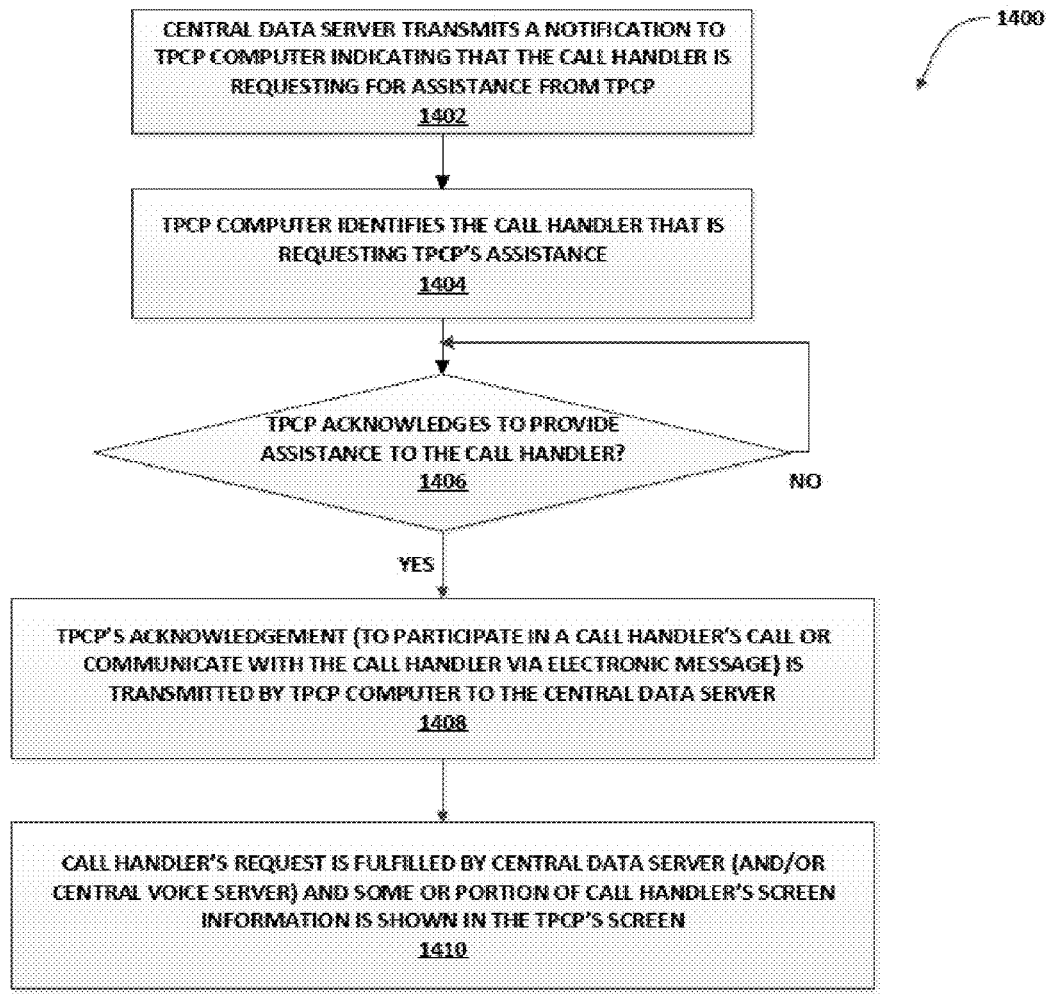
FIG. 28 is a flowchart illustrating actions performed by the system when TPCP acknowledges to provide assistance to the CH, in accordance with the Remote Coach embodiment.

FIG. 28 is a flowchart 1400 illustrating actions performed by the system when TPCP acknowledges to provide assistance to the CH, in accordance with the Remote Coach embodiment. While FIG. 28 generally refers to a single TPCP, one having ordinary skill in the art will appreciate that there may be more than one TPCP in the present system, resulting in the steps of FIG. 28 being performed by each TPCP.

As shown by block 1402, the central data server transmits a notification indicating that the CH is requesting for assistance from the TPCP. As shown by block 1404, upon receiving such foregoing notification, the computer of the TPCP identifies the CH that is requesting assistance of the TPCP. As shown by block 1406, the TPCP acknowledges to provide assistance to the CH.

As shown by block 1408, upon acknowledgement by the TPCP, acknowledgement of the TPCP to participate in the call of the CH using a specific Call Participation Mode or communicate with the CH via electronic message using a specific type of electronic messaging, as the case may be is sent by the TPCP computer to the central data server. It should be noted that if the TPCP is yet to acknowledge to provide assistance to the CH, the TPCP computer may wait and then proceed to perform the function shown by block 1406 again and thereby going into a loop.

As shown by block 1410, upon receiving acknowledgement from the TPCP, the central data server fulfills the request of the CH. Based on implementation preferences, such fulfillment of the request may include, but not limited to, having the central voice server connect the phone call of the TPCP to the phone call of the CH to accomplish the requested Call Participation Mode, and sending some or all of the information shown in the screen of the CH to the computer of the TPCP.

Please note, based on implementation preferences, a TPCP may be allowed to acknowledge (as shown by block 1406) providing assistance to CH in a Call Participation Mode (or the type of electronic messaging, as the case may be) different from what the CH is requesting, in turn the central data server may fulfill the request of the CH (as shown by block 1410) consistent with the acknowledgement of the TPCP.

Further, the system may be implemented, to have the CH's request (or the TPCP's request, as the case may be) to have additional information, including but not limited to, priority of the request, which may assist in understanding how to prioritize the fulfillment of the requests. It should be noted that wherever the description of the Remote Coach embodiment refers to the word "request" in the context of one component of the system sending a notification to another component, based on the context, for example, as in "transmits a request" or "requests", it means a message is transmitted from one component of the system to one or more component of the system that enables the recipient component to take appropriate action based on the message. One having ordinary skill in the art would understand and appreciate that there are many ways to implement such a request/notification message.

Figure 29:
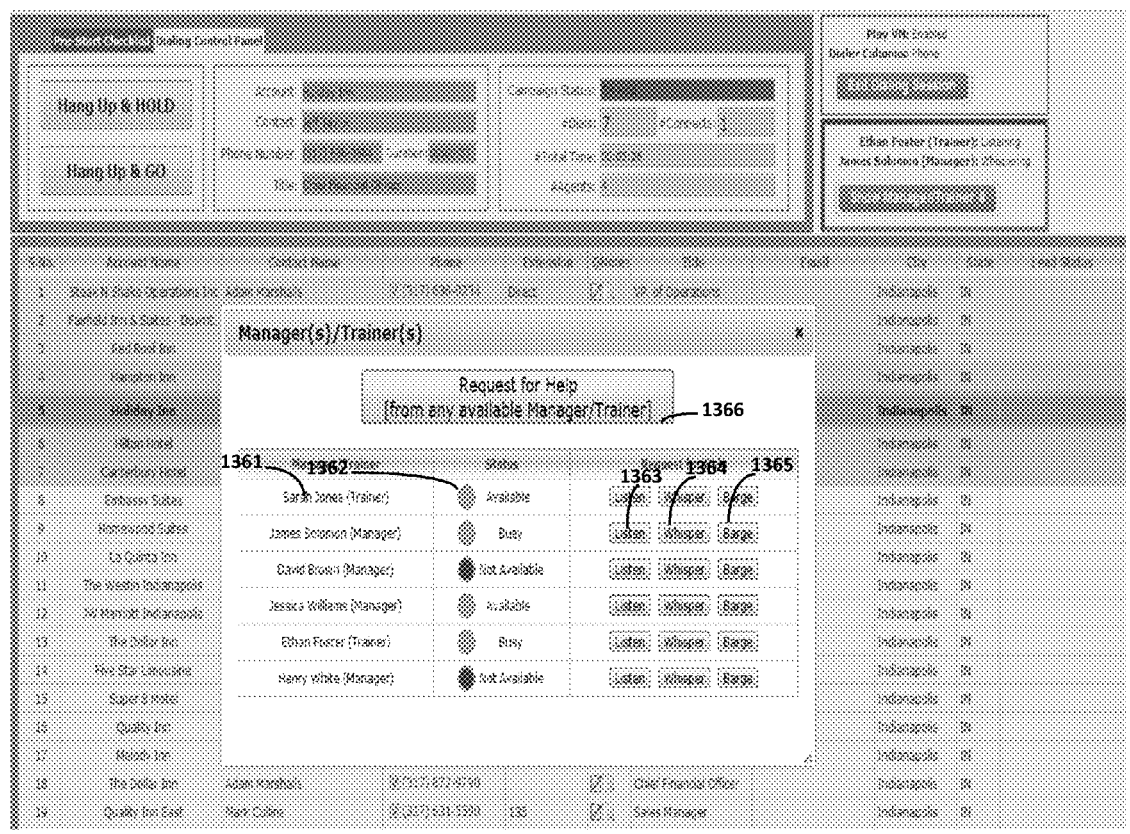
FIG. 29 is an exemplary screen view illustrating an interface that allows the CH to view the availability of the TPCPs mapped to/authorized for the CH and request for a call participation.

FIG. 29 is an exemplary screen view illustrating an interface 1360 that allows the CH to view the availability of the TPCPs mapped to/authorized for that CH and request call participation. As shown in FIG. 29 the interface 1360 contains: a column 1361, for showing the name of each TPCP; a column 1362, for showing the status of each TPCP; a button 1363, for requesting the TPCP to listen to the call of CH upon clicking the button; a button 1364, for requesting the TPCP to whisper to the call of CH upon clicking the button; a button 1365, for requesting the TPCP to barge into the call of CH upon clicking the button; and a button 1366, for requesting call participation from any one of the available TPCPs and have the system notify such request to all available TPCPs.

In accordance to the Remote Coach embodiment, the system 50 (FIG. 45) may display identification of CHs (who are mapped to that TPCP) and their status on the screen of the TPCP. Upon a CH requesting for assistance in the call, based on implementation preferences, the TPCP computer in the system 50 (FIG. 45) may indicate/alert to the TPCP that the CH is requesting for assistance, by showing an updated CH status information.

Instead of updating the status value of the TPCP or the status value of the CH in the system, each status value may be distinguished from other statuses by using one or more of many different methods, including but not limited to, changing colors, blinking, circling, shading, changing the border around the TPCP information or the CH information, showing the TPCP information or the CH information in specific area of the screen, and pointing to the TPCP or the CH (as the case may be), shown in the computer.

The TPCP statuses may include but not limited to, "I am Available", "I am Away", "I am Invisible", or the like. Please note, CH's statuses may include, but not limited to, "Requesting Assistance from a specific TPCP", "Requesting Assistance from any TPCP", "Not Requesting Assistance", or the like.

A CH and/or TPCP may prefer electronic message communication instead of participating in the phone call because of certain benefits of using electronic messages. For example, the CH and the TPCP can exchange electronic documents/ diagrams via the electronic message. Electronic message communication may be less distracting to the CH comparing to the distraction when the TPCP is whispering to the CH. The electronic message communication can take place without the customer noticing it. On the other hand, the CH and/or the TPCP may prefer participating in the phone call instead of electronic message communication because by participating in the phone call the TPCP may hear the voices of both the CH and the customer and understand the context of the conversation better and whisper to the CH or talk to both the CH and the customer using barge mode.

The system 50 (FIG. 45) may allow the CH to request participation of more than one TPCP via phone call participation or communicating via electronic message. During a phone call the system 50 (FIG. 45) may allow one or more of the authorized persons participating in the phone call to mute/unmute one or more of the other participants to allow their voices to be audible to others or not.

A person having ordinary skill in the art can easily understand that this system and method may be customized and/or extended to facilitate the collaboration among the CHs and the TPCPs. For example, in a call center environment, the CHs may be the sales reps and the TPCPs may be the sales supervisors (or sales managers or sales trainers or sales coaches or the like) and the Call Participation Functionality may be implemented accordingly.

Remote Coach embodiment could be extended to allow a CH and a TPCP to interchange the roles. For example, the CH may request the TPCP to exchange the roles, and once the TPCP acknowledges such request the system may interchange the screens provided to each other and interchange the role played by each in the phone session. Prior to interchanging the role played by the CH and the TPCP in the phone session, the CH was handling the call and TPCP was participating in the call of the CH using a Call Participation Mode, and upon interchanging the roles in the phone session, the TPCP assumes handling of the call and the CH assumes participating in the call using an appropriate Call Participation Mode. Upon interchanging the screens, (i) a portion or the entire screen shown to the CH previously may be shown to the TPCP and the TPCP may be given the appropriate controls on the screen functions to allow the TPCP to play the role of the CH, and (ii) a portion or the entire screen shown to TPCP previously may be shown to the CH and the CH may be given only appropriate controls on the screen functions to allow the CH to do, including but not limited to, observing and learning from the TPCP that is acting as a CH. The TPCP or the CH may request to reverse the interchanging, and upon the other party acknowledging such request, the system may reverse the interchanging and revert them to their roles before the interchanging. Based on implementation preferences, if there is more than one TPCP involved, the TPCPs that do not interchange the role with the CH may continue to participate after the interchange occurs (and thereby the non-interchanging TPCPs may observe/collaborate with interchanging TPCP that is playing the role of the CH and/or the previous CH that is playing the role of the TPCP after the interchange).

Instead of CH, a TPCP may request the CH to interchange roles, and once the CH acknowledges such request the system may interchange the screens and interchange the roles in the phone session. Based on implementation preferences, the system may allow the CH and the TPCP to (i) interchange only their screens, (ii) interchange only the role played by each in the phone session, or (iii) interchange their screens and their roles in the phone session.

If the TPCP is training or coaching the CH, interchanging the roles played by the CH and the TPCP may allow the TPCP to play the role of the CH (by handling customer calls effectively, updating the notes and other customer information in the system effectively, reducing the time spent in-between calls, and the like) for the purposes of demonstrating to the CH the effective way of handling the call(s) of the CH.

The Remote Coach may provide the option to create an audit trail of the collaboration among CHs and TPCPs. Such an audit trail may include but not limited to, the start time and end time of participation of the TPCP in the call of the CH, the name of the TPCP, the name of the CH, an audio recording of the collaboration, and other relevant information. Such collaboration audio may include voices of the CH and the TPCP. Optionally, that audio could also include the voice of the customer. If more than one TPCP is participating in the call of a CH, it is possible to include some or all voices of such additional TPCPs. This feature is helpful to review the effectiveness of a supervisor/coach (acting as the TPCP), and to determine whether the supervisor/coach is spending enough time in coaching, etc. Prior permission may be needed from one or more parties participating in the call before recording their voice. Based on implementation preferences, when a coach (acting as a TPCP) is providing assistance to a CH, one or more authorized persons (for example, a supervisor of the coach) may act as another TPCP and provide assistance to the coach. This type of hierarchical levels of coaches, up to many levels, may be implemented by extending the Remote Coach. A person with ordinary skill in the art will understand the various ways the Remote Coach may be customized or extended.

A person having ordinary skill in the art can understand and appreciate that the Third Party Call Participation Functionality may be extended in another embodiment to have a system to record a call of a CH upon one or more persons requesting the system to record ("Record") the call of the CH. Such recording may include, but is not limited to, (i) current call at the time of such request to record, (ii) one or more future calls, or (iii) both current call and future calls. Such recording may be for a specific period of time or for a specific number of calls. The system may be modified to provide the option of whether to record only when the talker is connected to a customer or the recording may continue during the time when the talker is in-between customer calls. The person requesting to record the call of the CH may be the CH himself/herself or a TPCP. Based on user preferences, the system may record the call of the CH concurrently when one or more TPCPs are participating in the call of the CH.

In an alternative embodiment of the present invention, the system could be implemented by 1) automating all or a portion of the dialing agent's function to navigate a customer phone call (through including, but limited to, phone menus and voicemails) until reaching the live customer, by using techniques such as but not limited to, playing the correct sequence of digits (along with the appropriate delays in between digits) that were stored as part of the customer data, and 2) having the system recognize whether a live human voice is encountered in a phone call. For certain customer records where the navigation function could be automated fully by having the system perform the navigation function, the system could dial the customer phone number, navigate the phone call (through but not limited to phone menus and voicemails), and upon the live customer picking up the call, recognize the live human voice and transfer that call to the talker. For the customer records where the phone call navigation could be fully performed by the system, the foregoing arrangement could eliminate the need to have the human dialing agent by having the system do the same phone call navigation work. It should be noted that if the system is performing the phone call navigation function fully for certain customer records without having the human dialing agent involvement there is no need to have a separate dialing agent computer and no need to display the customer record that is being dialed in the dialing agent computer screen (and instead the dialing agent software function could be modified to operate in a non-interactive mode and implemented as a module in the central data server). During such customer call transfer (followed by phone call navigation by the system) if the talker is busy, based on implementation preferences, such call could be transferred to one of the secondary talker(s) waiting to handle such calls. Secondary talkers could be individuals with skills equal to, more, or less skilled than the talker based on the requirement. The customer records for which the phone call navigation function could not be automated fully by having the system perform the phone call navigation function, the human dialing agent is required for phone call navigation and the system could be used to assist the human dialing agent by automating a certain portion of the customer call navigation. Each customer record could be marked as whether the phone call navigation is fully possible by the system or not. Based on the mix of customer records (navigation by system fully possible versus navigation requiring human dialing agents) there is possibility to have no human dialing agents or a lesser number of human dialing agents working alongside of the system performing the function of the dialing agent(s) in a campaign.

Based on implementation preferences in the foregoing embodiment, the system, a user of the system, or a combination of the user and the system, could update the customer record with information including but not limited to 1) whether the customer phone number is a direct dial phone number or goes to a phone menu(s) that could be navigated by pressing specific digits, and 2) if dialing the phone number goes to a phone menu, the digits such as menu options or extension number that need be pressed (along with the delay that need to be provided between each such digits) to navigate through each phone menu that may be encountered, until the phone call ringing the correct target customer. It should be noted that while the dialing agent is navigating phone menus during a customer call one of the components of the system could be implemented to learn and automatically capture the digits pressed by the dialing agent (along with the delay between digits) and store that information in the associated customer record. While the dialing agent is on a customer call, the system could assist the dialing agent to identify whether the call is picked by a live human being or a phone menu, and upon encountering a phone menu the system could assist the dialing agent by automatically playing the digits required to navigate that phone menu. In a customer call that is designated, a system could navigate fully until reaching the live person. If the customer call encounters a live human voice instead of an expected phone menu the system could recognize that live human voice and transfer the call to the talker (or, based on implementation preference, transfer that call to an available dialing agent to navigate further until the correct live target customer is reached, upon which the dialing agent will further transfer the call to the talker). A person having ordinary skill in the art would know the various techniques that could be used in the foregoing embodiment.

In accordance with the present invention, there could be many variations on (including, but not limited to) how the customer list and data are created, campaign is created, campaign is started, what portion of the customer list and customer data are transmitted to the dialing agent computer and talker computer and when transmitted, and whether the customer records are allowed to undergo changes while the campaign is in progress. Further, there could be many variations in (including, but not limited to) whether the customer list is finalized and transmitted to the dialing agent computer and talker computer before starting the campaign, or whether the customer list is generated dynamically (in a small batch of records or one customer record at a time) based on specific customer record selection logic and transmitted to the dialing agent and talker computer while the campaign is in progress. At any given time, the list of customer records and customer data shown on the dialing agent computer may or may not be the same as that shown in the talker computer. Notwithstanding the above variations, it should be emphasized that (1) when the dialing agent(s) is dialing a customer record(s), concurrently the same customer record(s) is highlighted in the talker computer (to accomplish this, the talker computer should receive the customer record(s) dialed by the dialing agent simultaneously at the same time or before when the customer record(s) is highlighted to show that customer record(s) is being dialed), and (2) when a customer call is transferred by the dialing agent the customer record associated with the transferred customer call is highlighted differently on the talker computer to allow the talker to differentiate the customer record whose call is transferred versus the customer record(s) that is being dialed. By following this sequence, the talker is capable of reviewing customer data and being prepared for a transferred customer call prior to receiving such transferred customer call.

It should be noted that whenever this document refers to a "customer record" the fields associated with a specific customer record shown to the dialing agent could vary from the fields associated with the same customer record shown to talker. It should be noted that whenever this document refers to "concurrently", "simultaneously", "in real time" or "at the same time" or other terminology referring similar meaning should be interpreted by taking into account reasonable delays associated with speed of computers, phone systems and networks.

It should be emphasized that the embodiments of the present invention described in this document are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the claims.

It should also be noted that customer records and other data within the present system and method, may be stored within a single location or more than one location. In fact, such data may be partially stored locally and partially stored remotely.

For the purposes of the references in this document, "Live Conversation System" or "LCS" refers the system and method described in U.S. patent application Ser. No. 13/278,764 (which has been incorporated by reference in its entirety), for maximizing speed of transferring a call from taking place between a dialing agent and a customer, to taking place between a talker and the customer. The business that fulfills a Service Request (defined below) or provides the LCS and/or the dialing agents is referred to herein as the "Vendor". Any personnel associated with the Vendor is referred to herein as the Vendor personnel. Also, campaign, session, dialing campaign, dialing session, calling campaign, and calling session are interchangeably used in this document to mean the Campaign (as defined previously in the U.S. patent application Ser. No. 13/278,764). Typically, the campaign or session is specified in time duration that has a start time and end time. It should be noted that "campaign" should not be confused with "marketing campaign" as they do not refer the same thing. Also, in this document, "contact", "customer", and "prospect" are interchangeably used to mean the same thing.

Talkers may need help with various tasks, including but not limited to, cleaning up the customer list, delivering pre-recorded voice messages to customers, and sending emails to customers based on previously created email templates (these tasks are further described below). Hence, it is desirable for a module or system that allows the Talker to request various service requests (each such service request is referred to herein as the "Service Request" or "SR") or tasks to be performed by a party, including but not limited to, the Vendor (such party providing the service is referred to herein as the "Service Provider"). Such a module or system that allows the talker to initiate a SR and have a Service Provider fulfill the requested SR is referred to herein as the "Service Request App". "Talker", "user", "sales rep" and "sales representative" may be used interchangeably to refer to the same in the sections of this document that describe the Service Request App.

An exemplary embodiment of a Service Request App implemented by extending the system 10 (FIG. 1) is described below. A Service Request may be of different types, including but not limited to, List cleanup, VM Drop, Email Drop, Technical Support, or the like. For the purposes references in this document, VM refers Voice Message or Voice Mail and "Drop" as in "VM Drop" means playing the VM to customer's phone for the purpose of delivering the VM; or "Drop" as in "Email Drop" means sending email message.

Based on the implementation preferences, within the exemplary embodiment of the Service Request App, a Talker can click "Create New Request Service" icon to create a new SR and upon clicking, a popup screen wizard may be launched to capture the necessary info and create a new SR entry in the database with a status equal to 'pending'.

For a SR of type equal to 'VM Drop', information for various fields, including but not limited to, the following fields may be captured: List of customer records, Task Start Date & Time, Task End Date & Time, Description of the SR, and VM that needs to be dropped. Further, for a SR of type VM Drop an option may be provided to the user of the system to select one or more caller IDs to be used when fulfilling the SR.

For a SR of type equal to 'Email Drop', information for various fields, including but not limited to, the following fields may be captured: List of customer records, Task Start Date & Time, Task End Date & Time, Description of the SR, and Email message or Email message template that needs to be sent. Further, for a SR of type Email Drop an option may be provided to the user of the system to select one or more email addresses (from which email address the emails may be sent) to be used when fulfilling the SR.

For a SR of type equal to 'Technical Support', information for various fields, including but not limited to, the following fields may be captured: Task Start Date & Time, Task End Date, and Description of the SR.

For a SR of type equal to 'List Clean-Up', information for various fields, including but not limited to, the following fields may be captured: List of customer records, Task Start Date & Time, Task End Date & Time, and Description of the SR.

Figure 30:
FIG. 30 is an exemplary screen view illustrating an interface that allows a user of the system to view a list of submitted Service Requests and allow the user to initiate a new Service Request, in accordance with the exemplary embodiment of Service Request App.

FIG. 30 is an exemplary screen view illustrating an interface 1500 that allows a user of the system 10 (FIG. 1) to view a list of submitted Service Requests and allow the user to initiate a new Service Request, in accordance with the exemplary embodiment of Service Request App. As shown in FIG. 30 the interface 1500 contains: a column 1501, for showing the Service Request type of each Service Request; a column 1502, for showing the start date of each Service Request when the fulfillment of the Service Request needs to be started; a column 1503, for showing the end date of each Service Request when the fulfillment of the Service Request needs to be completed; a column 1504, for showing the status of each Service Request; a column 1505, for showing the date when each Service Request is completed; a column 1506, for showing the buttons to initiate appropriate actions such as delete, edit, and the like on the Service Request; and an Add New Service Request button 1507, for initiating a creation of new Service Request.

Figure 31:
FIG. 31 is an exemplary screen view illustrating an interface that allows a user of the system to create or update a Service Request of type Email Drop, in accordance with the exemplary embodiment of Service Request App.

FIG. 31 is an exemplary screen view illustrating an interface 1520 that allows a user of the system 10 (FIG. 1) to create or update a Service Request of type Email Drop, in accordance with the exemplary embodiment of Service Request App. As shown in FIG. 31 the interface 1520 contains: a Service Request Type field 1521, for entering or updating Email Drop as the Service Request type; a Customer List Name field 1522, for entering or updating the name of the customer list associated with the Service Request; an Email Template to be used field 1523, for entering or updating the Email message template that needs to be used to fulfill the Email Drop request; a Start Date field 1524, for entering or updating the date when the Service Request may need to be started; an End Date field 1525, for entering or updating the date when the Service Request may need to be completed; a Preferred Day of the week field 1526, for entering or updating the preferred day of the week when Emails may be sent; a Preferred Time of the Day field 1527, for entering or updating the preferred time of the day when the Emails may be sent; and a Description field 1528, for entering or updating notes or description associated with the Service Request.

FIG. 32 is an exemplary screen view illustrating an interface 1540 that allows a user of the system 10 (FIG. 1) to create or update a Service Request of type VM Drop, in accordance with the exemplary embodiment of Service Request App. As shown in FIG. 32 the interface 1540 contains: a Service Request Type field 1541, for entering or updating VM Drop as the Service Request type; a Customer List Name field 1542, for entering or updating the name of the customer list associated with the Service Request; a voice message to be dropped field 1543, for entering or updating the name or identifier or the pre-recorded voice message that needs to be delivered to the customers in the customer list; a Start Date field 1544, for entering or updating the date when the Service Request may need to be started; an End Date field 1545, for entering or updating the date when the Service Request may need to be completed; a Preferred Day of the week field 1546, for entering or updating the preferred day of the week when a voice message may be delivered; a Preferred Time of the Day field 1547, for entering or updating the preferred time of the day when the voice message may be delivered; and a Description field 1548, for entering or updating notes or description associated with the Service Request.

Figure 33:
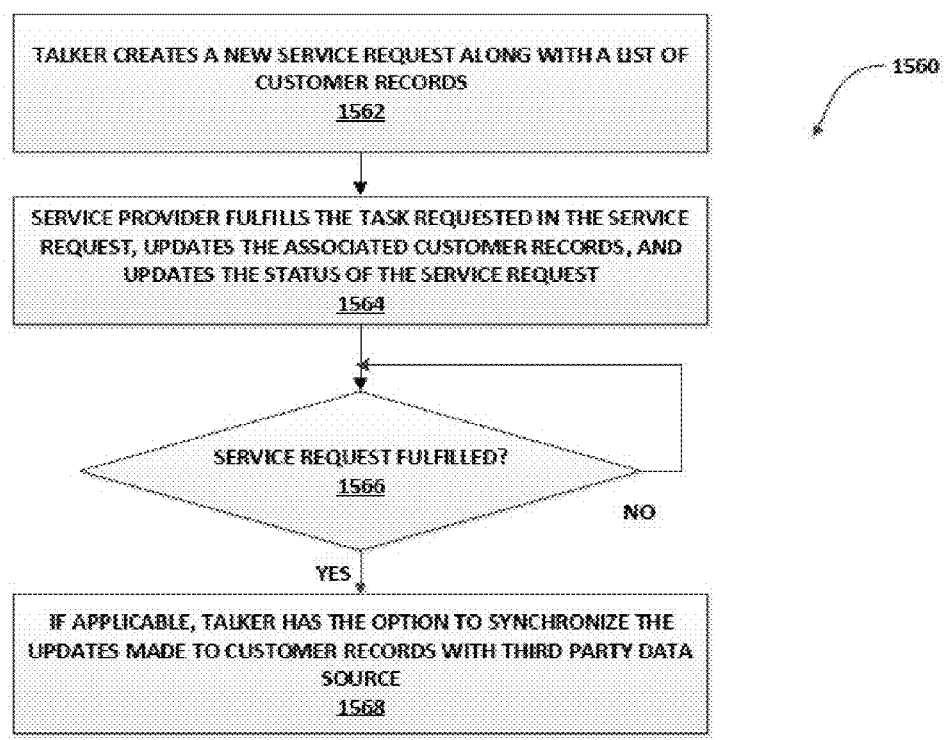
FIG. 33 is a flowchart illustrating actions performed by the system when a talker creates a new Service Request, in accordance with the exemplary embodiment of Service Request App.

FIG. 33 is a flowchart 1560 illustrating actions performed when a talker creates a new Service Request, in accordance with the exemplary embodiment of Service Request App. As shown by block 1562, a talker creates a new Service Request along with a list of customer records (it should be noted that customer list may not be applicable for certain type of Service Requests, for example, a Service Request may be created to request the Service Provider to create a new list of customers based on specific criteria specified by the talker); As shown by block 1564, the Service Provider fulfills the Service Request, updates the associated customer records (if applicable), and updates the status of the Service Request to indicate that the Service Request has been fulfilled; As shown by block 1566, the talker checks to determine whether the Service Request has been fulfilled; As shown by block 1568, once the Service Provider fulfills the Service Request, if applicable the talker has the option to synchronize with third party data source (if applicable) the updates made by the Service Provider to the associated customer records. It should be noted that if the Service Provider is yet to fulfill the Service Request, the talker may wait and then proceed to perform the function shown by block 1566 again and thereby going into a loop.

Further describing the exemplary embodiment of Service Request App, a SR of type "List Clean-Up" may request the Service Provider to validate the various fields of each customer record, including but not limited to, first name, last name, title, phone number, and email id. Such validation may request the Service Provider to (i) use Internet resources like social media websites, news media websites, company websites, or list provider database(s) to validate fields of the customer record, (ii) verify the phone number by dialing the phone number/navigating the call to talk to someone at the business associated with the customer to verify that the customer works in that business or navigate the call to hear voice greeting of the customer that might act as a reasonable indicator that the customer still works in that business, or (iii) validate email address by using email software features that could validate whether the given email could be delivered or not, among others.

A SR of type "VM Drop" may request the Service Provider to drop the specified pre-recorded voice message to the list of customers by dialing each customer phone number, navigating the phone call, and after hearing the voice greeting of the customer (if applicable, wait for the prompt to record a voice message) playing the voice message appropriately. Please note, based on implementation preferences, the system may be automated to start playing the voice message after the customer voice greeting is completed (if applicable, wait for the prompt to record voice message).

A SR of type "Email Drop" may request the Service Provider to send the email that is created based on the Email message specified in the SR or the Email message derived from the Email message template specified in the SR (through email merging with the customer record fields). Such SR may be fulfilled by the system without human involvement from the Service Provider side.

A SR of type "Technical Support" may request the Service Provider review the technical issue related to the system (or another system) described as part of the SR and take the necessary action to address the issue.

The user may specify a list of customer records by selecting one or more of the lists previously uploaded to the system 10 (FIG. 1) or defined in the system 10 (FIG. 1) with information about how to pull from a data source, including but not limited to, third party systems or databases or files located in hard drives or in the cloud. It should be noted that the customer records in such a list that is defined in the system (not previously uploaded) are located in the data source outside of the system, and that list may be pulled at the time when the SR is fulfilled which means such list will be finalized at that point in time and any changes taking place to that list of customer records (in the data source where the customer records are stored) until that time may be taken into account. The list that was previously uploaded to the system 10 (FIG. 1) may have the associated customer records stored in the system 10 (FIG. 1) which means only changes made to such customer records within the system 10 (FIG. 1) until the SR is fulfilled may be taken into account and any changes made to the customer records, stored in the third party data source from where the list of customer records was uploaded from, may not be available during the SR fulfillment. Once the SR is created, the user may preview the list and the associated customer records that are part of the SR. One having ordinary skill in the art would understand and appreciate that there could be more than one list of customer records be associated with a particular SR.

A user of the system 10 (FIG. 1) may specify any custom instructions in the description field. For VM Drop, the user may specify a previously recorded VM or specify multiple VMs where each VM is associated/mapped to, including but not limited to, (i) specific persona of each customer record, (ii) geographical location of the customer record, (iii) time when VM is delivered, and the like. For Email Drop, the user may specify one specific previously created Email Template or specify multiple Email Templates where each Email Templates is associated/mapped to, including but not limited to, (i) specific persona of each customer record, (ii) geographical location of the contact, (iii) time when Email is delivered, and the like. Persona of each customer record may be specified by the user or may be derived based on one or more attributes of the customer record, including but not limited to, job title, roles and responsibilities of the customer record, industry, geography, and the like. Based on implementation preferences, the system 10 (FIG. 1) may allow the user to specify VMs and/or Email Templates that are associated/mapped directly to different titles instead of personas. Based on implementation preferences, the user may specify a preferred date and time when a particular SR needs to be fulfilled.

Once the SRs are fulfilled by the Service Provider, the system may maintain the updates associated with each customer record. The updates may include, but are not limited to updates to customer record fields, history notes, and SR fulfillment related information. If applicable, such updates in the system 10 (FIG. 1) may be synchronized with the customer records and other relevant data located in a third party data source concurrently when updates are taking place in the system 10 (FIG. 1) or at a later time when access to such third party data source is possible. For example, in the case of single sign-on with a third party system, the user may need to login to allow access to the third party system for sending updates to such third party system.

Based on implementation preferences, all Service Requests associated with a talker may appear in the Service Requests screen with the associated status information and other relevant details. A user may request to delete or cancel the Service Request and the system will automatically delete the Service Request that is in Pending status. For Service Requests with other status, the system will notify the appropriate personnel of the Service Provider providing the service about the cancellation request, and they in turn may decide to cancel the Service Request, thereupon the system sends a cancelation confirmation to the user.

Based on implementation preferences, a Service Request created in the system may trigger workflow rules that perform actions such as, but not limited to, routing the SR to personnel of specific Service Providers based on SR type and sending email notification to such personnel. SRs routed to an authorized person on the Service Provider side could be shown to such person in his/her Service Request screen. Certain authorized Service Provider personnel may perform the services as per the SR and update the status of the SR as progress is made; such status may include but is not limited to "In Progress", "Requested for more information", "Completed", "Unable to fulfill", and the like. Based on implementation preferences, any change in status of SR may trigger an email notification to the user who submitted the SR.

Based on implementation preferences, once the SR is fulfilled, when the talker reviews the list of customer records in the system 10 (FIG. 1), for each list (or for each customer record in the list) the system 10 (FIG. 1) may show information relevant to SR fulfillment. For example, such relevant information may include but not limited to an appropriate icon might be shown to represent the requested SR type, date and time when the SR was performed, and other relevant details to indicate whether the requested SR was performed (for example, whether VM was dropped, Email was sent, contact details are cleaned up, etc.).

In another embodiment of the system 10 (FIG. 1), it is desirable to have the system perform the following tasks in parallel: (a) the pre-defined tasks performed by a dialing agent upon determining that a customer could not be reached (as shown by block 804 (FIG. 14)), (b) the pre-defined tasks performed by a dialing agent upon determining that a customer is reached but could not be transferred due to the campaign being put on hold (as shown by block 808 (FIG. 14)), and (c) the system performing additional tasks described below (based on configuration specified by the talker or another authorized user). That is, collectively the dialing agents and the system 10 (FIG. 1) may perform one or more of the following tasks, including but not limited to: (i) if the customer call results in a customer voicemail, playing a pre-recorded voice message previously recorded by the talker or another user or leaving a voice message using the voice of the dialing agent, and once the voice message is left the system 10 (FIG. 1) may provide feedback to talker (in real-time or near real-time) by showing an appropriate icon next to one or more customer records associated with the customer indicating that the voice email has been dropped to that customer, (ii) based on the outcome of the call (various outcomes described below), sending an email that is created using an appropriate email template, and once the email is sent, the system 10 (FIG. 1) may provide feedback to the talker (in real-time or near real-time) by showing an appropriate icon next to one or more customer records associated with the customer indicating that the email has been sent to that customer, and (iii) prior to making the call, sending an email that is created using an appropriate email template, and once the email is sent, the system 10 (FIG. 1) may provide feedback to talker (in real-time or near real-time) by showing an appropriate icon next to one or more customer records associated with the customer indicating that the email has been sent to the customer. The functionality of the system 10 (FIG. 1) described in the foregoing paragraph is referred to herein as the "Multi-Touch Dialing Session".

In accordance with the Multi-Touch Dialing Session functionality, more than one form of communication or touch may be taking place to reach a customer in a dialing session. It should be noted that the words "marketing activity", "touch", and "communication" are used interchangeably to refer to the same thing. One having ordinary skill in the art would understand and appreciate that Multi-Touch Dialing Session functionality could be modified to include communication in the form of text message, chat message, and other forms of electronic messages.

Figure 34:
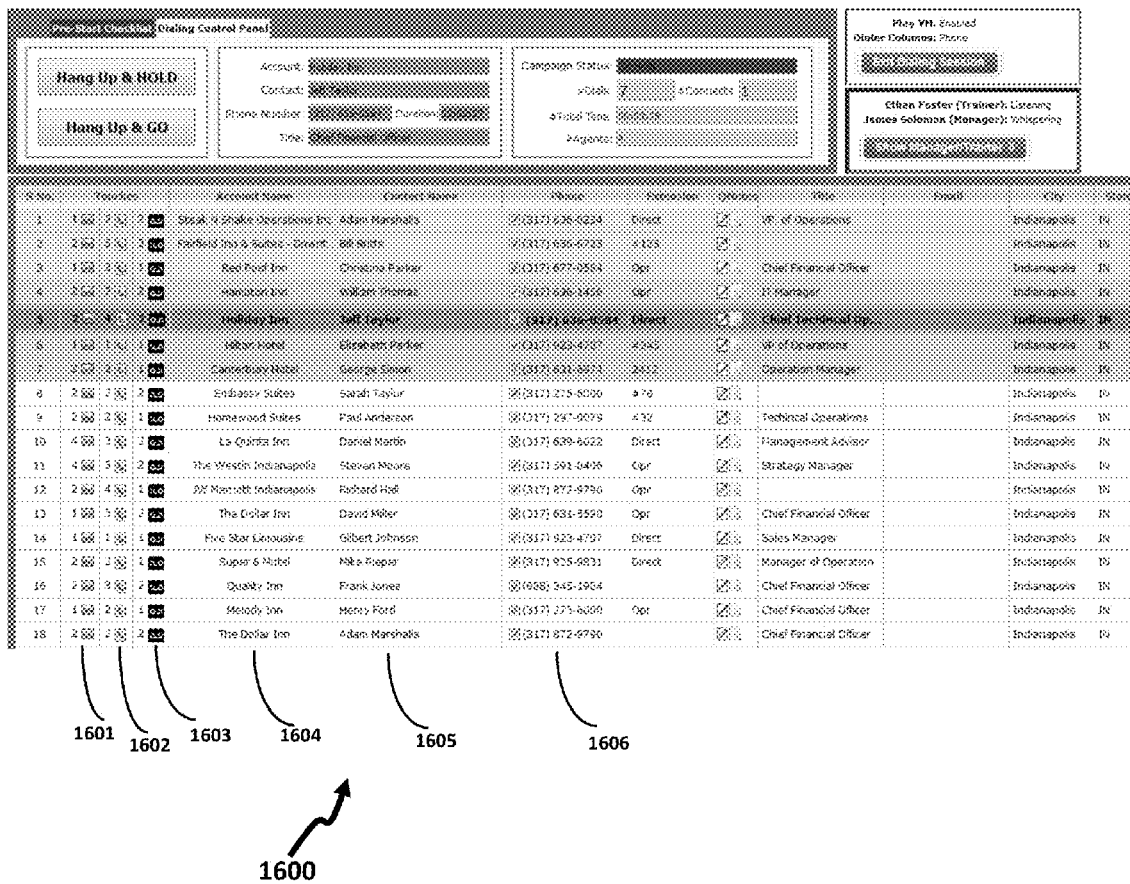
FIG. 34 is an exemplary screen view illustrating an interface showing Multi-Touch Dialing Session functionality of the system to a talker.

FIG. 34 is an exemplary screen view illustrating an interface 1600 showing Multi-Touch Dialing Session functionality of the system 10 (FIG. 1) to a talker. As shown in FIG. 34 the interface 1600 contains: a column 1601, for showing an email icon along with the number of emails sent to each customer; a column 1602, for showing a phone icon along with the number of calls attempted to reach each customer; a column 1603, for showing an voice message icon along with the number of voice messages delivered to each customer; a column 1604, for showing the account name/business name associated with each customer; a column 1605, for showing each customer name; and a column 1606, for showing the phone number associated with the customer.

It should be noted that instead of icons, the talker computer may show other elements including but not limited to, buttons, text, and hyperlinked text, to achieve the goal of providing feedback to the talker prior to, during, or after performing a task of communication/touch in the form of a voice message, email, or the like. A person having ordinary skill in the art would understand and appreciate that a component of the system 10 (FIG. 1) that performs the task of communication/touch may send notification to the talker computer directly or such notification may be sent in such a way that the notification goes through one or more hops involving one or more components of the system and finally reaching the talker computer.

The outcome of a call between a dialing agent and a customer in the system 10 (FIG. 1) may be, including but not limited to, (i) successful call transfer from taking place between the dialing agent and the customer to taking place between a talker and the customer, (ii) dialing agent playing a voice message pre-recorded by talker, (iii) dialing agent leaving a voice message using the voice of the dialing agent, (iv) dialing agent facing error conditions, including but not limited to, call cannot be made successfully (due to wrong/invalid phone numbers).

Whenever a voice message template or email template is used, the system may be configured to dynamically select the appropriate voice message template or email template based on the customer list or the persona of each customer in the list(s). For example, if more than one customer list is selected, each list may have a separate voice message or email template.

The icon shown in the talker computer to indicate that the voice message has been delivered may have other relevant details, including but not limited to, who recorded that voice message, the name given to that voice message recording/file, a timestamp, a number indicating how many times voice messages were left during a specific timeframe, and an audit trail history of voice messages have been delivered. The icon shown in the talker computer to indicate that the email has been sent may have other relevant details, including but not limited to, which email template was used to generate that email, the email itself, who created the email, a timestamp, and a number indicating how many times emails were sent during a specific time, audit trail history of emails sent, whether email was successfully delivered and opened by the recipient, whether the customer forwarded the email to someone else, and whether the customer has clicked any links appeared in the email and which links were clicked. Such details may appear next to the icon or appear upon the user performing, for example but not limited to, mousing over or clicking the icon or performing a gesture on the icon. When an email template is used to create an email, the system may email/mail merge to replace certain variables in the template with the attributes of the customer record. For example, the system may customize the body of the email to start with the first name of the customer by using the first name attribute associated with the customer record.

Similar to the icon shown to indicate voice message delivered or email sent, the system may show an icon to indicate a call attempt was made with relevant details, including but not limited to, a number indicating how many call attempts were made during a specific timeframe, and an audit trail history of call attempts with timestamps. Similarly, the system may show an icon to indicate that conversation(s) took place between the talker and the customer, along with relevant details, including but not limited to, a number indicating how many conversations took place during a specific timeframe, and an audit trail history of conversations with timestamps. A person having ordinary skill in the art would understand and appreciate that other relevant information may be gathered and shown to talker.

Figure 35:
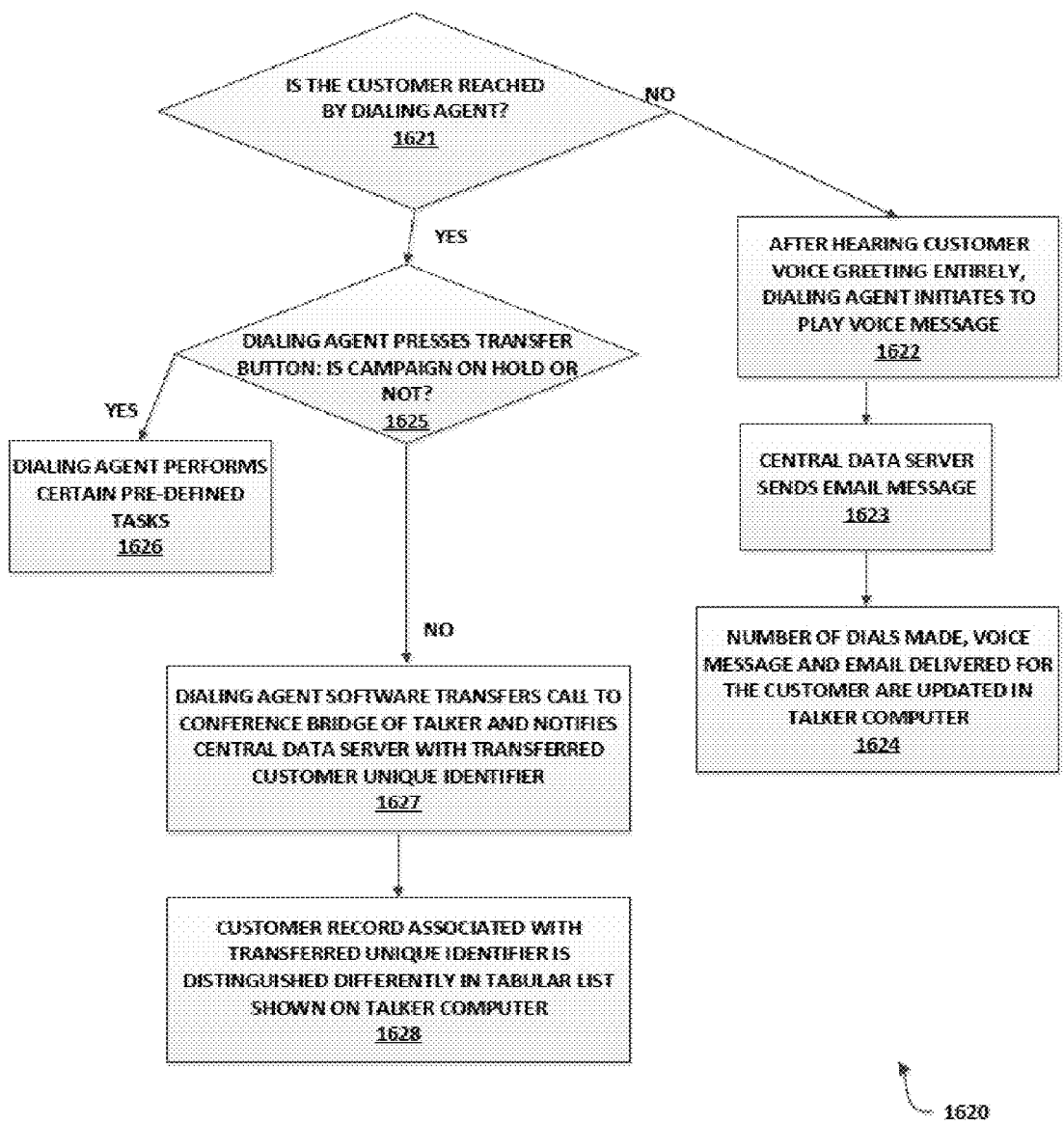
FIG. 35 is a flowchart illustrating a process of the dialing agent and system performing various marketing activities in parallel, in accordance with the embodiment of Multi-Touch Dialing Session functionality.

FIG. 35 is a flowchart 1620 illustrating a process of the dialing agent and system 10 (FIG. 1) performing various marketing activities (including but not limited to dialing, playing voice message, and sending email) in parallel, in accordance with the foregoing embodiment of Multi-Touch Dialing Session functionality. As shown by block 1621, the dialing agent determines whether the customer is reached by recognizing live customer voice in the phone call. As shown by block 1622, upon determining that the customer could not be reached, the dialing agent performs the marketing activity of playing a pre-recorded voice message by initiating to play voice message. Playing the voice message may be automated by having the system play the voice message and immediately allow the dialing agent to move on to the next call (instead of having the dialing agent wait until the voice message is played). Recognizing when the customer greeting ends or identification of when the prompt to begin playing a pre-recorded voice message could be automated in the system and the system may start playing the pre-recorded voice message at the appropriate time. As shown by block 1623, the central data server performs another marketing activity of sending an email message. It should be noted that based on implementation preferences, the functions shown by blocks 1622 and 1623 may be performed concurrently. As shown by block 1624, updated number of dials made, voice messages delivered, and emails sent for the customer are updated in the talker computer. It should be noted that based on implementation preferences, the updates associated with the number of dials made, number of voice messages delivered, and number of emails sent for the customer need not be sent together to the talker computer and instead updates associated with marketing activity may be sent separately to the talker computer or in groups.

As shown by block 1625, upon determining that the customer is reached (by recognizing live customer voice in the phone call), the dialing agent presses the transfer button provided by the dialing agent software, and the campaign status is determined to know whether the campaign is on hold or not. As shown by block 1626, upon determining that the campaign is on hold, the dialing agent performs certain pre-defined tasks such as talking to the customer and scheduling an appointment for the talker and the customer to connect later, and the like. As shown by block 1627, upon determining that the campaign is not on hold, the dialing agent software transfers the call to the conference bridge of the talker and notifies the central data server 100 (FIG. 1) with the customer unique identifier of the customer associated with the transferred call. Concurrently, when the call is transferred, the central data server 100 (FIG. 1) puts the campaign on hold to make sure that another dialing agent cannot transfer another customer to the talker. Based on implementation preferences, the call transfer function illustrated by block 810 could be implemented by having the dialing agent software send a transfer command directly to the central voice server 150 (FIG. 1) or indirectly to the central voice server 150 (FIG. 1) through the central data server 100 (FIG. 1). As shown by block 1628, the customer record associated with the customer unique identifier received from the central data server (after the central data server receives the customer unique identifier from the dialing agent computer) is highlighted differently in a list shown on the talker computer 24 (FIG. 1).

Typical marketing automation system encompasses automation of marketing processes that include budgeting and planning, workflow and approvals, marketing calendar, internal collaboration, digital asset creation and management; essentially the features that support the operational efficiency of the marketing function. Such prior marketing automation system that exists presently is referred to herein as the "Prior Marketing Automation System". A typical Prior Marketing Automation System requires an application administrator to set up a complex series of rules to trigger action items for sales and marketing professionals to execute action items, including but not limited to, designing files, sending letters, sending emails, and the like. Such system increases the ability of the marketers to deliver relevant content to relevant individuals at relevant times. Such systems rely on scoring the prospects based on their activities, including but not limited to, prospect downloading white papers, prospect attending webinar, and the like, and presenting drip messages via email, social channels, letter, invitation to download additional white paper(s), invitation to attend webinar(s), and the like; thus nurturing the prospect from first interest through to sale. A Prior Marketing Automation System lacks the capability to seamlessly plan, schedule, and execute calling via phone as another type of marketing activity/communication/touch to reach prospects in an integrated manner along with other types of marketing activities and report on the overall marketing effectiveness, and thereby increasing the efficiency of marketing process. Hence, it is desirable for a system that addresses the limitation and such an enhanced marketing automation system (referred to herein as the "Enhanced Marketing Automation System") is described below.

An exemplary embodiment of the Enhanced Marketing Automation System could be implemented by expanding the system 10 (FIG. 1) to provide the additional features necessary to meet the requirements of the Enhanced Marketing Automation System with advanced workflow coupled with capability for planning/scheduling/execution of calling session. Such a system may provide the marketing automation features other than the calling functionality by integrating with a third party marketing automation system or adding a similar functionality as a module within the system. An exemplary embodiment of the Enhanced Marketing Automation System includes capability to perform the marketing activities, including but not limited to: (i) scheduling/executing calling session, (i) scheduling/executing voice message drops, and (iii) scheduling/sending emails. The benefit of such Enhanced Marketing Automation System is that it couples the features of a Prior Marketing Automation System with calling sessions, resulting in an increased effectiveness in lead nurturing and reducing the time to close the sale. Also, businesses that do not have expertise and/or do not have enough resources to manage complex marketing automation process need a system to have sales professionals to plan and manage a reasonable marketing process that includes calling activity as one of type of marketing activity/communication/ touch. Such business objective could be met through an embodiment of the Enhanced Marketing Automation System described here that is simple to use by the sales professionals, in turn, allowing them to sustain meeting the foregoing business objectives.

FIG. 36 is an exemplary screen view of the Enhanced Marketing Automation System illustrating an interface 1650 showing the list of marketing campaigns. As shown in FIG. 36 the interface 1650 contains: a column 1651, for showing the name of the marketing campaign; a column 1652, for showing the name of the customer list associated with the marketing campaign; a column 1653, for showing the status of the marketing campaign; a column 1654, for showing the completion date of the marketing campaign; a column 1655, for showing the buttons to delete or edit the marketing campaign; and an Add New Marketing Campaign button 1656, for showing the button upon clicking which the system may show a screen to enter the information necessary to create a new marketing campaign.

Figure 37:
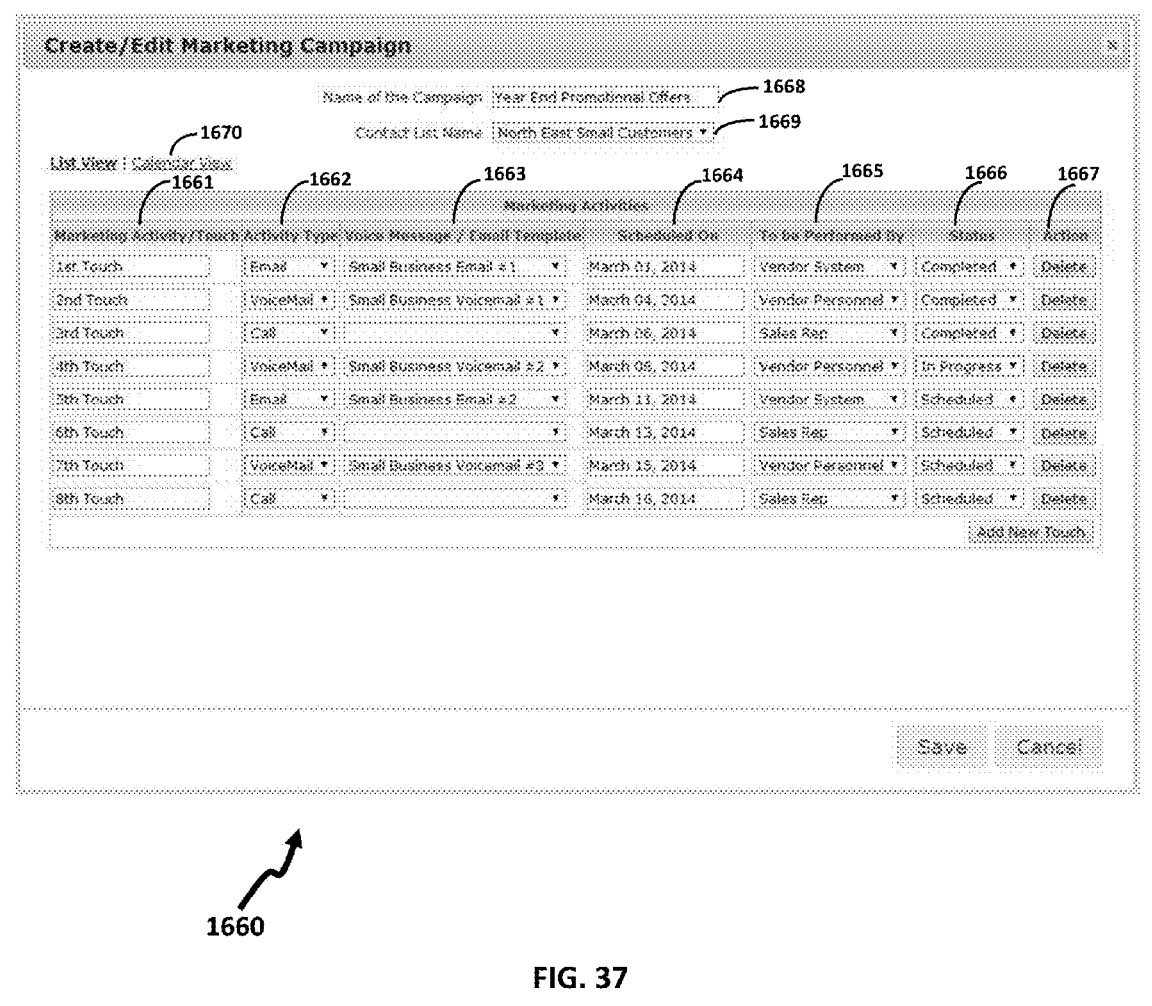

FIG. 37 is an exemplary screen view of the Enhanced Marketing Automation System illustrating an interface 1660 to capture the information necessary to create or edit a marketing campaign. As shown in FIG. 37 the interface 1660 contains: a column 1661, for showing the name of the marketing activity/touch associated with the marketing campaign (based on implementation preferences, the name of the marketing activity/touch may be modifiable by the user); a column 1662, for showing/updating the type of marketing activity; a column 1663, for showing/selecting/updating the voice message or email template associated with the marketing activity (if applicable); a column 1664, for showing/updating the date on which the marketing activity is scheduled to take place (based on implementation preferences, besides date information this column may include the time also); a column 1665, for showing/selecting/updating the vendor that is assigned to perform the marketing activity; a column 1666, for showing/updating the status of the marketing activity; a column 1667, for showing the delete button to delete the marketing activity upon clicking the delete button; a name of the campaign field 1668, for showing/entering the name of the marketing campaign; a customer list name field 1669, for showing/selecting/updating the customer list associated with name of the marketing campaign and the marketing activities/touches may be performed on such customer list; and a calendar view link 1670, for showing the link which would show the marketing activities/touch in a calendar view upon clicking such link.

FIG. 38 is an exemplary screen view of Enhanced Marketing Automation System illustrating an interface 1680 to show the marketing activities/touches of a marketing campaign in a calendar view. As shown in FIG. 38 the interface 1680 contains: a name of the campaign field 1681, for showing/entering the name of the marketing campaign; a customer list name field 1682, for showing/selecting/updating the customer list associated with name of the marketing campaign and the marketing activities/touches may be performed on such customer list; and a calendar view link 1683, for showing the link which would show the marketing activities/touch in a calendar view upon clicking such link; and a monthly calendar 1684, for showing the various marketing activities/touches associated with the marketing campaign that scheduled during the month. A person having ordinary skill in the art would understand and appreciate that the interface 1680 may be modified to allow the user of the system to update the marketing activities/touches and create new marketing activities/touches.

Based on implementation preferences, a sales representative (who might be a talker) could plan/schedule/execute the marketing activities/touches as described in the exemplary embodiment of Enhanced Marketing Automation System.

In the exemplary embodiment of the Enhanced Marketing Automation System, the system may be configured to perform more than one marketing activity/touch/task in parallel as described in the exemplary embodiment of Multi-Touch Dialing Session functionality above. For example, during a calling session, besides having a talker talk to customers, the system could perform a voice message drop and email drop in real-time or near real-time. For another example, based on the preference of the talker, during the calling session for 3rd Touch (FIG. 37), if the call does not result in a live call transfer to the talker, the system may allow the dialing agent to deliver a pre-recorded voice message (Small Business VoiceMail #2 in FIG. 37) that is associated with 4th marketing activity/touch. Thereby, the $3^{rd}$ and $4^{th}$ touches/marketing activities are executed effectively at a lower cost, when comparing to executing $4^{th}$ marketing activity/touch separately, since the dialing agents need not separately dial the phone and navigate the phone call for each customer to deliver the Small Business VoiceMail #2 that is associated with 4th marketing activity/touch.

As used in this document, "marketing process" or "marketing campaign" is a group of marketing activities, out of which, one or more activities may executed in a specific order, one or more activities may executed concurrently in parallel, and/or one or more activities may be skipped. All marketing activities need not be pre-planned, and a marketing activity in the marketing process (or a marketing intelligence input that meets specific criteria) may be configured to do, including but not limited to: (i) create/initiate/trigger one or more of the other marketing activities to be part of the marketing process, (ii) change the order of the marketing activities, or (iii) skip one or more of the marketing activities. For example, after completing the 2nd marketing activity/touch (FIG. 37), if a customer contacts the sales rep, the sales rep may update the customer record associated with the customer in the system to indicate that the customer has communicated with the sales rep, which in turn may remove the customer from the marketing process and the sales rep may plan being in touch with that customer in the future via scheduled follow up events in the calendar. As way of another example, after the 1st marketing activity/touch (FIG. 37), if a customer clicks a link in the email to request to be removed from future attempts to reach him/her, the system may automatically remove that customer from the marketing campaign/process and all remaining marketing activities/touches associated with the marketing campaign/process may not be executed for that specific customer. As a way of yet another example, during the 3rd marketing activity/touch (calling), if the sales rep talks to a customer and finds out that customer is not a qualified prospect, the sales rep may update the customer record associated with the customer to remove the customer from the marketing campaign/process.

Figure 39:
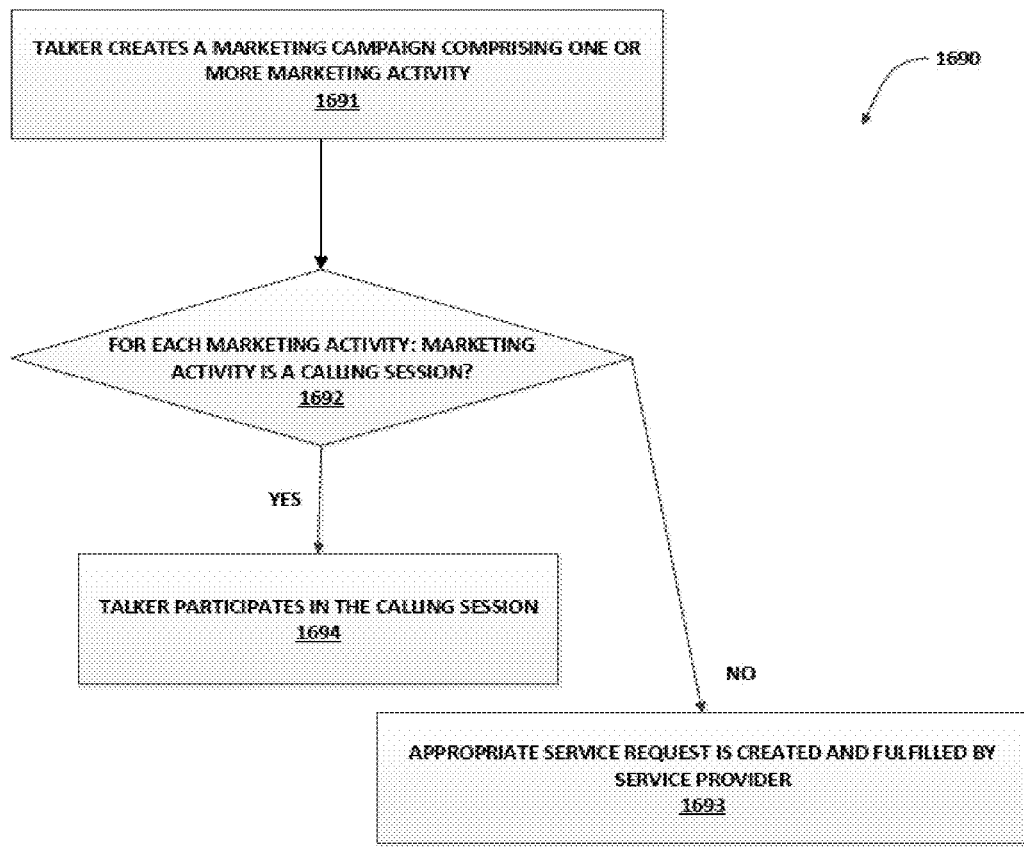
FIG. 39 is a flowchart illustrating actions performed when a talker creates a new marketing campaign, in accordance with the Enhanced Marketing Automation System.

FIG. 39 is a flowchart 1690 illustrating actions performed when a talker creates a new marketing campaign, in accordance with the Enhanced Marketing Automation System. As shown by block 1691, the talker creates a new marketing campaign comprising one or more marketing activity. It should be noted that a new marketing campaign may be created by another user of the system authorized to create a new marketing campaign. As shown by block 1692, each marketing activity is checked to determine whether the marketing activity is a calling session. As shown by block 1693, if a marketing activity is not a calling session an appropriate Service Request is created which may be fulfilled by a Service Provider. As shown by block 1694, if a marketing activity is a calling session the talker participates in the calling session.

Regarding marketing intelligence, the system may be configured to use tracking codes (commonly referred in the industry as 'cookies') in social media, email and webpages to track the behavior of anyone interested in a product or service to gain a measure of intent. The system may record which social media group or thread a specific prospect followed, which link was clicked on in an email or which search term was used in a search engine which led to accessing a website, or probabilistically identify a prospect based on IP address lookup/cookies and other similar mechanisms. If analysis of tracking data associated with multiple links shows that a prospect/buyer exhibited a behavior of clicking links, downloading white papers, attending webinars, and the like related to first product (not related to second product) such behavior demonstrates the prospect's interest in the first product (not in the second product). Such type of tracking would provide intelligent input to the marketing process which in turn allows for more accurately targeted response and the development of a marketing campaign to nurture the relevant customers and such a marketing campaign would specifically be targeted towards the customers in a vertical market that are interested in a specific product.

Based on implementation preferences, upon creating the marketing campaign/marketing process with certain marketing activities, the system may be configured to automatically trigger/create Service Requests (as described above in the exemplary embodiment of Service Request App), if appropriate. Further, based on implementation preferences, alerts may be generated by the system to provide reminder to the individual(s) that are assigned to perform the marketing activity or the individual(s) that created/requested the marketing activity. Also, based on implementation preferences, at specific times or time intervals, the system may automatically generate/send status report(s) (with appropriate information that is of interest to the recipients) or allow authorized personnel to manually generate such report.

A Vendor (as defined above) providing Live Conversation System and/or services of dialing agents may require a talker to schedule dialing session ahead of starting the dialing session for the purposes of effectively managing resources such as dialing agents, phone server resources, phone lines, and the like. Requiring a talker to communicate with a Vendor to schedule a dialing session via manual process, including but not limited to, phone or email, is a time consuming and error prone process. Hence, there is a need for a module or a system (referred to herein as "Scheduling App") that automates all or significant portion of the scheduling process. An exemplary embodiment of the Scheduling App also allows restricting the time window during which a specific talker is allowed to schedule their dialing sessions (such time window is referred to herein as "Scheduling Time Window"). For example, certain group of talkers classified as premium talkers (referred to herein as "first tier talkers") might be allowed to start scheduling their dialing sessions one month ahead of the start time of the dialing session and another group of talkers classified as non-premium talkers (referred to herein as "second tier talkers") might be allowed to start scheduling their dialing sessions only during one business day before start time of their dialing session. Based on implementation preferences, the start time of the Scheduling Time Window is prior to the end time of the Scheduling Time Window, and the start time of the Scheduling Time Window may be (i) prior to the dialing session start time, or (ii) same as the start time of the dialing session (if the talker is allowed to walk-in to start the dialing session (without pre-scheduling the dialing session), the system may automatically create a dialing session and in which case the start time of the Scheduling Time Window may be same as the start time of the dialing session).

Further describing the exemplary embodiment of the Scheduling App, the system allows restricting the time window during which a specific talker is allowed to cancel their previously scheduled dialing sessions (such time window is referred to herein as "Cancellation Time Window"). The Cancellation Time Window may require the talker to provide the required cancellation notice, to cancel his/her previously scheduled dialing session.

Continuing to describe the exemplary embodiment of the Scheduling App, the following sub-sections numbered 1, 2, 3, 4, 5, and 6 describe the features provided to talker.

1) Talkers may be assigned a role named "Talker". A talker may see only availability of dialing sessions in the form of free/busy time slots (similar to other third party calendars). And, based on implementation preferences, for each time slots, the talker may or may not see other details such as the count of available dialing agents with appropriate skills required by the talker at any given dialing session, availability of phone server resources required by the talker, and the like.

2) A talker may be allowed to schedule dialing session(s) only during his/her allowed Scheduling Time Window. The time window outside of that the Scheduling Time Window is shown/identified differently to indicate that the talker cannot schedule the dialing session(s) in that time window. For example, first tier talkers are allowed to schedule their dialing sessions one month ahead of start time of the corresponding dialing sessions, second tier talkers are allowed to schedule their dialing session(s) one business day ahead of start time of the corresponding dialing sessions, and the like.

3) A talker may be allowed to change (cancel/postpone) a previously scheduled dialing session if the required cancellation notice is provided. That is, if the remaining time before the dialing session starts falls below the specified Cancellation Time Window, the talker cannot cancel/postpone the dialing session. For example, first tier talkers are allowed change their previously scheduled sessions until one business day prior to start time of the corresponding dialing sessions, second tier talkers may not be allowed to change their previously scheduled sessions, and the like.

4) The system may show the availability of dialing session time slots based on whether the capacity (availability of dialing agents, LCS system resources, and other relevant resources needed to execute dialing session(s)), is sufficient or in excess to perform the dialing session(s) that are previously scheduled during a specific time period. Such capacity depends on, including but not limited to, the number of dialing agents with appropriate skills required, phone server resources, data server resources, internet bandwidth, other criteria requested by the talker, and the like. To be prepared to handle any unforeseen unavailability of resources during the time leading up to starting the dialing session, the system may be configured to take into account a portion of the capacity to be left unused or idling (for example, if the capacity is available to perform 80 dialing sessions concurrently between 9 am to 10 am, the system may allow the talkers to schedule only up to 64 dialing sessions, by taking into account 20% the capacity that needs to be left unused).

5) The system may show to a talker the amount of the dialing session time he/she purchased versus the amount of dialing session time he/she has used and the remaining available dialing session time. Such information may be shown in hours, minutes, and the like.

6) A certain authorized user of the system may be provided functionality to see (or get in the form of reports), including but not limited to, one or many or all of scheduled dialing sessions of the talkers, overall purchased dialing session time, and overall remaining dialing session time and the like. Such a user may also be allowed to schedule/update dialing sessions on behalf of other users/talkers.

Continuing to describe the exemplary embodiment of the Scheduling App, the following sub-sections numbered 7 and 8 describe the features provided to Vendor personnel (including but not limited to dialing agents).

7) The system may provide facility for each dialing agent to maintain his/her hour-by-hour free/busy availability in his/her calendar. This may include, but not limited to, holidays, time off, work timings, and the like. Further, the system may provide facility to the dialing agent (or other personnel) to maintain information about the skills of the dialing agent.

8) The system may allow certain authorized Vendor user(s)/personnel to see the available capacity during a specific time period to perform dialing sessions (using the available dialing agents with specific skillset, LCS system resources, and the like). Such information might help to make arrangement to optimize the utilization of the resources, for example, (i) increasing the capacity to perform dialing sessions during a specific time period by changing the work times of certain dialing agents with appropriate skillsets, or (ii) in the unlikely event that the available resource capacity goes down below the required capability to execute previously scheduled dialing sessions, due to unforeseen resource shortage, handle the capacity shortage by requesting cancellation of previously scheduled dialing sessions with specific talkers.

Figure 40:
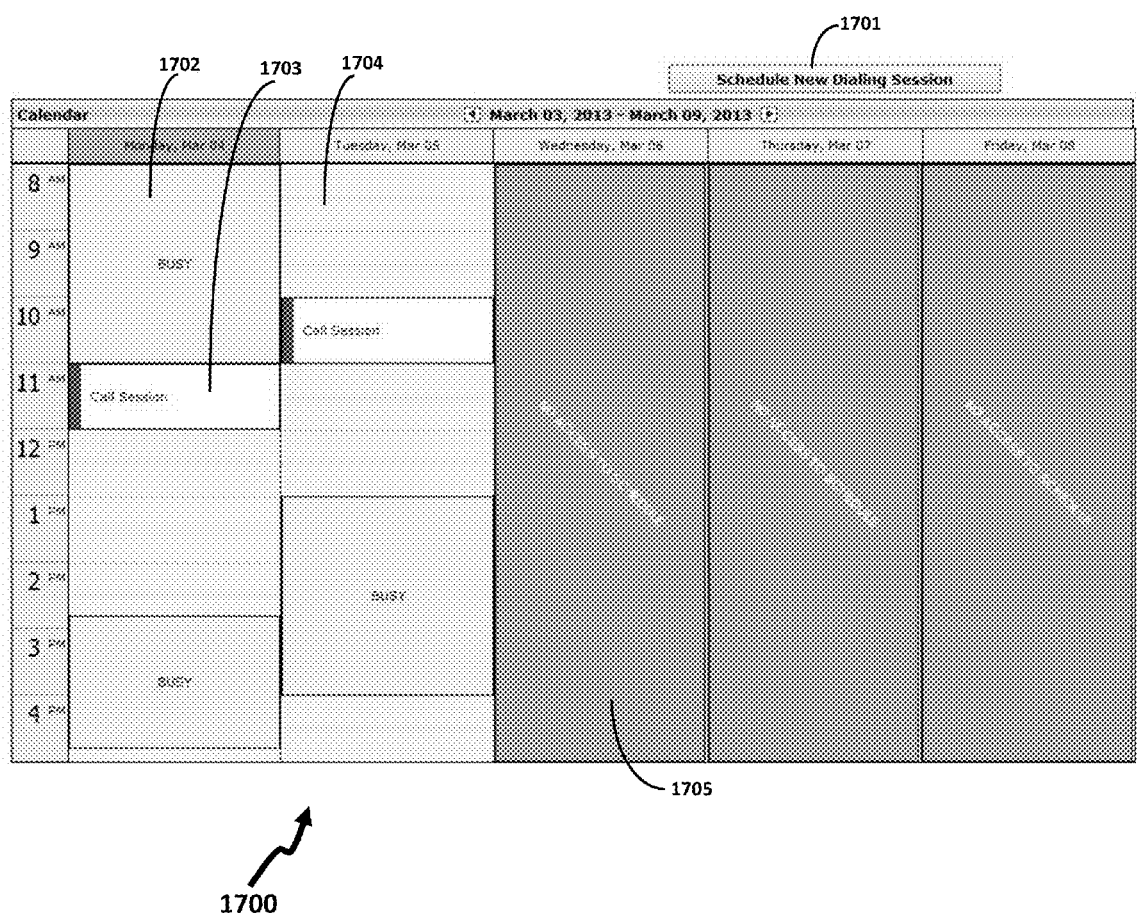
FIG. 40 is an exemplary screen view of the exemplary embodiment of Scheduling App illustrating an interface to show to a talker (or another authorized user of the system) free/busy information for various time slots associated with dialing sessions.

FIG. 40 is an exemplary screen view of the exemplary embodiment of Scheduling App described herein illustrating an interface 1700 to show to a talker (or another authorized user of the system) the previously scheduled dialing sessions, timeslots that are available for scheduling new dialing sessions, timeslots that are busy/not available for scheduling new dialing sessions, identifying the time period outside of Scheduling Time Window differently, and the like. As shown in FIG. 40 the interface 1700 contains: a Schedule New Dialing Session button 1701, for showing a button that shows a popup screen to capture the necessary information to schedule a new dialing session; a screen area 1702, for showing a time slot that is busy/not available for scheduling a new dialing session; a screen area 1703, for showing a time slot in which a dialing session is already scheduled; a screen area 1704, for showing a time slot that is available for scheduling a new dialing session; and a screen area 1705, for showing a time period that is outside of the Scheduling Time Window.

Figure 41:
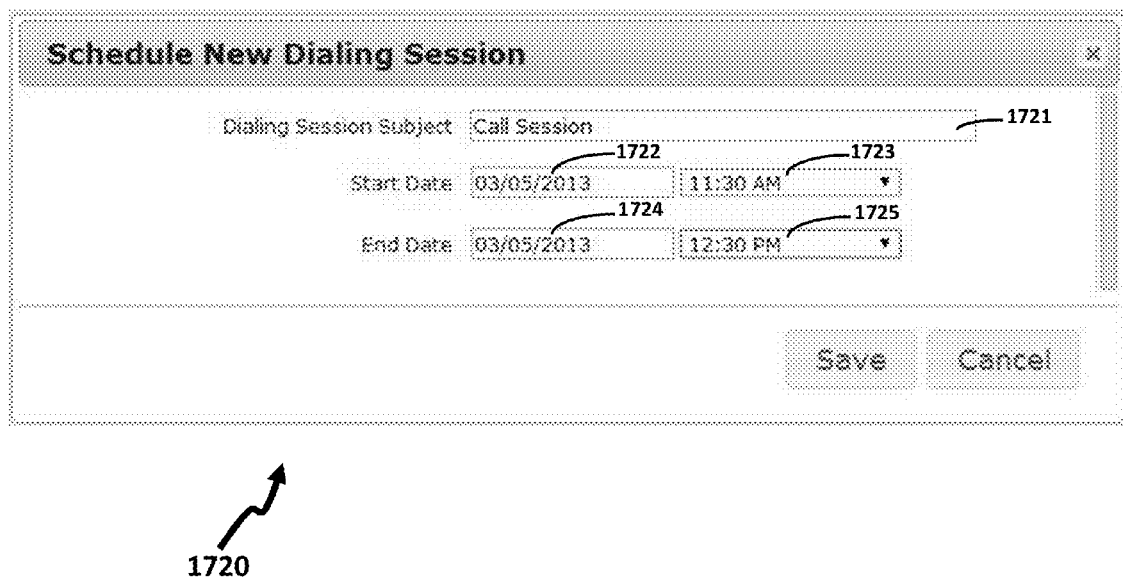
FIG. 41 is an exemplary screen view of the exemplary embodiment of Scheduling App illustrating an interface that allows a talker (or another authorized user) of the system to enter the information to schedule a new dialing session.

FIG. 41 is an exemplary screen view of the exemplary embodiment of Scheduling App described herein illustrating an interface 1720 that allows a talker (or another authorized user) of the system to enter the information to schedule a new dialing session. As shown in FIG. 41 the interface 1720 contains: a dialing session subject field 1721, for entering subject information related to the dialing session (for the purposes of easier reading or reference); a date field 1722, for entering the date on which the dialing session may start; a time field 1723, for entering the time when the dialing session may start; a date field 1724, for entering the date on which the dialing session may end; and a time field 1725, for entering the time when the dialing session may end.

Figure 42:
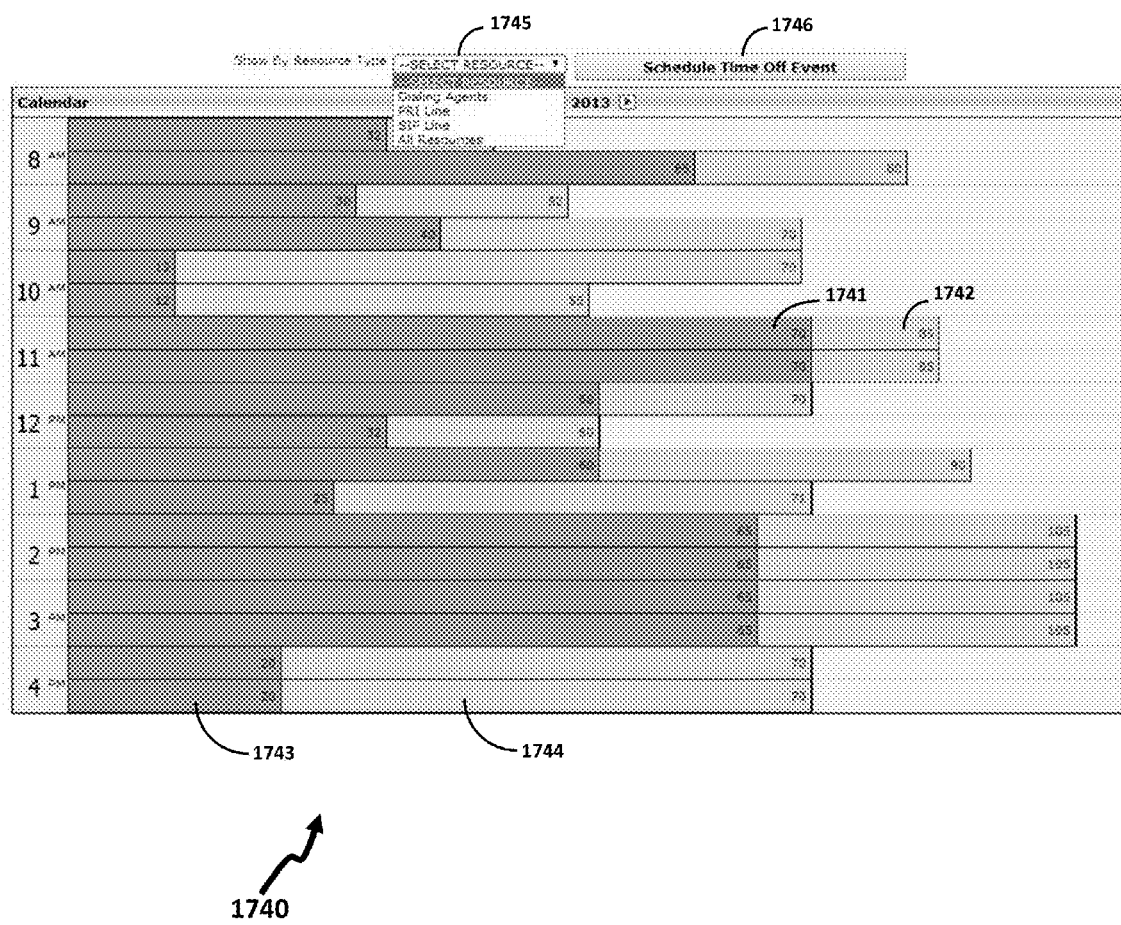
FIG. 42 is an exemplary screen view of the exemplary embodiment of Scheduling App illustrating an interface to show to a Vendor personnel (or another authorized user of the system) the total available capacity and already scheduled capacity in the form of number of concurrent dialing sessions for Mar. 3, 2013.

FIG. 42 is an exemplary screen view of the exemplary embodiment of Scheduling App described herein illustrating an interface 1740 to show to a Vendor personnel (or another authorized user of the system) the total available capacity and already scheduled capacity in the form of number of concurrent dialing sessions for an exemplary date of Mar. 3, 2013. As shown in FIG. 42 the interface 1740 contains: a screen area 1741, for showing 70 as the number of dialing sessions already scheduled for the 11:00 am to 11:30 am time slot; a screen area 1742, for showing 85 as the total capacity/total number of dialing sessions possible for the 11:00 am to 11:30 am time slot (out of which 70 dialing sessions have been already scheduled); a screen area 1743, for showing 20 as the number of dialing sessions already scheduled for 4:30 pm to 5:00 pm time slot; a screen area 1744, for showing 70 as the total capacity/total number of dialing sessions possible for 4:30 pm to 5:00 pm time slot (out of which 20 dialing sessions have been already scheduled); and a Show By Resource Type selection field 1745, for selecting one of the dropdown values for the purposes of filtering and showing the available capacity and already scheduled capacity with respect to a specific type of resource or all necessary resources combined; and Schedule Time Off Event button 1746, for showing a popup that allows entering the information to schedule a time off event upon clicking the button.

FIG. 43 is an exemplary screen view of the exemplary embodiment of Scheduling App described herein illustrating an interface 1760 that allows a dialing agent (or another authorized Vendor personnel) to enter the information to schedule a time off event for the purposes of notifying the system that he/she is not available for providing services during that time period. As shown in FIG. 43 the interface 1760 contains: a time off reason field 1761, for entering the reason for time off; a date field 1762, for entering the date on which the time off event may start; a time field 1763, for entering the time when the time off event may start; a date field 1764, for entering the date on which the time off event may end; and a time field 1765, for entering the time when the time off event may end; and a status field 1766, for showing the status of the time off event such as whether the time off request is yet to be approved, rejected, or the like.

Figure 44:
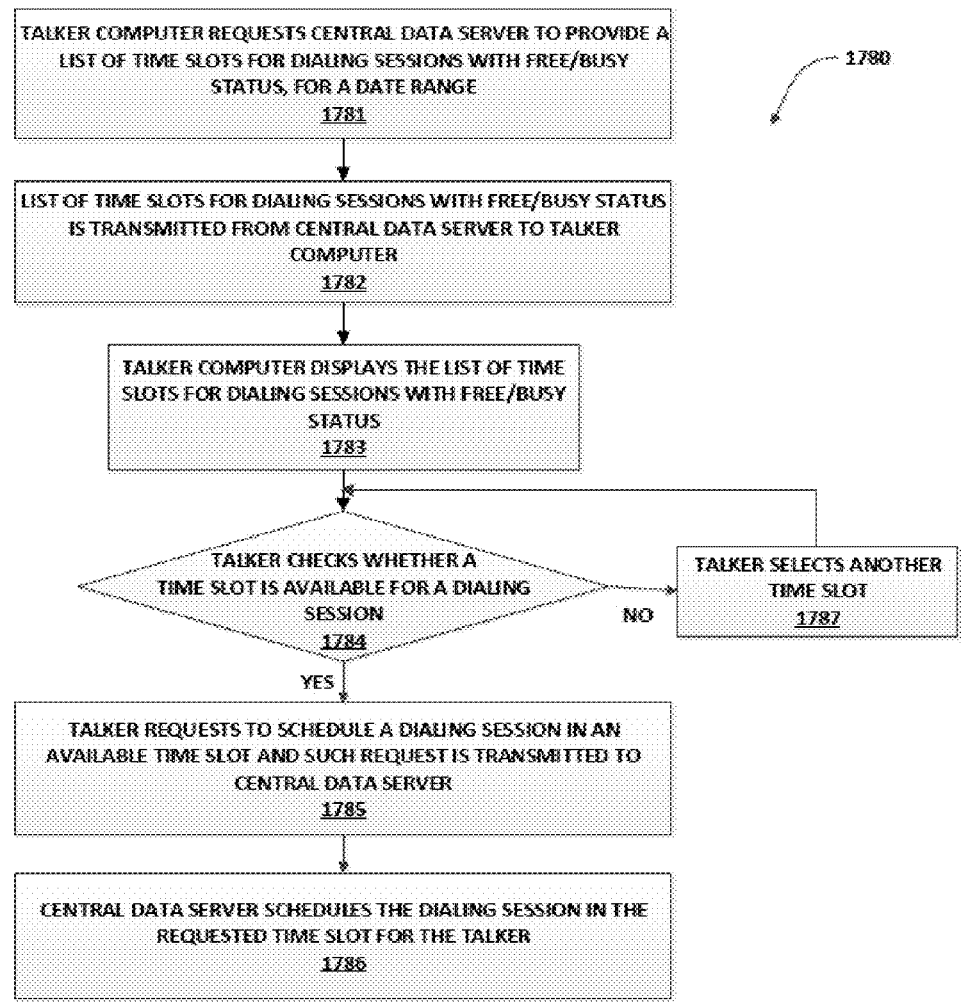
FIG. 44 is a flowchart illustrating actions performed by the system when a talker schedules a time slot for a dialing session.

FIG. 44 is a flowchart 1780 illustrating actions performed by the system when a talker schedules a time slot for a dialing session. As shown by block 1781, upon request by the talker the talker computer sends a request to the central data server to provide a list of time slots for dialing sessions with free/busy status for a specific date range. As shown by block 1782, list of time slots for dialing sessions with free/busy status for the specific date range requested is transmitted from central data server to talker computer. As shown by block 1783, the talker computer displays the list of time slots for dialing sessions with free/busy status for the specific date range requested by talker. As shown by block 1784, the talker selects a specific time slot checks the time slot is available for a dialing session. As shown by block 1785, upon determining that the time slot is available, the talker requests to schedule a dialing session (by scheduling a new dialing session) in the time slot and such request is transmitted to the central data server. It should be noted that if the time slot is not available for dialing, as determined in block 1784, the talker may select another time slot, as shown by 1787, and then proceed to perform the function shown by block 1784 again and thereby going into a loop for one or iterations until identifying a time slot available for a dialing session (or stop after few iterations). Please note, based on implementation preferences, if the talker attempts to schedule a dialing session in a time slot that is not available for a dialing session the system may generate an error message indicating that such time slot is not available for a dialing session. As shown by block 1786, the central data server schedules the dialing session in the requested time slot for the talker and updates the necessary information which may be used to determine, among other things, the number of scheduled dialing sessions, the remaining number of dialing sessions available for scheduling, and the like for the time slot.

A person with ordinary skills in the art would understand and appreciate that the system may be customized to allow a talker specify various criteria, including but not limited to, skill level of dialing agents, type of phone servers allowed, and the like, for the talker's dialing sessions. The number of dialing sessions that could be executed varies based on the type of resources required to perform the dialing session for each talker. For example, a talker may require dialing agents who are trained and certified in specific skills, and/or the type of phone server may need to be using a specific phone communication technology. Further, based on the implementation preferences, the system in accordance with the exemplary embodiment of the Scheduling App may provide a feature to synchronize the scheduled dialing session information with the third party calendar systems of the user.

Based on implementation preferences, alerts may be generated by the system in accordance with the exemplary embodiment of the Scheduling App to provide reminders to the appropriate individuals (including but not limited to, the talker and Vendor personnel) that are interested in receiving such alerts. Also, at specific times or time intervals, the Scheduling App may automatically generate/send status report (with appropriate information that is of interest to the recipients) or allow authorized personnel to manually generate such report.

I claim:

1. A system for handling call transfer from being between a customer and a dialing agent to being between the customer and a talker, wherein the system comprises a central data server and a talker computer, the system further comprising:
   the talker computer having a memory, and a processor configured by the memory to provide a batch notification that enables the central data server to identify a batch of one or more customer records, for calling;
   the central data server having a memory, and a processor configured by the memory to receive the batch notification that enables the central data server to identify the batch of one or more customer record;
   a dialing agent module for providing a connected notification that a customer that has been called has been connected, referred to herein as a connected customer, via a call, wherein at least one customer record of the connected customer is at least one of the batch;
   wherein the central data server further performs the steps of:
      receiving the connected notification confirming that the connected customer that has been called has been connected; and
      after the dialing agent module acknowledges connection to the customer, providing an identify notification that enables the talker computer to distinguish the at least one customer record associated with the connected customer,
   wherein the talker computer further performs the step of receiving the identify notification that enables the talker computer to identify at least one of the customer records associated with the connected customer, for the purposes of distinguishing at least one of the connected customer records on the talker computer after the connected customer has been connected to the dialing agent, wherein the talker computer is used by the talker and wherein the customer record of the connected customer is one of the batch.

2. The system of claim 1, wherein the batch notification is a group of one or more customer records.

3. The system of claim 1, wherein the batch notification is a group of one or more customer identifications, wherein each customer identification is associated with at least one of the customer records.

4. The system of claim 1, wherein distinguishing the customer record includes the step of highlighting the customer record.

5. The system of claim 1, wherein the function performed by the dialing agent module is automated.

6. The system of claim 5, wherein the dialing agent module automates dialing of the customer phone number, wherein upon dialing the customer phone number or concurrently during the dialing of the customer phone number by the dialing agent module the talker computer receives a select notification that enables the talker computer to distinguish at least one of the customer records associated with the customer whose phone number is being dialed, wherein the dialing agent module partially or fully automates the dialing of the customer phone number and the navigation of the phone call, and wherein the connected notification is optional.

7. A system for handling call transfer from being between a customer and a dialing agent, to being between the customer and a talker, wherein the system comprises a central data server, a dialing agent computer, and a talker computer, the system further comprising:
   the central data server having a memory, and a processor configured by the memory to perform the step of providing a dialing notification that enables the dialing agent computer to identify one or more customer record associated with one or more customer selected for calling;
   a dialing agent computer having a memory, and a processor configured by the memory to provide a connected notification that a customer that has been called has been connected, referred to herein as a connected customer, via a call, wherein the dialing agent computer is used by a dialing agent;
   a talker computer having a memory, and a processor configured by the memory to perform the steps of:
      receiving an identify notification that enables the talker computer to identify a customer record associated with the connected customer after the connected customer has been connected to the dialing agent, wherein the talker computer is used by a talker; and
      enabling the talker to create a marketing campaign comprising one or more marketing activity defined by marketing campaign information; and
   wherein the central data server further performs the steps of:
      receiving the connected notification from the dialing agent computer confirming that the connected customer has been connected;
      after the dialing agent computer acknowledges connection to the customer, providing the identify notification that enables the talker computer to identify the customer record associated with the connected customer; and
      receiving the marketing campaign information and scheduling the one or more marketing activity associated with the marketing campaign.

8. The system of claim 7, wherein a marketing activity is one or more of delivering voice message, sending email, sending text message, or calling.

9. The system of claim 7, wherein the talker computer shows one or more previously created marketing campaigns to talker.

10. The system of claim 7, wherein the talker computer shows one or more marketing activities associated with a customer record.

11. The system of claim 7, wherein the central data server creates one or more service request associated with a marketing activity.

12. The system of claim 11, wherein the system further comprises a vendor personnel computer used by a person employed by a vendor that fulfills a service request, wherein the vendor personnel computer shows the one or more service requests, for the purpose of the person performing the one or more services requests.

13. A system for handling call transfer from being between a customer and a dialing agent, to being between the customer and a talker, wherein the system comprises a central data server, a dialing agent computer, and a talker computer, the system further comprising:
   the central data server having a memory, and a processor configured by the memory to perform the step of providing a dialing notification that enables the dialing agent computer to identify one or more customer record associated with at least one customer selected for calling;
   a dialing agent computer having a memory, and a processor configured by the memory to provide a connected notification that a customer that has been called has been connected, referred to herein as a connected customer, via a call, wherein the dialing agent computer is used by a dialing agent;
   a talker computer having a memory, and a processor configured by the memory to perform the steps of:
      receiving an identify notification that enables the talker computer to identify at least one of the customer records associated with the connected customer after the connected customer has been connected to the dialing agent, wherein the talker computer is used by a talker; and
      enabling the talker to enter information to schedule a dialing session event; and
   wherein the central data server further performs the steps of:
      receiving the connected notification from the dialing agent computer confirming that the connected customer has been connected;
      after the dialing agent computer acknowledges connection to the customer, providing the identify notification that enables the talker computer to identify the customer record associated with the connected customer; and
      receiving the information entered by the talker to schedule a dialing session event and updating the list of dialing sessions scheduled for the talker.

14. The system of claim 13, wherein the talker computer enables the talker to view one or more previously scheduled dialing sessions and the availability of future time slots for a specific time period.

15. The system of claim 13, wherein the system further comprises a vendor personnel computer, wherein the vendor personnel computer enables a vendor personnel to view a total number of dialing sessions possible and a total number of dialing sessions scheduled for a specific time slot.

16. A system for calling a customer, comprising:
   a computer having a memory, and a processor configured by the memory to receive a batch notification that enables the computer to identify a batch of one or more customer records in the computer, for calling in the near future, and to receive a calling notification that enables the computer to distinguish a customer that is being called or to be called next, referred to herein as a calling customer, via a call, wherein a customer record associated with the calling customer is one of the batch; and
   a central data server having a memory, and a processor configured by the memory to perform the steps of:
      providing the batch notification that enables the computer to identify the batch of one or more customer records; and
      providing the calling notification that enables the computer to distinguish the calling customer, and
   wherein the computer further performs the step of:
      enabling a user of the computer to create a marketing campaign comprising of one or more marketing activity defined by marketing campaign information; and
   wherein the processor of the central data server is further configured to perform the steps of:
      receiving the marketing campaign information and schedule the one or more marketing activities associated with the marketing campaign.

17. The system of claim 16, wherein a marketing activity is one or more of delivering voice message, sending email, sending text message, or calling.

18. The system of claim 16, wherein the computer shows one or more previously created marketing campaigns to the talker.

19. The system of claim 16, wherein the computer shows one or more marketing activities performed for a customer record.

20. The system of claim 16, wherein the central data server creates one or more service request associated with a marketing activity.

21. The system of claim 20, wherein the system further comprises a vendor personnel computer used by a person employed by a vendor that fulfills a service request, wherein the vendor personnel computer shows the one or more service requests, for the purpose of the person performing the one or more services requests.

22. A system for facilitating a call between a call handler and a customer, wherein the system enables a third party call participant to participate in the call, the system further comprising:
   a call handler computer having a memory, and a processor configured by the memory to identify the customer record associated with the customer that is on the call with the call handler or being called via a call by the call handler;
   a third party call participant computer having a memory, and a processor configured by the memory to provide a request participation notification that the third party call participant has requested to participate in the call between the call handler and the customer, wherein the third party call participant computer is used by a third party call participant; and
   a central data server having a memory, and a processor configured by the memory to perform the steps of:
      receiving the request participation notification from the third party call participant computer that the third party call participant has requested to participate in the call between the call handler and the customer; and
      providing a participate notification that enables the third party call participant to participate in the call between the call handler and the customer.

23. The system of claim 22, wherein the system further comprising a central voice server for providing voice communication between the call handler and the customer, wherein the central voice server enables the third party call participant to participate in the call between the call handler and the customer.

24. The system of claim 22, wherein the central voice server receives the participate notification that enables the third party call participant to participate in the call between the call handler and the customer.

25. The system of claim 22, wherein the third party call participant is connected to the call between the call handler and the customer in one or more modes namely listen only mode, barge mode, or whisper mode.

26. The system of claim 22, wherein the system may record the call between the call handler and the customer.

27. The system of claim 22, wherein the system may interchange the role played by the call handler and the third party call participant, and wherein the customer call is handled by the third party call participant after the interchange.

28. The system of claim 22, wherein the third party call participant computer transmits a request to the central data server to provide a list of call handlers, wherein the central data server transmits the list of call handlers and the third party call participant computer displays the list of call handlers.

29. The system of claim 22, wherein the call handler computer transmits a request to the central data server to provide a list of third party call participants, wherein the central data server transmits the list of third party call participants and the call handler computer displays the list of third party call participants.

30. The system of claim 22, wherein the processor of the call handler computer is further configured to receive a batch notification that enables the call handler computer to identify a batch of one or more customer records in the call handler computer, for calling in the near future, and to receive a calling notification that enables the computer to distinguish a customer that is being called or to be called next, referred to herein as a calling customer, via a call, wherein a customer record associated with the calling customer is one of the batch, and wherein the processor of the central data server is further configured to provide the batch notification that enables the call handler computer to identify the batch of one or more customer records; and to provide the calling notification that enables the computer to distinguish the calling customer.

31. The system of claim 30, wherein the processor of the central data server is further configured to select at least one customer that is being called or to be called next, referred to herein as a selected customer, wherein the processor of the central data server further performs the step of providing a selected notification that enables the computer to distinguish the selected customer, and wherein the computer further performs the step of receiving the selected notification that enables the computer to distinguish the selected customer, wherein the customer record of the selected customer is one of the batch.

32. A system for allocating a dialing agent automatically during outbound calling to assist in establishing a communication connection between a talker and a customer, comprising:

an automated dialing function configured to establish communication between the talker and the customer, wherein the automated dialing function is further configured to initiate an outbound calling attempt to establish communication between the talker and the customer and to automatically transfer the call to an available dialing agent upon the automated dialing function countering a live human voice instead of an anticipated automated phone answering system.

33. The system of claim 32, wherein the system further comprising a dialing agent application for interfacing with a plurality of dialing agents and configured to link to one of said dialing agents to assist the automated dialing function in completing outbound call attempts.

34. The system of claim 32, wherein the available dialing agent, to whom the call is transferred, is from a group of one or more dialing agents specified by the talker.

35. A method for automatically allocating a dialing agent during outbound calling in order to assist in establishing a communication connection between a talker and a customer comprising the steps of:

automatically attempting to establish a communication connection between the talker with the customer using stored contact information associated with said target;

automatically processing an attempted communication connection until conditions are encountered wherein human intervention is needed in order to complete the attempted communication connection;

upon human intervention is needed in order to complete an attempted communication connection, automatically selecting an available dialing agent to assist in the completion of the attempted communication connection; and wherein the talker is knowledgeable about a subject matter of the call with the customer.

36. The method of claim 35, wherein the method further comprising a step of selecting a customer for an attempted communication from a group of customers having stored contact information associated with at least some of said customers.

37. The method of claim 35, wherein the available agent selected automatically, to assist in the completion of the attempted communication connection, is from a group of one or more dialing agents specified by the talker.

* * * * *